(12) United States Patent
Altomare et al.

(10) Patent No.: US 7,249,075 B1
(45) Date of Patent: *Jul. 24, 2007

(54) SYSTEM AND METHOD FOR ADMINISTERING PRINCIPAL PROTECTED EQUITY LINKED FINANCIAL INSTRUMENTS

(75) Inventors: Gerald Craig Altomare, Saddle River, NJ (US); Stephen David Reddy, Washington Crossing, PA (US); Donald Dong-Whan Sung, New York, NY (US); Robert Oliver Young, Cos Cob, CT (US)

(73) Assignee: Morgan Stanley, New York, NY (US)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 09/397,704

(22) Filed: Sep. 16, 1999

(51) Int. Cl.
*G06Q 40/00* (2006.01)

(52) U.S. Cl. ...................................... 705/35; 705/36 T

(58) Field of Classification Search ................. 705/36, 705/35, 37, 36 T
See application file for complete search history.

(56) References Cited

U.S. PATENT DOCUMENTS

| 5,802,501 A * | 9/1998 | Graff ............................ 705/36 |
| 5,812,987 A * | 9/1998 | Luskin et al. ................. 705/36 |
| 5,946,667 A * | 8/1999 | Tull ............................ 705/36 |
| 6,192,347 B1 * | 2/2001 | Graff ............................ 705/36 |
| 6,321,212 B1 * | 11/2001 | Lange ........................ 705/37 |

OTHER PUBLICATIONS

CIBC World Markets "Structured Notes: Equity Index Linked Notes", 1999.*
Arnovitz, Andrew C.; "Equity-Linked notes give RRSPs foreign exposure", Canadian Jewish News, Feb. 1999.*
Satyajit Das, "Credit Derivative; Products, Applications and Pricing" Wiley, John & Sons, Incorporated, Apr. 1998.*
Satyajit Das, "Structured Notes and Derivative Embedded Securities" (Euromoney Publications, Jan. 1996.*
"Premium Exchangable Participating Shares - PEPS," Prospectus, SEC File No. 033-61915, Nov. 16, 1995.

* cited by examiner

*Primary Examiner*—Jagdish N Patel
(74) *Attorney, Agent, or Firm*—Kirkpatrick & Lockhart Preston Gates Ellis LLP

(57) ABSTRACT

A data processing system and method for implementing and control of a financial instrument having pre-set maturity that provides efficient exposure to common stock at a reduced risk. In a preferred embodiment, the financial instrument is divided into units, each one consisting of a long-dated Treasury STRIP and the common stock of one company. Over its life term, each unit generates income based on the total return of the underlying common stock and can be created or redeemed at any time. The data processing system receives input from the capital market and evaluates the financial instrument, reporting its price to customers. The system further arranges for periodic distributions according to pre-defined distribution schedule and for the creation and redemption of new units. Also disclosed is a data processing system and method for administering a group of such instruments designed to track the performance of specified equity securities.

27 Claims, 36 Drawing Sheets

Cash Transactions

In-Kind Transactions

ProEquity Offers a Significant RBC Benefit Which Increases Over Time

ProEquity Generates Significantly More Ordinary Income vs. the Underlying (Note: Graph Assumes Asset Base Is Reinvested Pre-Tax)

ProEquity Defers Taxes vs. Comparable Investments
(After-Tax Income on Asset Base Reinvested Pre-Tax)

ProEquity Pre-Tax GAAP Return on Assets

ProEquity Pre-Tax GAAP Return on Assets

ProEquity Pre-Tax GAAP Return on Assets

SPDR's-LINKED PROEQUITY TRUST SHADOW BOOK

INITIAL CONTRIBUTION

| | | |
|---|---|---|
| Share Price | $ | 131.1250 |
| STRIP Price | $ | 200.3500 |
| Deposit Fee (bps) | | 0.50% |
| Deposit Fee (per $1000) | $ | 5.00 |
| Discount (bps) | | 0.10% |
| Discount (per $1000) | $ | 1.00 |
| Share Ratio | | 6.0412 |
| Par | $ | 1,000.00 |
| Deposit Fee less Discount | $ | 4.00 |
| Cost Basis (NAV or UEV) | $ | 992.50 |
| Cost Basis (inclusive of Deposit Fee) | $ | 996.50 |

| | | |
|---|---|---|
| | 0.45% | |
| | $ 4.50 | 0.35% |
| | | 3.50 |
| | 3.50 | 2.50 |
| | $ 996.00 | $ 995.00 |

Check 992.50 blue = input
black = calculation

| Docs Rec'd | Cash Investors | URP/Direct | Account # | Shares Contributed | Cash Contributed | Units (STRIPS Purchased) | Shares Contributed to Trust | Deposit Fee Paid in Cash | Portions of Excess Cash to be Deposited | Fractional Cash in Account | RepoSweep Interest Earned | Total Cash Returned |
|---|---|---|---|---|---|---|---|---|---|---|---|---|
| P,R,U,Cash | MIMLIC Asset Management | URP | 21-U0000 | 0 | $ 20,000,000 | 20,070 | 121246 | $ 80,280.00 | $ 68.75 | $ 245.00 | $ 10,084.10 | $ 10,329.10 |
| P,R,U,Cash | Phoenix Inv. Counsel Inc. | URP | 21-U0005 | 0 | $ 20,000,000 | 15,052 | 90931 | $ 60,208.00 | $ 114.43 | $ 682.00 | $ 7,483.87 | $ 8,165.87 |
| P,R,U,Cash | Allstate - <than20% of Trust | URP | 21-U0008 | 0 | $ 20,000,000 | 25,087 | 151555 | $ 100,348.00 | $ 17.67 | $ 804.50 | $ 12,610.08 | $ 13,414.58 |
| P,R,U,Cash | AIG Global Investments | URP | 21-U0001 | 0 | $ 20,000,000 | 50,175 | 303116 | $ 200,700.00 | $ 40.75 | $ 612.50 | $ 25,210.24 | $ 25,822.74 |
| P,R,U,Cash | Zurich Kemper Life | URP | 21-U0006 | 0 | $ 20,000,000 | 10,035 | 60623 | $ 41,140.00 | $ 34.37 | $ 122.50 | $ 4,987.23 | $ 5,109.73 |
| P,R,U,Cash | Commercial Union | URP | 21-U0007 | 0 | $ 20,000,000 | 15,052 | 90931 | $ 60,208.00 | $ 114.43 | $ 682.00 | $ 7,480.85 | $ 8,162.85 |
| Total | | | | | | | | | | | | |
| | Chase Bank of Texas | Trustee | 21-U9000 | | | | | | | | | |

AJAY NEEDS TO BUY:
Shares 818,404
No. of STRIPS 135,471
Face Value of STRIPS $ 135,471,000

| Ratio Immediately After Share Contrib | 6.04116010 |
| Additional Shares Bought w/cash | 2 |

| Final Share Ratio | 6.0412 |
| Excess Cash in Trust | $ 128.15 |

Check for Share Ratio: 0.0000

Allstate is greater than 20% of the Trust
FALSE

FIGURE 23A

SPDR's-LINKED PROEQUITY TRUST ONGOING CONTRIBUTION

INITIAL CONTRIBUTION TABLE

| | | | | |
|---|---|---|---|---|
| Share Price | $ 131.12500 | | | |
| STRIP Price | $ 200.3500 | | | |
| Deposit Fee (bps) | | 0.45% | | 0.35% |
| Deposit Fee (per $1000) | $ 5.00 | $ 4.50 | | 3.50 |
| Discount (bps) | | 0.10% | | |
| Discount (per $1000) | 1.00 | | | |
| Share Ratio | 6.0412 | | | |
| Par | 1,000.00 | | | |
| Deposit Fee less Discount | $ 4.00 | $ 3.50 | $ 2.50 | Check |
| Cost Basis (NAV or UEV) | $ 992.50 | | | 992.50 |
| Cost Basis | $ 996.50 | $ 996.00 | $ 995.00 | |
| *(inclusive of Deposit Fee)* | | | | |

ONGOING CONTRIBUTION TABLE

| | | | | |
|---|---|---|---|---|
| Share Price (ASK) | 133.3125 | | | |
| STRIP Price (ASK) | 192.5550 | | | |
| Deposit Fee (bps) | 0.50% | 0.45% | | 0.35% |
| Deposit Fee (per $1000) | $ 5.00 | $ 4.50 | $ | 3.50 |
| Share Ratio | 6.0412 | | | |
| Par | $ 1,000.00 | | | |
| Cost Basis (NAV or UEV) | $ 992.50 | | | Check |
| Cost Basis | $ 1,000.92 | $ 1,000.42 | $ 1,001.52 | 1,001.92 |
| *(inclusive of Deposit Fee)* | | | | |

Alex Needs to Purchase:

| | |
|---|---|
| Shares: | - |
| STRIPS: | - |

Trust Totals after Ongoing Contributions:

| | |
|---|---|
| Shares: | $18,404 |
| STRIPS: | 135.471 |
| Units: | 135.471 | blue - input
black - calculation

| Docs Rec'd | Cash Investors | URP/Direct | Account # | Shares Contributed | STRIPS Contributed | Cash Deposited In Account Prior to Pricing | Cash Contributed | # of Additional Units (STRIPS Purchased) | Shares Contributed to Trust | Deposit Fee Paid in Cash | Fractional Cash | Excess Shares to be Returned | Portion of Excess Cash to be Deposited | Fractional Cash In Account | RepoSweep Interest Earned | Total Cash Returned |
|---|---|---|---|---|---|---|---|---|---|---|---|---|---|---|---|---|
| P,R,U,Cash | MIMLIC Asset Management | URP | 21-U0000 | 0 | 0 | $ | $ | 0 | 0 | $ | $ | 0 | $ | $ | $ | $ |
| P,R,U,Cash | Phoenix Inv. Counsel Inc. | URP | 21-U0005 | 0 | 0 | $ | $ | 0 | 0 | $ | $ | 0 | $ | $ | $ | $ |
| P,R,U,Cash | Allstate - <than20% of Trust | URP | 21-U0008 | 0 | 0 | $ | $ | 0 | 0 | $ | $ | 0 | $ | $ | $ | $ |
| P,R,U,Cash | AIG Global Investments | URP | 21-U0001 | 0 | 0 | $ | $ | 0 | 0 | $ | $ | 0 | $ | $ | $ | $ |
| P,R,U,Cash | Zurich Kemper Life | URP | 21-U0006 | 0 | 0 | $ | $ | - | - | - | - | - | - | - | - | - |
| P,R,U,Cash | Commercial Union | URP | 21-U0007 | 0 | 0 | $ | $ | | | | | | | | | |
| | Total | | | | | | | | | | | | | | | |
| | Chase Bank of Texas | Trustee | 21-U9000 | | | | | | | | | | | | | |

| | | |
|---|---|---|
| Ratio Immediately After Share Contrib | $div.0! | |
| Additional Shares Bought w/cash | 0 | |
| Final Share Ratio | | 6.0412 |
| xxxxxx Excess Cash in Trust | $ | 128.15 |
| Excess Cash In Trust | $ | 128.15 |

FIGURE 23B

SPDR's-LINKED PROEQUITY TRUST CASH PAYMENTS

| | |
|---|---|
| NAV Pre-Payment (ASK) | $ 982.36 |
| Share Price (ASK) | $ 132.750 |
| STRIP Price (ASK) | $ 180.395 |
| ProEquity Ratio | 6.0412 |
| Total Units | 135,471 |
| Total Shares | 818,404 |
| Dividend / share | $ 0.40497 |
| Payment / Unit | $ 2.45 |
| Total Dividend Payment | $ 332,295.15 |
| NAV Post-Payment | $ 979.909 |
| New Share Price | $ 132.345 |
| Excess Cash in Trust | $ 128.150 | blue = input
black = calculation

*Held in account until the next Performance Payment

| Cash Investors | URP/Direct | Account # | # Units (STRIPS Owned) | Cash Payment Received * |
|---|---|---|---|---|
| MIMLIC Asset Management | URP | 21-U0000 | 20070 | $ 49,229.46 |
| Phoenix Inv. Counsel Inc. | URP | 21-U0005 | 15052 | $ 36,920.87 |
| Allstate - < than 20% of Trust | URP | 21-U0008 | 25087 | $ 61,535.59 |
| AIG Global Investments | URP | 21-U0001 | 50175 | $ 123,073.64 |
| Zurich Kemper Life | URP | 21-U0006 | 10035 | $ 24,614.73 |
| Commercial Union | URP | 21-U0007 | 15052 | $ 36,920.87 |
| Total | | | | |
| Chase Bank of Texas | Trustee | 21-U9000 | | |

| | |
|---|---|
| Share Ratio | 6.0412 |
| Excess Cash in Trust | $ 128.15 |

Distribution and Accounting Analysis (Assumes 3%/quarter average total return on the stock; Basis in Stock = $81.21; Basis in STRIPS = $17.99; Results Net of Expenses)

| qtr | growth | underlying assets shares price | underlying assets shares # | underlying assets value | underlying assets div | STRIPS rate | STRIPS fwd | STRIPS fwd | distributions NAV pre | distributions NAV post | distributions dist | distributions sh # | distributions div $ | URP units per unit USGS reqd | URP units per unit shares sold | URP units per unit shares bought | URP units total units paid | URP units compounded total | URP units compounded new | tax cash electors div inc | tax cash electors STRIP old | tax cash electors share sales | tax cash electors tax | tax URP elector div inc | tax URP elector STRIP old | tax URP elector share sales | tax URP elector tax | gaap cash 1 unit am cost | gaap cash 1 unit change | gaap cash 1 unit income | gaap URP total units am cost | gaap URP total units change | gaap URP total units income |
|---|---|---|---|---|---|---|---|---|---|---|---|---|---|---|---|---|---|---|---|---|---|---|---|---|---|---|---|---|---|---|---|---|---|
| 0 |  | 81.26 | 1.0000 | 81.26 | 0.5% | 5.2% | 5.8% | 17.99 | 99.25 $ | 99.25 $ | — | — | 0.000 $ | — | 0.000 | 1.000 | — | 1.000 | 1.000 | 0.00 | 0.00 | 0.00 | 0.00 | 0.00 | 0.00 | 0.00 | 0.00 | 100.00 | 0.00 | 0.00 | 100.00 | 0.00 | 0.00 |
| 1 | 13.83% | 92.49 | 0.8787 | 81.28 | 0.5% | 5.2% | 5.8% | 18.22 | 110.72 | 99.50 | 11.22 | 0.121 | 0.46 | 2.1393 | 0.018 | 0.000 | 0.117 | 1.117 | 0.117 | 0.05 | 0.09 | 0.48 | 0.14 | 0.05 | 0.09 | 0.07 | 0.21 | 89.38 | (10.62) | 1.06 | 89.38 | (10.62) | 1.06 |
| 2 | 5.53% | 97.60 | 0.8303 | 81.04 | 0.5% | 5.2% | 5.8% | 18.46 | 104.23 | 99.50 | 4.73 | 0.048 | 0.43 | 0.9666 | 0.005 | 0.000 | 0.052 | 1.175 | 0.058 | 0.05 | 0.09 | 0.28 | 0.14 | 0.05 | 0.10 | 0.03 | 0.19 | 85.34 | (4.04) | 1.12 | 84.85 | (4.53) | 1.23 |
| 3 | -0.62% | 96.99 | 0.8190 | 79.44 | 0.5% | 5.2% | 5.8% | 18.70 | 99.23 | 98.14 | 1.10 | 0.011 | 0.40 | 0.2858 | 0.000 | 0.001 | 0.015 | 1.193 | 0.018 | 0.04 | 0.09 | 0.06 | 0.14 | 0.05 | 0.11 | 0.00 | 0.16 | 84.82 | (0.52) | 0.98 | 84.22 | (0.63) | 1.13 |
| 4 | 8.95% | 105.67 | 0.7623 | 80.56 | 0.5% | 5.2% | 5.8% | 18.94 | 105.49 | 99.50 | 5.99 | 0.057 | 0.41 | 1.2049 | 0.008 | 0.000 | 0.064 | 1.269 | 0.076 | 0.04 | 0.09 | 0.48 | 0.13 | 0.04 | 0.11 | 0.08 | 0.24 | 79.98 | (4.85) | 1.48 | 78.38 | (5.84) | 1.71 |
| 5 | 2.91% | 108.75 | 0.7385 | 80.31 | 0.5% | 5.2% | 5.8% | 19.19 | 102.09 | 99.50 | 2.59 | 0.024 | 0.41 | 0.5794 | 0.002 | 0.000 | 0.030 | 1.307 | 0.038 | 0.04 | 0.10 | 0.23 | 0.14 | 0.06 | 0.12 | 0.02 | 0.20 | 78.23 | (1.75) | 1.25 | 76.10 | (2.28) | 1.53 |
| 6 | -5.39% | 102.88 | 0.7276 | 74.86 | 0.5% | 5.2% | 5.8% | 19.44 | 95.42 | 94.30 | 1.12 | 0.011 | 0.38 | 0.3092 | 0.000 | 0.001 | 0.016 | 1.328 | 0.021 | 0.04 | 0.10 | 0.08 | 0.14 | 0.05 | 0.13 | 0.00 | 0.18 | 77.52 | (0.71) | 0.79 | 75.18 | (0.93) | 1.04 |
| 7 | -11.54% | 91.01 | 0.7148 | 65.05 | 0.5% | 5.2% | 5.8% | 19.69 | 85.91 | 84.75 | 1.17 | 0.013 | 0.33 | 0.3486 | 0.000 | 0.000 | 0.018 | 1.351 | 0.023 | 0.03 | 0.10 | 0.04 | 0.13 | 0.05 | 0.13 | 0.00 | 0.18 | 76.38 | (1.14) | 0.36 | 73.71 | (1.47) | 0.52 |
| 8 | -1.97% | 89.21 | 0.7005 | 62.50 | 0.5% | 5.2% | 5.8% | 19.95 | 83.72 | 82.45 | 1.27 | 0.014 | 0.23 | 0.3630 | 0.002 | 0.000 | 0.018 | 1.376 | 0.025 | 0.02 | 0.10 | 0.04 | 0.12 | 0.03 | 0.14 | 0.01 | 0.17 | 75.70 | (0.68) | 0.82 | 72.76 | (0.95) | 1.08 |
| 9 | 11.68% | 99.64 | 0.6890 | 68.65 | 0.5% | 5.2% | 5.8% | 20.21 | 90.01 | 88.86 | 1.15 | 0.012 | 0.35 | 0.3412 | 0.000 | 0.000 | 0.017 | 1.399 | 0.023 | 0.04 | 0.10 | 0.07 | 0.14 | 0.05 | 0.14 | 0.00 | 0.19 | 75.85 | 0.15 | 1.65 | 72.82 | 0.06 | 2.13 |
| 10 | 3.38% | 103.01 | 0.6779 | 69.83 | 0.5% | 5.2% | 5.8% | 20.48 | 91.45 | 90.31 | 1.15 | 0.011 | 0.35 | 0.3402 | 0.000 | 0.000 | 0.017 | 1.422 | 0.023 | 0.04 | 0.10 | 0.08 | 0.14 | 0.05 | 0.14 | 0.00 | 0.20 | 75.59 | (0.26) | 1.24 | 72.38 | (0.44) | 1.66 |
| 11 | -2.77% | 100.16 | 0.6663 | 66.74 | 0.5% | 5.2% | 5.9% | 20.75 | 88.65 | 87.49 | 1.16 | 0.012 | 0.34 | 0.3558 | 0.000 | 0.000 | 0.017 | 1.447 | 0.024 | 0.04 | 0.10 | 0.08 | 0.14 | 0.05 | 0.15 | 0.00 | 0.20 | 74.90 | (0.69) | 0.81 | 71.38 | (1.00) | 1.13 |
| 12 | 6.80% | 106.98 | 0.6547 | 70.04 | 0.5% | 5.2% | 5.9% | 21.02 | 92.30 | 91.07 | 1.23 | 0.012 | 0.27 | 0.3463 | 0.001 | 0.000 | 0.016 | 1.471 | 0.024 | 0.03 | 0.11 | 0.10 | 0.13 | 0.04 | 0.15 | 0.01 | 0.20 | 74.97 | 0.07 | 1.57 | 71.33 | (0.04) | 2.13 |
| 13 | 6.96% | 114.42 | 0.6449 | 73.79 | 0.5% | 5.3% | 5.9% | 21.30 | 96.22 | 95.09 | 1.13 | 0.010 | 0.37 | 0.3360 | 0.001 | 0.000 | 0.016 | 1.494 | 0.023 | 0.04 | 0.11 | 0.11 | 0.15 | 0.06 | 0.16 | 0.00 | 0.22 | 75.14 | 0.17 | 1.67 | 71.43 | 0.10 | 2.30 |
| 14 | -1.34% | 112.88 | 0.6348 | 71.66 | 0.5% | 5.3% | 5.9% | 21.58 | 94.38 | 93.25 | 1.14 | 0.010 | 0.36 | 0.3472 | 0.000 | 0.000 | 0.016 | 1.518 | 0.024 | 0.04 | 0.11 | 0.11 | 0.15 | 0.06 | 0.16 | 0.00 | 0.22 | 74.60 | (0.53) | 0.97 | 70.60 | (0.83) | 1.41 |
| 15 | -7.49% | 104.42 | 0.6237 | 65.12 | 0.5% | 5.3% | 5.9% | 21.87 | 88.16 | 87.00 | 1.17 | 0.011 | 0.33 | 0.3771 | 0.000 | 0.000 | 0.017 | 1.544 | 0.026 | 0.03 | 0.11 | 0.09 | 0.15 | 0.05 | 0.17 | 0.01 | 0.23 | 73.40 | (1.20) | 0.30 | 68.85 | (1.75) | 0.53 |
| 16 | 2.08% | 106.59 | 0.6119 | 65.22 | 0.5% | 5.3% | 5.9% | 22.16 | 88.64 | 87.38 | 1.26 | 0.012 | 0.24 | 0.3804 | 0.001 | 0.000 | 0.017 | 1.570 | 0.026 | 0.03 | 0.11 | 0.10 | 0.14 | 0.04 | 0.17 | 0.02 | 0.23 | 73.16 | (0.24) | 1.26 | 68.36 | (0.49) | 1.83 |
| 17 | 12.77% | 120.20 | 0.6024 | 72.42 | 0.5% | 5.3% | 5.9% | 22.46 | 96.01 | 94.87 | 1.13 | 0.009 | 0.37 | 0.3551 | 0.000 | 0.000 | 0.016 | 1.595 | 0.025 | 0.04 | 0.11 | 0.13 | 0.15 | 0.06 | 0.18 | 0.00 | 0.24 | 74.05 | 0.89 | 2.39 | 69.43 | 1.07 | 3.43 |
| 18 | 4.47% | 125.58 | 0.5935 | 74.53 | 0.5% | 5.3% | 5.9% | 22.76 | 98.41 | 97.29 | 1.12 | 0.009 | 0.38 | 0.3509 | 0.000 | 0.000 | 0.015 | 1.620 | 0.025 | 0.04 | 0.12 | 0.14 | 0.16 | 0.06 | 0.18 | 0.00 | 0.25 | 74.21 | 0.16 | 1.66 | 69.51 | 0.08 | 2.47 |
| 19 | -1.68% | 123.47 | 0.5843 | 72.15 | 0.5% | 5.3% | 5.9% | 23.06 | 96.34 | 95.21 | 1.13 | 0.009 | 0.37 | 0.3633 | 0.000 | 0.000 | 0.016 | 1.645 | 0.025 | 0.04 | 0.12 | 0.14 | 0.16 | 0.06 | 0.19 | 0.00 | 0.25 | 73.66 | (0.55) | 0.95 | 68.59 | (0.92) | 1.51 |
| 20 | 7.89% | 133.22 | 0.5715 | 76.13 | 0.5% | 5.3% | 5.9% | 23.37 | 101.21 | 99.50 | 1.71 | 0.013 | 0.30 | 0.4722 | 0.001 | 0.000 | 0.020 | 1.678 | 0.033 | 0.03 | 0.12 | 0.23 | 0.15 | 0.05 | 0.20 | 0.04 | 0.29 | 73.87 | 0.21 | 2.22 | 68.62 | 0.03 | 3.34 |

FIGURE 24A

Distribution and Accounting Analysis (Continued from Previous Page)

| qtr | underlying assets | | | | STRIPS | | | distributions | | | | URP units | | | | tax | | | | | | | | gaap | | | | | URP total units | | |
|---|---|---|---|---|---|---|---|---|---|---|---|---|---|---|---|---|---|---|---|---|---|---|---|---|---|---|---|---|---|---|---|
| | growth | price | shares # | value | div | rate | fwd | fwd | NAV pre | NAV post | sh dist # | div $ | per unit USGS reqd | shares sold | shares bought | total units paid | compounded total | new | cash electors div inc | STRIP share old | sales | tax | URP elector div inc | STRIP share old | sales | tax | cash 1 unit am cost | change | income | am cost | change | income |
|---|---|---|---|---|---|---|---|---|---|---|---|---|---|---|---|---|---|---|---|---|---|---|---|---|---|---|---|---|---|---|---|---|
| 21 | 13.83% | 151.63 | 0.5000 | 75.82 | 0.5% | 5.3% | 5.9% | 23.68 | 110.34 | 99.50 | 10.84 | 0.071 | 2.6832 | 0.015 | 0.000 | 0.113 | 1.868 | 0.190 | 0.05 | 0.12 | 1.76 | 0.17 | 0.08 | 0.20 | 0.61 | 0.89 | 67.83 | (6.04) | 5.23 | 57.25 | (11.37) | 7.55 |
| 22 | 5.53% | 160.01 | 0.4718 | 75.50 | 0.5% | 5.3% | 5.9% | 24.00 | 104.01 | 99.50 | 4.51 | 0.028 | 0.43 | 1.1839 | 0.005 | 0.000 | 0.049 | 1.960 | 0.092 | 0.04 | 0.12 | 0.78 | 0.16 | 0.08 | 0.23 | 0.25 | 0.56 | 65.81 | (2.02) | 2.89 | 52.61 | (4.64) | 4.53 |
| 23 | -0.62% | 159.01 | 0.4648 | 73.90 | 0.5% | 5.3% | 5.9% | 24.33 | 99.35 | 98.23 | 1.12 | 0.007 | 0.40 | 0.3715 | 0.000 | 0.000 | 0.015 | 1.990 | 0.030 | 0.04 | 0.12 | 0.19 | 0.16 | 0.08 | 0.24 | 0.00 | 0.32 | 65.49 | (0.32) | 1.18 | 51.87 | (0.74) | 2.20 |
| 24 | 8.95% | 173.24 | 0.4320 | 74.85 | 0.5% | 5.3% | 5.9% | 24.65 | 105.17 | 99.50 | 5.67 | 0.033 | 0.38 | 1.4815 | 0.007 | 0.000 | 0.060 | 2.110 | 0.119 | 0.03 | 0.13 | 1.05 | 0.16 | 0.07 | 0.25 | 0.43 | 0.75 | 63.38 | (2.11) | 3.87 | 46.19 | (5.68) | 6.22 |
| 25 | 4.31% | 180.71 | 0.4123 | 74.51 | 0.5% | 5.3% | 5.9% | 24.99 | 103.06 | 99.50 | 3.56 | 0.020 | 0.31 | 0.9927 | 0.003 | 0.000 | 0.040 | 2.194 | 0.084 | 0.04 | 0.13 | 0.69 | 0.17 | 0.09 | 0.27 | 0.24 | 0.60 | 62.15 | (1.23) | 2.72 | 42.54 | (3.64) | 4.70 |
| 26 | -3.99% | 173.51 | 0.4057 | 70.40 | 0.5% | 5.3% | 5.9% | 25.33 | 96.87 | 95.73 | 1.14 | 0.007 | 0.39 | 0.3968 | 0.000 | 0.000 | 0.016 | 2.228 | 0.034 | 0.04 | 0.13 | 0.21 | 0.17 | 0.08 | 0.28 | 0.02 | 0.38 | 61.33 | (0.82) | 0.68 | 40.90 | (1.64) | 1.65 |
| 27 | -10.14% | 155.93 | 0.3982 | 62.08 | 0.5% | 5.3% | 5.9% | 25.67 | 88.93 | 87.75 | 1.18 | 0.008 | 0.36 | 0.4388 | 0.001 | 0.000 | 0.017 | 2.266 | 0.038 | 0.03 | 0.13 | 0.20 | 0.16 | 0.07 | 0.29 | 0.05 | 0.41 | 59.44 | (1.89) | (0.39) | 37.43 | (3.47) | (0.13) |
| 28 | -0.57% | 155.05 | 0.3899 | 60.45 | 0.5% | 5.3% | 5.9% | 26.02 | 87.75 | 86.47 | 1.28 | 0.008 | 0.32 | 0.4513 | 0.002 | 0.000 | 0.017 | 2.305 | 0.039 | 0.02 | 0.13 | 0.21 | 0.16 | 0.05 | 0.30 | 0.09 | 0.44 | 59.07 | (0.38) | 1.12 | 36.39 | (1.04) | 2.36 |
| 29 | 12.77% | 174.85 | 0.3833 | 67.01 | 0.5% | 5.3% | 5.9% | 26.37 | 94.54 | 93.38 | 1.16 | 0.007 | 0.22 | 0.4236 | 0.000 | 0.000 | 0.016 | 2.342 | 0.037 | 0.04 | 0.14 | 0.22 | 0.17 | 0.08 | 0.31 | 0.04 | 0.43 | 60.72 | 1.65 | 3.15 | 38.81 | 2.42 | 5.88 |
| 30 | 4.47% | 182.67 | 0.3770 | 68.86 | 0.5% | 5.3% | 5.9% | 26.73 | 96.74 | 95.59 | 1.15 | 0.006 | 0.34 | 0.4195 | 0.000 | 0.000 | 0.016 | 2.379 | 0.037 | 0.04 | 0.14 | 0.22 | 0.17 | 0.09 | 0.32 | 0.03 | 0.44 | 61.20 | 0.48 | 1.98 | 39.29 | 0.48 | 4.00 |
| 31 | -1.66% | 179.60 | 0.3705 | 66.54 | 0.5% | 5.4% | 6.0% | 27.10 | 94.80 | 93.64 | 1.16 | 0.006 | 0.35 | 0.4341 | 0.001 | 0.000 | 0.016 | 2.417 | 0.038 | 0.04 | 0.14 | 0.22 | 0.17 | 0.08 | 0.33 | 0.04 | 0.46 | 60.75 | (0.46) | 1.04 | 38.12 | (1.18) | 2.39 |
| 32 | 7.89% | 193.77 | 0.3641 | 70.56 | 0.5% | 5.4% | 6.0% | 27.47 | 99.26 | 98.03 | 1.23 | 0.006 | 0.34 | 0.4203 | 0.001 | 0.000 | 0.015 | 2.454 | 0.037 | 0.03 | 0.14 | 0.25 | 0.17 | 0.07 | 0.34 | 0.07 | 0.48 | 61.81 | 1.06 | 2.56 | 39.69 | 1.58 | 5.20 |
| 33 | 5.68% | 204.78 | 0.3499 | 71.65 | 0.5% | 5.4% | 6.0% | 27.85 | 102.42 | 99.50 | 2.92 | 0.014 | 0.27 | 0.9203 | 0.003 | 0.000 | 0.033 | 2.535 | 0.081 | 0.04 | 0.14 | 0.62 | 0.18 | 0.10 | 0.35 | 0.28 | 0.73 | 61.47 | (0.34) | 2.95 | 37.49 | (2.20) | 5.87 |
| 34 | 2.26% | 209.42 | 0.3403 | 71.27 | 0.5% | 5.4% | 6.0% | 28.23 | 101.50 | 99.50 | 2.00 | 0.010 | 0.37 | 0.6724 | 0.001 | 0.000 | 0.024 | 2.595 | 0.060 | 0.04 | 0.15 | 0.43 | 0.18 | 0.10 | 0.37 | 0.17 | 0.63 | 61.19 | (0.28) | 2.09 | 35.97 | (1.52) | 4.49 |
| 35 | -3.89% | 201.28 | 0.3346 | 67.34 | 0.5% | 5.4% | 6.0% | 28.62 | 97.12 | 95.96 | 1.16 | 0.006 | 0.34 | 0.4473 | 0.001 | 0.000 | 0.016 | 2.636 | 0.041 | 0.04 | 0.15 | 0.24 | 0.18 | 0.09 | 0.38 | 0.06 | 0.53 | 60.37 | (0.82) | 0.68 | 34.00 | (1.98) | 1.92 |
| 36 | 10.56% | 222.54 | 0.3168 | 70.49 | 0.5% | 5.4% | 6.0% | 29.01 | 103.47 | 99.50 | 3.97 | 0.018 | 0.28 | 1.2394 | 0.004 | 0.000 | 0.043 | 2.748 | 0.112 | 0.03 | 0.15 | 0.88 | 0.18 | 0.08 | 0.39 | 0.56 | 1.03 | 60.37 | 0.00 | 4.26 | 31.51 | (2.48) | 8.72 |
| 37 | 5.66% | 235.14 | 0.2981 | 70.09 | 0.5% | 5.4% | 6.0% | 29.41 | 103.89 | 99.50 | 4.39 | 0.019 | 0.37 | 1.4083 | 0.004 | 0.000 | 0.048 | 2.880 | 0.131 | 0.04 | 0.15 | 1.01 | 0.19 | 0.11 | 0.42 | 0.65 | 1.18 | 59.36 | (1.02) | 3.75 | 26.32 | (5.19) | 7.90 |
| 38 | -8.79% | 214.47 | 0.2926 | 62.75 | 0.5% | 5.4% | 6.0% | 29.82 | 93.75 | 92.57 | 1.18 | 0.006 | 0.32 | 0.4832 | 0.001 | 0.000 | 0.016 | 2.926 | 0.047 | 0.03 | 0.15 | 0.26 | 0.19 | 0.10 | 0.44 | 0.10 | 0.64 | 57.63 | (1.73) | (0.23) | 22.29 | (4.03) | 0.29 |
| 39 | -2.64% | 208.82 | 0.2868 | 59.90 | 0.5% | 5.4% | 6.0% | 30.23 | 91.33 | 90.13 | 1.19 | 0.006 | 0.31 | 0.5031 | 0.001 | 0.000 | 0.017 | 2.975 | 0.049 | 0.03 | 0.16 | 0.26 | 0.19 | 0.09 | 0.46 | 0.12 | 0.67 | 57.01 | (0.62) | 0.88 | 20.49 | (1.80) | 2.59 |
| 40 | 0.78% | 210.45 | 0.2807 | 59.08 | 0.5% | 5.4% | 6.0% | 30.65 | 91.02 | 89.73 | 1.29 | 0.006 | 0.21 | 0.5124 | 0.001 | 0.000 | 0.017 | 3.025 | 0.050 | 0.02 | 0.16 | 0.28 | 0.18 | 0.07 | 0.47 | 0.19 | 0.73 | 56.99 | (0.03) | 1.47 | 19.90 | (0.59) | 3.87 |

Retrospective Accounting Analysis (Continued from Previous Page)

| irr formula plug rate | 2.00% | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|
| irr est full term | 0.86% | 1.06% | 1.15% | 1.15% | 1.29% | 1.34% | 1.29% | 1.19% | 1.17% | 1.19% | 1.27% | 1.30% | 1.28% | 1.34% | 1.40% | 1.39% | 1.34% | 1.36% | 1.45% | 1.48% | 1.48% | 1.54% | 1.74% | 1.82% | 1.82% | 1.93% | 1.99% | 1.96% | 1.91% | 1.91% |
| amortized cost | $100.00 | $89.38 | $85.34 | $84.82 | $79.98 | $78.23 | $77.52 | $76.38 | $75.70 | $75.85 | $75.59 | $74.90 | $74.97 | $75.14 | $74.60 | $73.40 | $73.16 | $74.05 | $74.21 | $73.66 | $73.87 | $67.83 | $65.81 | $65.49 | $63.38 | $62.15 | $61.33 | $59.44 | $59.07 |

| end of period | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
|---|---|---|---|---|---|---|---|---|---|---|---|---|---|---|---|---|---|---|---|---|---|---|---|---|---|---|---|---|---|
| 31 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 32 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 33 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 34 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 35 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 36 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 37 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 38 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 39 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 40 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 41 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 42 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 43 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 44 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 45 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 46 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 47 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 48 | | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 49 | | 1.50 | 1.50 | 1.50 | 1.50 | 1.50 | 1.50 | 1.50 | 1.06 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 50 | | 1.50 | 1.50 | 1.50 | 1.50 | 1.50 | 1.50 | 1.50 | 0.00 | 0.10 | 0.16 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 51 | | 1.50 | 1.50 | 1.50 | 1.50 | 1.50 | 1.50 | 0.19 | 0.00 | 0.00 | 0.00 | 1.25 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 52 | | 1.50 | 1.50 | 1.50 | 1.50 | 1.50 | 1.50 | 0.00 | 0.00 | 0.00 | 0.00 | 0.00 | 1.25 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 53 | | 1.50 | 1.50 | 1.50 | 1.50 | 1.50 | 1.14 | 0.00 | 0.00 | 0.00 | 0.00 | 0.00 | 0.00 | 0.05 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 54 | 0.59 | 1.50 | 1.50 | 1.50 | 1.39 | 0.00 | 0.00 | 0.00 | 0.00 | 0.00 | 0.00 | 0.00 | 0.00 | 0.00 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 55 | 0.00 | 0.61 | 1.50 | 0.18 | 0.00 | 0.00 | 0.00 | 0.00 | 0.00 | 0.00 | 0.00 | 0.00 | 0.00 | 0.00 | 1.50 | 1.50 | 1.50 | 1.50 | 1.50 | 1.50 | 1.50 | 1.50 | 1.50 | 1.50 | 1.50 | 1.50 | 1.50 | 1.50 | 1.50 |
| 56 | 0.00 | 0.00 | 0.28 | 0.00 | 0.00 | 0.00 | 0.00 | 0.00 | 0.00 | 0.00 | 0.00 | 0.00 | 0.00 | 0.00 | 1.50 | 1.13 | 1.32 | 1.50 | 1.50 | 1.50 | 1.50 | 1.50 | 1.50 | 1.50 | 1.50 | 1.50 | 1.50 | 1.50 | 1.50 |
| 57 | 0.00 | 0.00 | 0.00 | 0.00 | 0.00 | 0.00 | 0.00 | 0.00 | 0.00 | 0.00 | 0.00 | 0.00 | 0.00 | 0.00 | 1.50 | 0.00 | 0.00 | 1.50 | 1.50 | 1.50 | 1.50 | 1.50 | 1.50 | 1.50 | 1.50 | 1.50 | 1.50 | 1.50 | 1.50 |
| 58 | 0.00 | 0.00 | 0.00 | 0.00 | 0.00 | 0.00 | 0.00 | 0.00 | 0.00 | 0.00 | 0.00 | 0.00 | 0.00 | 0.00 | 1.50 | 0.00 | 0.00 | 1.50 | 1.50 | 1.50 | 1.50 | 1.50 | 1.50 | 1.50 | 1.50 | 1.50 | 1.50 | 1.50 | 1.50 |
| 59 | 0.00 | 0.00 | 0.00 | 0.00 | 0.00 | 0.00 | 0.00 | 0.00 | 0.00 | 0.00 | 0.00 | 0.00 | 0.00 | 0.00 | 1.50 | 0.00 | 0.00 | 1.50 | 1.50 | 1.50 | 1.50 | 1.50 | 1.50 | 1.50 | 1.50 | 1.50 | 1.50 | 1.50 | 1.50 |
| 60 | 0.00 | 0.00 | 0.00 | 0.00 | 0.00 | 0.00 | 0.00 | 0.00 | 0.00 | 0.00 | 0.00 | 0.00 | 0.00 | 0.00 | 1.50 | 0.00 | 0.00 | 1.50 | 1.50 | 1.50 | 1.50 | 1.50 | 1.50 | 1.50 | 1.50 | 1.50 | 1.50 | 1.50 | 1.50 |

FIGURE 24D

Retrospective Accounting Analysis (Continued from Previous Page)

| irr formula plug rate | 2.00% | 1.06% | 1.15% | 1.15% | 1.29% | 1.34% | 1.29% | 1.19% | 1.17% | 1.27% | 1.30% | 1.28% | 1.34% | 1.40% | 1.39% | 1.34% | 1.36% | 1.45% | 1.48% | 1.48% | 1.54% | 1.74% | 1.82% | 1.82% | 1.93% | 1.99% | 1.96% | 1.91% | 1.91% |
|---|---|---|---|---|---|---|---|---|---|---|---|---|---|---|---|---|---|---|---|---|---|---|---|---|---|---|---|---|---|
| irr est full term | 0.86% | | | | | | | | | | | | | | | | | | | | | | | | | | | | |
| amortized cost | $100.00 | $89.38 | $85.34 | $84.82 | $79.98 | $78.23 | $77.52 | $76.38 | $75.70 | $75.85 | $75.59 | $74.90 | $74.97 | $75.14 | $74.60 | $73.40 | $73.16 | $74.05 | $74.21 | $73.66 | $73.87 | $67.83 | $65.81 | $65.49 | $63.38 | $62.15 | $61.33 | $59.44 | $59.07 |
| end of period | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| 61 | | 0.00 | 0.00 | 0.00 | 0.00 | 0.00 | 0.00 | 0.00 | 0.00 | 0.00 | 0.00 | 0.00 | 0.00 | 0.00 | 1.50 | 1.50 | 0.00 | 1.50 | 1.50 | 1.50 | 1.50 | 1.50 | 1.50 | 1.50 | 1.50 | 1.50 | 1.50 | 1.50 | 1.50 |
| 62 | | 0.00 | 0.00 | 0.00 | 0.00 | 0.00 | 0.00 | 0.00 | 0.00 | 0.00 | 0.00 | 0.00 | 0.00 | 0.00 | 0.71 | 0.08 | 0.00 | 1.50 | 1.50 | 1.50 | 1.50 | 1.50 | 1.50 | 1.50 | 1.50 | 1.50 | 1.50 | 1.50 | 1.50 |
| 63 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 1.50 | 1.50 | 1.50 | 1.50 | 1.50 | 1.50 | 1.50 | 1.50 | 1.50 | 1.50 | 1.50 | 1.50 |
| 64 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 1.50 | 1.50 | 1.50 | 1.50 | 1.50 | 1.50 | 1.50 | 1.50 | 1.50 | 1.50 | 1.50 | 1.50 |
| 65 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | .84 | 1.50 | 1.50 | 1.50 | 1.50 | 1.50 | 1.50 | 1.50 | 1.50 | 1.50 | 1.50 | 1.50 |
| 66 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 1.45 | 1.50 | 1.50 | 1.50 | 1.50 | 1.50 | 1.50 | 1.50 | 1.50 | 1.50 | 1.50 |
| 67 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.57 | 1.50 | 1.50 | 1.50 | 1.50 | 1.50 | 1.50 | 1.50 | 1.50 | 1.50 |
| 68 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.05 | 1.24 | 1.50 | 1.50 | 1.50 | 1.50 | 1.50 | 1.50 | 1.50 |
| 69 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.83 | 1.50 | 1.50 | 1.50 | 1.50 | 1.09 | 1.05 |
| 70 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.73 | 1.50 | 1.50 | 1.50 | 0.00 | 0.00 |
| 71 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.27 | 1.50 | 0.32 | 0.00 | 0.00 |
| 72 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 1.43 | 0.00 | 0.00 | 0.00 |
| 73 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 74 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 75 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 76 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 77 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 78 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 79 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 80 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 81 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 82 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 83 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 84 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 85 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 86 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 87 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 88 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 89 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 90 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |

FIGURE 24E

Retrospective Accounting Analysis (Continued from Previous Page)

| ir formula plug rate | 2.00% | 1.06% | 1.15% | 1.15% | 1.29% | 1.34% | 1.29% | 1.19% | 1.17% | 1.27% | 1.30% | 1.28% | 1.34% | 1.40% | 1.39% | 1.34% | 1.36% | 1.36% | 1.45% | 1.48% | 1.48% | 1.54% | 1.74% | 1.82% | 1.82% | 1.93% | 1.99% | 1.96% | 1.91% | 1.91% |
|---|---|---|---|---|---|---|---|---|---|---|---|---|---|---|---|---|---|---|---|---|---|---|---|---|---|---|---|---|---|---|
| ir est full term | 0.86% | | | | | | | | | | | | | | | | | | | | | | | | | | | | | |
| amortized cost | $100.00 | $98.38 | $85.34 | $84.82 | $79.98 | $78.23 | $77.52 | $76.38 | $75.70 | $75.85 | $75.59 | $74.90 | $74.97 | $75.14 | $74.60 | $73.40 | $73.16 | $74.05 | $74.21 | $73.66 | $73.87 | $67.83 | $65.81 | $65.49 | $63.38 | $62.15 | $61.33 | $59.44 | $59.07 |
| end of period | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 |
| 91 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 92 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 93 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 94 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 95 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 96 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 97 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 98 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 99 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 100 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 101 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 102 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 103 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 104 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 105 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 106 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 107 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 108 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 109 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 110 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 111 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 112 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 113 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 114 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 115 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 116 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 117 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 118 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 119 | | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 | 0.00 |
| 120 | | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 | 100.00 |

FIGURE 24F

SYSTEM AND METHOD FOR ADMINISTERING PRINCIPAL PROTECTED EQUITY LINKED FINANCIAL INSTRUMENTS

FIELD OF THE INVENTION

The present invention relates to data processing systems and methods for managing financial instruments, including cash flows, such as dividends or coupons, associated with such instruments. More particularly, the invention relates to an integrated financial management system and method for managing and reporting on financial instruments that provide exposure to common stock in a manner designed to provide tax efficiencies, while at the same time protecting the principal.

BACKGROUND OF THE INVENTION

The securities and investment industry is concerned with the management of money through the purchase, sales, financing and combination of assets, which have, among other properties, security, earnings, or potential for gain in value. Such assets generally include stocks and bonds, along with other investment vehicles, such as options, futures, foreign currency exchange, funds, derivative instruments and others. Common stocks provide holders with an ownership interest in an entity and thereby an opportunity to share in the entity's appreciation. Over the course of the recent bull market, common stocks have provided attractive returns and because of that are favored by many investors. However, in certain situations direct ownership may not provide the most efficient way to obtain exposure to common stock because of tax and various regulatory considerations. For example, certain industries are limited as to the type of investment holdings they can have or are required to hold a large amount of regulatory capital against certain investments and thus in some cases may be constrained in their ability to gain exposure to common stock through direct ownership. In some cases it is not desirable to carry large equity holdings on the books, because of accounting constraints. The sale of highly-appreciated assets, on the other hand, is associated with significant tax liability. In addition, while stocks provide solid performance over long periods, it is generally desirable to reduce the short-term uncertainty of their investment returns, which is due to normal fluctuations in the stock price. This is especially important for long-term investors who are subject to an accounting regime that requires them to reflect unrealized short-term losses and gains.

As investment vehicles, bonds, especially high-quality bonds such the U.S. Treasury bonds, provide considerably higher security than stocks and feature steady and predictable income flow along with certain regulatory and accounting advantages. Especially in recent years, however, Treasury bonds have not generally demonstrated a potential for appreciation as common stocks did. In extended bull markets, such as that experienced in the past decade, this can lead to significant disadvantages in terms of the overall return on a given investment. It is thus apparent that selecting one investment vehicle over another in any particular situation can lead to very different results, and in any event should involve a careful balance of investment, tax and accounting considerations.

Financial institutions have created new instruments to re-engineer financial products to meet investors' tax, accounting and investment needs. One approach that has been used in the past is to contribute different assets to created trusts. This approach has been used to customize the character of their investment holdings. One example of financial products created on this basis are equity liked trusts ("ELTs"). Broadly, an ELT is a special-purpose investment vehicle that gives ownership interest in different equity/debt instruments and can provide certain desirable tax and accounting treatments. Prior art ELTs differ in some aspects, but often have a bond component that limits the downside potential, i.e., protects the principal, and an equity component that may take the form of a call option for realizing an upward potential. This combination is associated with certain accounting benefits, because from a capital perspective it is often preferable to own debt (i.e., to have interest in the ELT), as opposed to equity. However, ELTs generally have no redemption option, they generally don't make interim distributions, which limits their utility.

Another example of prior art financial instruments is provided by the equity linked notes ("ELN"). In general, ELNs are debt instruments issued by third parties giving equity exposure, sometimes via coupons, sometimes through indexation of principal, or other indexation. Thus, a coupon-linked instrument might be structured as a two-year principal-protected bond that pays upside on the S&P 500 index, but nothing if the S&P 500 index doesn't go up. Equity linked notes often trigger certain adverse tax and accounting consequences and, in any event, provide credit exposure to the issuer. A trust, on the other hand, often is structured to provide pass-through taxation and credit exposure only to the underlying assets.

Another structure that has been used is provided by the premium exchangeable participating shares, or "PEPS" introduced in 1995, or similar products known under the acronyms DELs, PRIDES or ACES. The PEPS trust is a short-term (3¼-year) trust established to purchase and hold a portfolio of stripped U.S. Treasury securities maturing on a quarterly basis, and American Depositary Shares (ADSS) representing shares of common stock of a Japanese company (in this case Amway Japan Limited). Holders of the PEPS have the right of quarterly distributions and at the end of the term could receive the underlying ADSS subject to certain downside potential conditions. While structurally PEPS are similar to, for example, ELTs it is important to note that they serve a completely different purpose, which is to get out of an investment position (i.e., to monetize an existing position), as opposed to obtain exposure to it. Further, PEPS have no redemption rights and provide no tax and accounting advantages as discussed below.

Other prior art products exist, but none of them provides all of the bundle of rights included in the ProEquity product of this invention. ProEquity was created to provide institutional investors (primarily insurance companies) with equity exposure in a tax-efficient and accounting-efficient manner, using a computerized reporting and management system.

In the following description of the preferred embodiments occasional reference is made to structures and terms that are known in the prior art. In this regard the interested reader is directed to the disclosure of the following U.S. patents, which are incorporated herein by reference for all purposes: U.S. Pat. Nos. 4,346,442; 4,674,044; 4,677,552; 4,823,265; 4,953,085; 5,038,284; 5,101,353; 5,126,936; 5,132,899; 5,189,608; 5,210,687; 5,227,967; 5,262,942; 5,270,922; 5,644,727; 5,682,466; 5,905,974 and 5,946,667.

SUMMARY OF THE INVENTION

It is an object of the present invention to provide an integrated financial management system and method for managing financial instruments. In a preferred embodiment, the system and method operate to initially create and then maintain one or more entities referred to herein as Principal Protected Equity Linked ("ProEquity$^{SM}$") trusts. In a preferred embodiment equity interests in these trusts are privately placed (under Section 4(2) of the Securities Act of 1933) with qualified investors. ProEquity is a service mark of Morgan Stanley Dean Witter & Co. Incorporated.

In a preferred embodiment, each ProEquity trust (a "Trust") owns U.S. Treasury STRIPS and shares of one large-cap issuer, and will issue units evidencing beneficial interest therein. As known in the art, STRIPS is an acronym for Separately Traded Registered Interest and Principal Securities, explained in more detail below. Each unit represents a beneficial interest in a single U.S. Government STRIP and a number of shares of underlying stock equal to the Share Ratio for the Trust. In a specific embodiment units are initially issued at a fixed dollar amount, such as $1,000 per unit, which corresponds to the sum of: (i) the value of a STRIP; (ii) the value of an underlying share times the Share Ratio and (iii) certain processing fees charged by the system administrator. In general, the value of a Trust unit changes over time based on interest rates and share price. Shares of underlying stock are distributed over time (or sold in exchange for cash) by the Trustee as payments on the units, which payments generally depend on the current value of the unit as compared with a predefined value threshold. At maturity, units are expected to return no less than the fixed principal amount per unit for the STRIPS, reflecting their fully accreted value. Further, at maturity all shares will have been distributed and a unit will reflect a Share Ratio of zero. All distributions on the underlying stock, upon receipt by the Trusts, are passed through to the unit holders. In a preferred embodiment, under a Unit Reinvestment Program (URP) administered by a Broker Dealer participating investors can have all distributions from the Trust reinvested in units of the same or different ProEquity Trusts. A system and method for creating and managing ProEquity Trusts are disclosed in the following embodiments.

One aspect the invention is a computer-based method for administering financial instruments, comprising the steps of: establishing a trust with trust units, each unit comprising a bond having a maturity date and one or more shares of a security, where the number of shares is defined as a share ratio and the unit par price is determined based on the values of the underlying bond and the shares of the security at a predetermined time; periodically determining the price of the trust units based on the share ratio for the period and the current values of the underlying bond and the shares of the security; comparing the determined price of the unit to a predetermined price; and making a distribution to unit holders based on the comparison.

In a different aspect, the present invention is a computer-based system for administering financial instruments, comprising: means for establishing a trust of fixed maturity ("the ProEquity Trust"), in which each ownership interest, represented by a unit, is comprised of a beneficial interest in the trust. The trust holds, in respect of each unit, a STRIP having a maturity date approximately equivalent to the maturity of the trust and common stock of a designated issuer, where the number of shares is defined as a share ratio and the net asset value of each unit (referred to as the "unit equity value" (UEV)) is determined based on the values of the underlying bond and the shares of the security at a predetermined time; means for periodically determining the price of the trust units based on the share ratio for the period and the current values of the underlying bond and the shares of the security; means for comparing the determined price of the unit to a predetermined price; and means for making a distribution to unit holders based on the comparison.

In another aspect, the present invention is a computer-based system for processing and supervising customer holdings in a trust, the system comprising: means for processing trade orders from customers, the trade orders identifying the customer account, the financial instrument, the number of units and a characterization of the trade; a database containing entries related to units of said at least one financial instrument and entries related to the customer accounts; a brokerage account means for executing received customer trade orders when said orders match entries in the database; and account update means for making, in accordance with a predefined payment formula, periodic payments to the customer accounts based on the current value of the financial instrument unit. In this aspect the invention can further comprise means for pricing information relating to the assets underlying the trust. In another aspect, the database stores information regarding the number of units in each trust, units held by each investor and the underlying beneficial interest in assets of each trust represented by the units, as well as each investor's aggregate holdings consolidated across all trusts managed by the system.

In another aspect, the invention is a system for generating investor reports regarding holdings in a trust, the reports comprising: units held per trust; unit equity value of the trust units, aggregate holdings in all trusts administered by the system, and distribution history and reinvestment, including any unit reinvestment program.

In yet another aspect, the invention is a computer-based method for valuing the return of an investment, comprising the steps of: selecting a security based on expectations for long-term capital appreciation; selecting a long-term bond issue having fixed maturity date and a predetermined face value; creating a trust having units, each unit comprising one of the selected long-term bonds and a predetermined number of shares of the selected security, said number of shares being defined as a share ratio, the trust being associated with an account administrator having access to information about the created trust and about customers' accounts indicating ownership interest in the trust units; periodically determining the value of the trust units using current market information about the underlying securities; comparing the determined current value of the trust units to a pre-set par value; and distributing excess value payments to said customer accounts based on the difference between the current unit value and the unit par value.

BRIEF DESCRIPTION OF THE DRAWINGS

The present invention is best understood with reference to the detailed disclosure and the following figures, in which:

FIGS. 23A, B, C, and D show models (spreadsheet summaries) used in various computations in a specific embodiment using a ProEquity Trust linked to XYZ stock. In particular, FIG. 23A is an initial contribution spreadsheet summary; FIG. 23B is an ongoing contribution spreadsheet summary; FIG. 23C is a cash payments spreadsheet summary; and FIG. 23D is a performance payment spreadsheet summary;

Figure 24C:
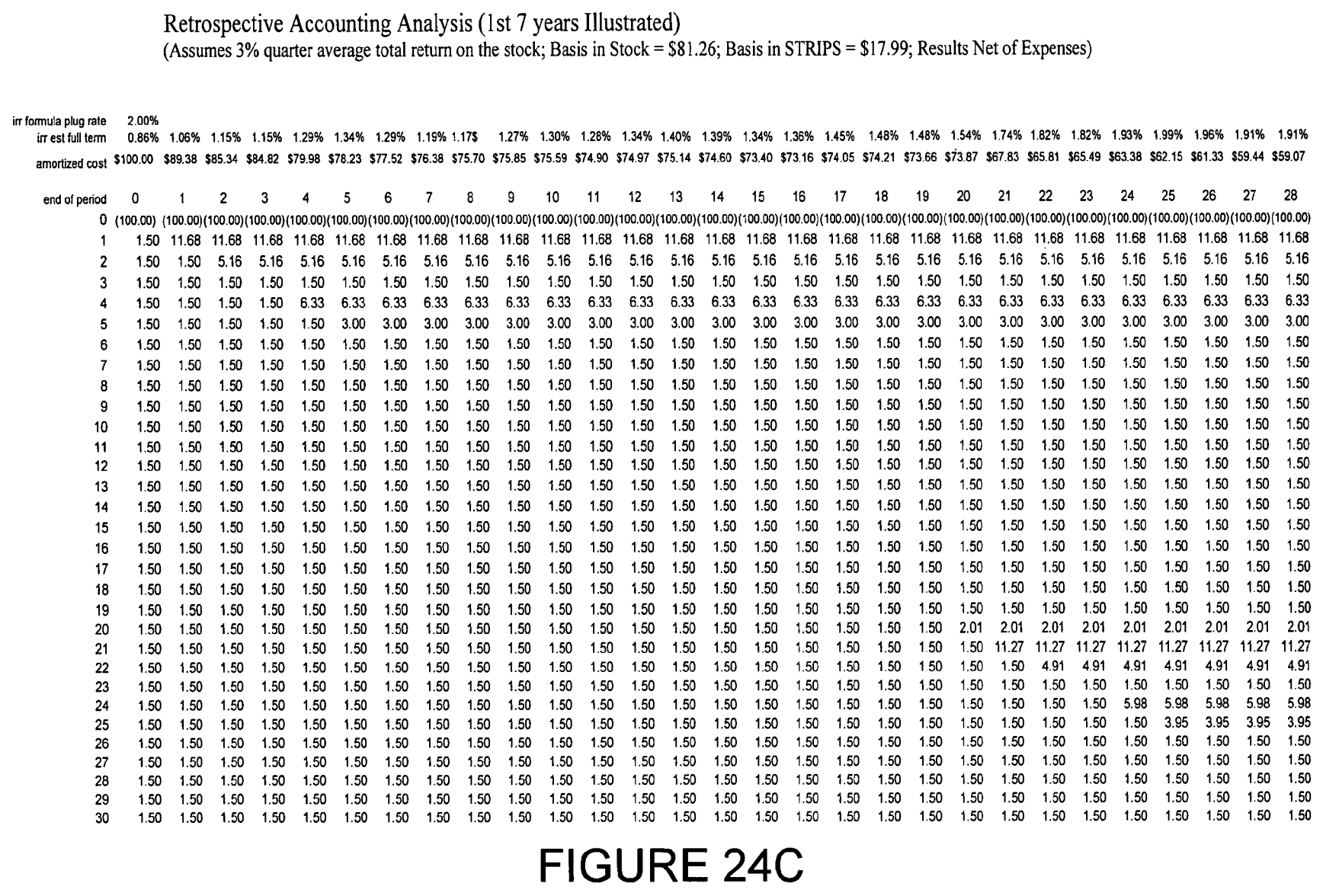

FIGS. 24A–F illustrates an economic model of the ProEquity financial instrument in accordance with the present invention, including Distribution and Accounting analysis assuming 3% quarter average total return on the stock, where the results are shown net of expenses.

DETAILED DESCRIPTION OF THE PREFERRED EMBODIMENTS

A. The Structure of a ProEquity Financial Product

Figure 1:
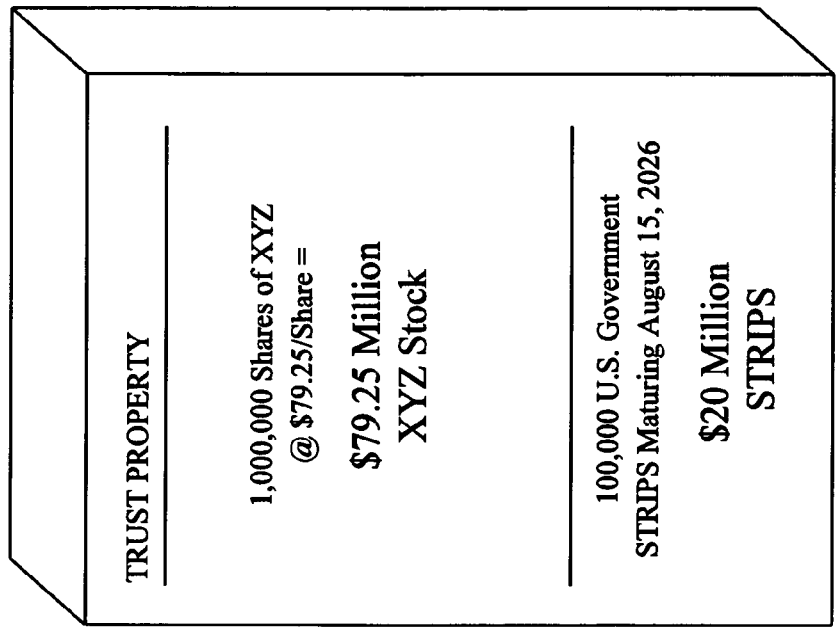
FIG. 1 is a schematic block diagram of the structure of a ProEquity Trust in a preferred embodiment of the invention.

The present invention is best understood with initial reference to the structure of the financial product of the invention, which is illustrated in a specific embodiment in FIG. 1.

As shown in FIG. 1, the financial instrument of the present invention is implemented as a Protected Equity Linked Trust (a "ProEquity Trust"), associated with XYZ company, preferably a large-cap issuer. In a preferred embodiment, each ProEquity Trust in accordance with the invention holds one long-dated U.S. Government STRIP and a number of shares of stock of XYZ company (referred to hereinafter as the Share Ratio) per (in this example) $1,000 par unit. STRIPS is an acronym for Separately Traded Registered Interest and Principal Securities. As known, a normal Treasury note or bond consists of a principal payment and interest payments. For example, a 30-year Treasury bond for $1,000 consists of 60 interest payments—one every six months for 30 years—and a principal payment of $1,000 when the bond matures. If this bond gets stripped of its interest (coupon) payments, it becomes a "zero-coupon" bond, i.e., a STRIP. The owner doesn't get paid any interest but buys the right to repayment of principal, $1,000, at a discount to the face value, which accretes to the face value at maturity.

In the embodiment illustrated in FIG. 1 the Trust property includes 1,000,000 shares of XYZ company, valued at $79.25/share (for a total of $79.25 Million) and 100,000 U.S. Government STRIPS with a long maturity date, such as 25–30 years from the perspective of the filing date, (in the specific example shown in FIG. 1 the maturity is selected as Aug. 15, 2026), valued at $20 Million. Accordingly, the Trust property (excluding possible administration fees charged by the manager of the system) at creation is $99.25 Million, with a Share Ratio=10 shares per unit, each having face value of $1,000.

In alternative embodiments of the invention the first component of the unit, broadly referred to as its bond component, can be an investment-grade corporate bond (such as a AAA-rated bond), or other long-term AAA-rated guarantee. Generally, in accordance with the invention discounted, long term, low-cost bonds are used that provide principal protection (with a strong credit rating), and at the same time keep the contribution of the bond component at the initiation of the trust relatively low. The equity component in the Trust may be common stock, an America Depositary Receipt (ADR) or a bundled fund-like or unit investment trust product or interest in a registered or unregistered investment company, or other equity security. It will also be appreciated that trusts with different Share Ratios and units having par value different from $1,000 can be used as well. Further, in a preferred embodiment the system can manage two or more trusts, each associated with a single, preferably large-cap stock.

In accordance with the preferred embodiment, units may be created or redeemed at any time by the trust through a Depositor Account. Units are redeemed through a Redemption Agent. Generally, units mature one day after the maturity of the STRIPS (or the bond) held in the ProEquity Trust. During the term of the Trust, units make (i) cash distributions based on share dividends and (ii) periodic, i.e., quarterly, distributions based on the underlying unit asset value (UAV), and subject to supplemental distributions, as explained in further detail below. In a preferred embodiment for use in the United States, ProEquity Trusts are structured as grantor trusts under the meaning of the U.S. Internal Revenue Code and related interpretation by the Internal Revenue Service and U.S. Department of Treasury, and are not actively managed for performance. Thus, according to one aspect of the invention, unit holders will have no ability to vote the underlying shares and will have no control over the management of the Trusts. These features of the preferred embodiment are expected to provide certain tax and accounting benefits under the existing regulatory regimes.

In accordance with the invention, some of the most important aspects of the Trust are its distribution(s). Broadly, distributions on ProEquity Trusts managed in accordance with this invention are designed to provide investors with the total return from both the dividend and appreciation components of the underlying equity.

In a preferred embodiment, ProEquity units make two types of distributions: (a) Current Cash Payments and (b) Quarterly Performance Payments. Current cash payments are paid in cash and are based on share dividends (ordinary and extraordinary) of the equity underlying the Trust. Performance payments made in accordance with the preferred embodiment are paid in shares of stock and are based on underlying asset appreciation, if any. In a specific implementation performance payments are paid quarterly.

In the event there is no underlying asset appreciation to support the above payments, in accordance with a specific embodiment, the Trust makes supplemental performance payments. Broadly, as long as a minimum share value remains in the Trust, and to the extent that the performance payment plus the cash payment is less than a predetermined dollar amount per unit (e.g., $15/unit), the performance payment will be increased to make up the difference. In particular, the Trust will add a "supplemental performance payment amount" to the performance payment amount if and to the extent that the sum, as determined on a performance determination date, of (i) the performance payment amount on this date, (ii) any cash payments and (iii) the value of any excess share distributions determined as of the date is less than a supplemental quarterly payment rate multiplied by the aggregate unit par amount as of such date. In a preferred embodiment, no supplemental performance payment amount is paid to the extent it would reduce the value of the equity portion of the Trust property below a particular amount (in a specific example to an amount less than 0.12% of the aggregate unit par amount of the units of the Trust as of the distribution date multiplied by the number of years remaining in the life of the Trust—where partial year periods are to be rounded up to the next higher whole number of years).

In accordance with another important aspect of the invention, unit holders can elect to have direct distribution or, in a preferred embodiment, participate in a Unit Reinvestment Program (URP) administered by the system of this invention. Participants in the URP will receive unit distributions in units and will not receive a return of the initially contributed shares and STRIPS.

Finally, in accordance with another aspect of the invention over the term of the Trust its Share Ratio is reduced due to the performance payments (or supplemental performance payments). Thus, in accordance with the present invention the value of units represented by bonds, such as the U.S. Government STRIPS, will increase toward 100% of par at maturity, thereby protecting and preserving the principal.

The operation of the ProEquity Trust created and administered in accordance with the present invention is further explained with reference to FIG. 2, which illustrates in a block diagram form cash and performance distributions made on the unit illustrated in FIG. 1 over a period of three months. As shown in the figure, performance payments are paid at a predetermined interval, i.e., quarterly, to the extent that quarter-end unit value exceeds a pre-set value, which is selected in this example as $995. As shown, in this embodiment the excess amount is distributed in the form of common shares as a performance payment.

Figure 2:
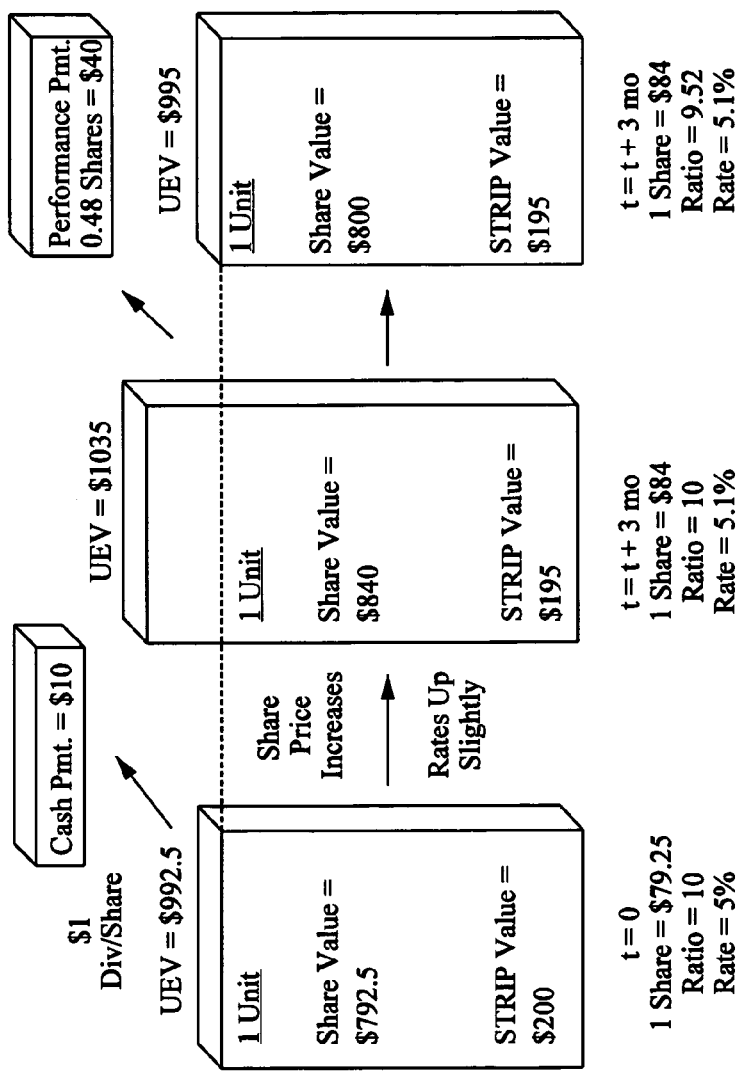
FIG. 2 illustrates in a block diagram form cash and performance distributions made on a ProEquity unit administered in accordance with this invention over a given period of time.

Specifically, in the example illustrated in FIG. 2, at time t=0 the unit has a Share Ratio=10 and Unit Equivalent Value (UEV)=$992.5 of which $792.5 is Share Value and $200 corresponds to STRIP value. As shown, if the share price increases over the next three months to $840, the Trust distributes a performance payment, the value of which corresponds to the increase of the UEV above the pre-set $995 value. In this example, 0.48 shares (at $84/share) are distributed as performance payment. With reference to FIG. 2 it should also be noted that if the rates have gone up (or down) at the end of the quarter the value of the STRIP is adjusted accordingly by the system. Importantly, because of the performance payment at time t=t+3 months the Share Ratio for the unit is reduced (in this example to 9.52). To the extent that the performance payment plus the cash payment is less than $15/unit (an example not illustrated in FIG. 2), the performance payment will be increased to make up the difference. Examples of the administration of the distribution program are discussed below and are illustrated in the model shown in FIGS. 24A–F. In a preferred embodiment, users of the system and customers are provided with detailed and consolidated reports regarding the units, their components, unit distributions and any trade activity.

Based on the above, the ProEquity financial instrument of the present invention has the following characteristics:

(a) its assets comprise the actual stock position (as opposed to a synthetic position such as a call option) for the equity component, which could result in a tax-free purchase when units are created using asset contribution. This feature of the product may enable investors to take stock ownership out from their books without recognizing tax;

(b) qualified investors can purchase ProEquity units (on a private placement basis) by contributing the underlying asset components (i.e., STRIPS and shares of common stock) or cash, or a suitable combination thereof, and is thus very flexible from the perspective of investors having different holdings;

(c) ProEquity units have periodic distributions which can take different forms, i.e., cash, shares of stock, or other ProEquity units;

(d) a distribution reinvestment mechanism is available that helps provide sale treatment for contributed assets (from an accounting perspective) but in a tax-efficient manner;

(e) long-dated bond exposure is provided, which tends to minimize the bond component (and in turn increases the contribution of the stock component);

(f) ProEquity units can be redeemed, or optionally resold privately to qualified investors in compliance with securities laws;

(g) integrated and consolidated customer reporting is provided.

The above structure and characteristics of the financial instrument are believed to provide the following features that differentiate it, alone or in combination, from other instruments known in the art: returns based on underlying equity; lower risk based capital ("RBC") charges for insurance company investors, at least in the context of the insurance industry; quarterly distributions based on total return; ability to generate ordinary income from future unrealized gains; opportunity to lock-in statutory surplus for insurance company investors; flexibility to efficiently manage equity exposure on a stock-by-stock basis; tax-free purchase and tax-efficient ownership; and ability to redeem, among others.

B. The Method of the Present Invention

Section A above broadly identifies the structure of the ProEquity financial product in accordance with a preferred embodiment of the present invention. Following is a description of the general method used in a preferred embodiment for the creation, management and redemption of ProEquity Trust units.

a) Unit Creation

In accordance with this invention, investors acquire units at the initial offering and during the term of any ProEquity Trust by contributing assets. The assets may be ones that have been held for a period of time by the investors, or may be purchased by a Broker Dealer for the investor expressly for the purpose of investing in a ProEquity Trust. In a specific embodiment, investors do this by contributing one bond, i.e., a STRIP, and the number of shares equal to the current Share Ratio, for as many units as they seek to create, to their ProEquity Account. In addition, to offset administration fees the investor must deposit an amount of cash equal to the deposit fee set by the Trust. In one embodiment, the process of investing in a ProEquity Trust comprises the following steps:

(a) identify shares for contribution to the ProEquity Trusts being offered, including current holdings and newly purchased shares;

(b) acquire STRIPS corresponding to selected ProEquity Trusts and rebalance fixed income portfolio to accommodate long-term STRIPS;

(c) deposit shares, STRIPS and Deposit Fee into a ProEquity Broker Dealer Account managed by the system of this invention prior to the initial offering date;

(d) execute a Unit Reinvestment Program (URP) agreement prior to offering date to support legal true sale treatment of shares and STRIPS (if such treatment is desired); (it will be appreciated that this step of the method is optional).

On the initial offering date, the Broker Dealer deposits shares and STRIPS in the established ratio into the Trust and the Trust will issue ProEquity units to investors. It will be appreciated that in a specific embodiment units created on the initial offering date may be subject to a reduced Deposit Fee.

Figure 3:
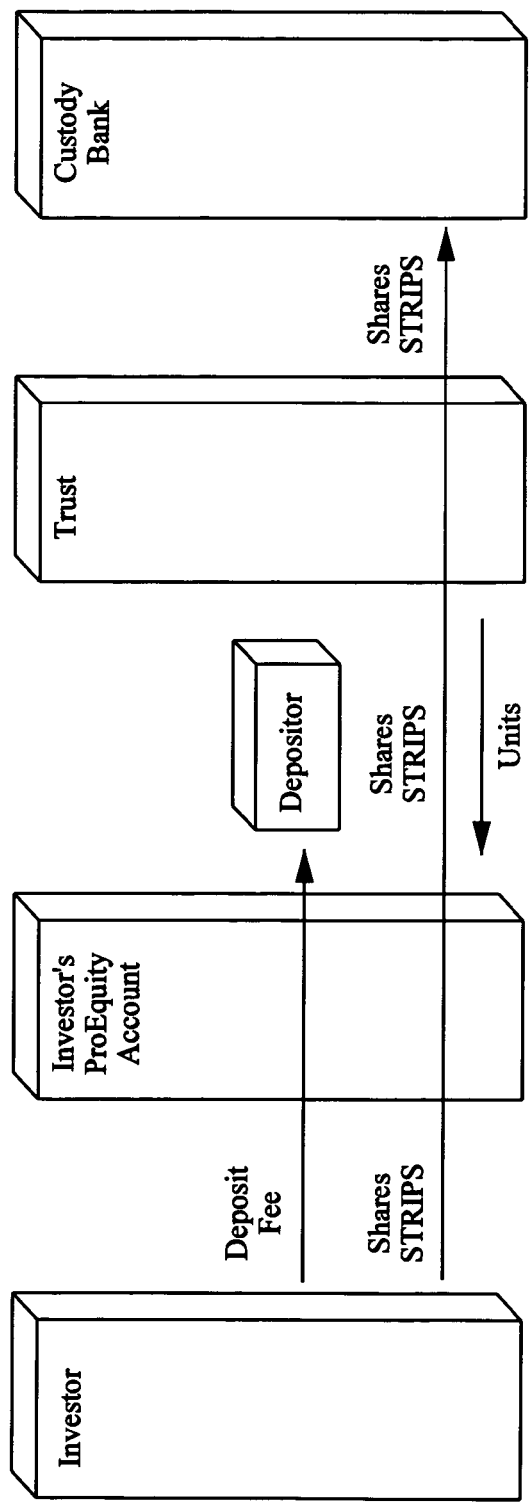
FIG. 3 illustrates the creation of a ProEquity trust unit in accordance with a specific embodiment of this invention.

FIG. 3 illustrates the creation of units in a specific embodiment of this invention. As shown in the figure, the investor deposits through a Depositor a combination of STRIPS and shares into the Trust. At the same time the a deposit fee is paid to a Depositor. In exchange for the STRIPS, shares and deposit fee, the Trust issues the proper number of units which are credited to the investor's ProEquity account. It will be appreciated that in alternate embodiments of the present invention the creation of units can be done by contributing cash.

To create a ProEquity Trust in accordance with the invention the following steps are taken (where for simplicity various regulatory requirements are omitted). First, it is necessary to compute the total number of Trust units by dividing the total Trust assets by the par value for a unit. Next, for a given share price is computed the exact number of shares of the stock required for the establishment of the Trust. At the following step is computed a deposit fee to be charged to clients in accordance with a predefined schedule (i.e., by multiplying the number of units times the per-unit fee). The deposit fee is withheld at this point and any fractional cash is returned to the investors. At this stage the system can compute the initial Share Ratio for the Trust. Fractional shares remaining to individual clients are combined in a preferred embodiment and used to generate additional Units. Once the total number of Units is established, the clients are issued their respective number of Units based on their proportionate asset contributions. It will be appreciated that this process is advantageously programmed for execution on a computer and is thus transparent to the users. It will be appreciated that the above steps can be performed when the system administrator has lined up sufficient number of clients with assets required to set up the Trust. It should further be noted that in accordance with the invention the Trust, the ProEquity accounts manager, the depositor and the custodian (as illustrated in FIG. 3) need not be part of a single system and may be grouped in different embodiments as dictated by the most efficient management of the assets, and applicable regulatory requirements, as known in the art. Unit creation in accordance with the invention is also discussed in Section D below, and is illustrated in FIG. 23A (in the case of initial contribution) and FIG. 23B (in the case of on-going contributions).

Figure 5A:
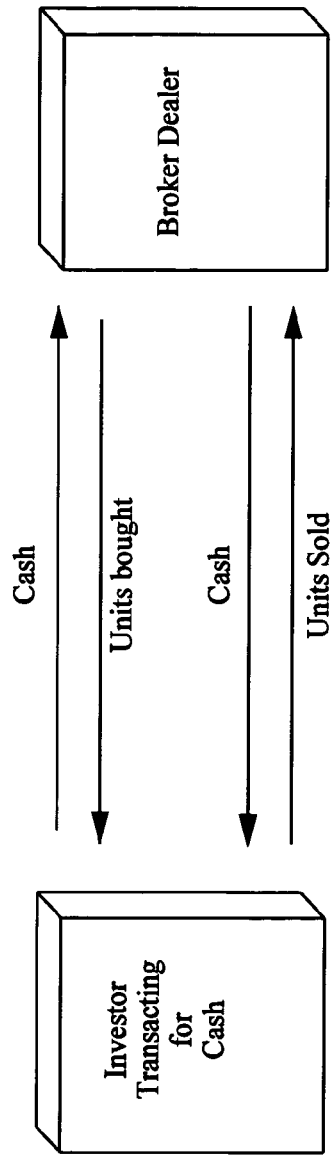
FIGS. 5A and 5B together illustrate the process for creation of trust units created and managed in accordance with the present invention.
Figure 5B:
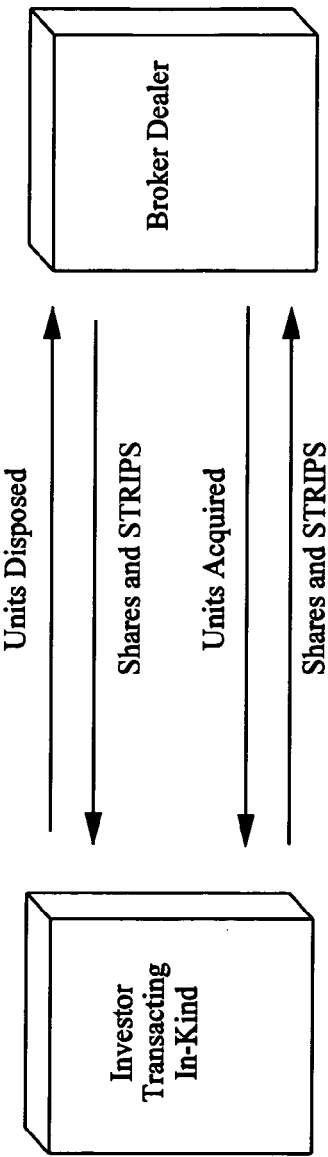

Cash and in-kind transactions between the investor and an eligible Broker Dealer, including unit creation, are illustrated in specific embodiments of the invention in FIGS. 5A and 5B.

b) Unit Redemption

Figure 4:
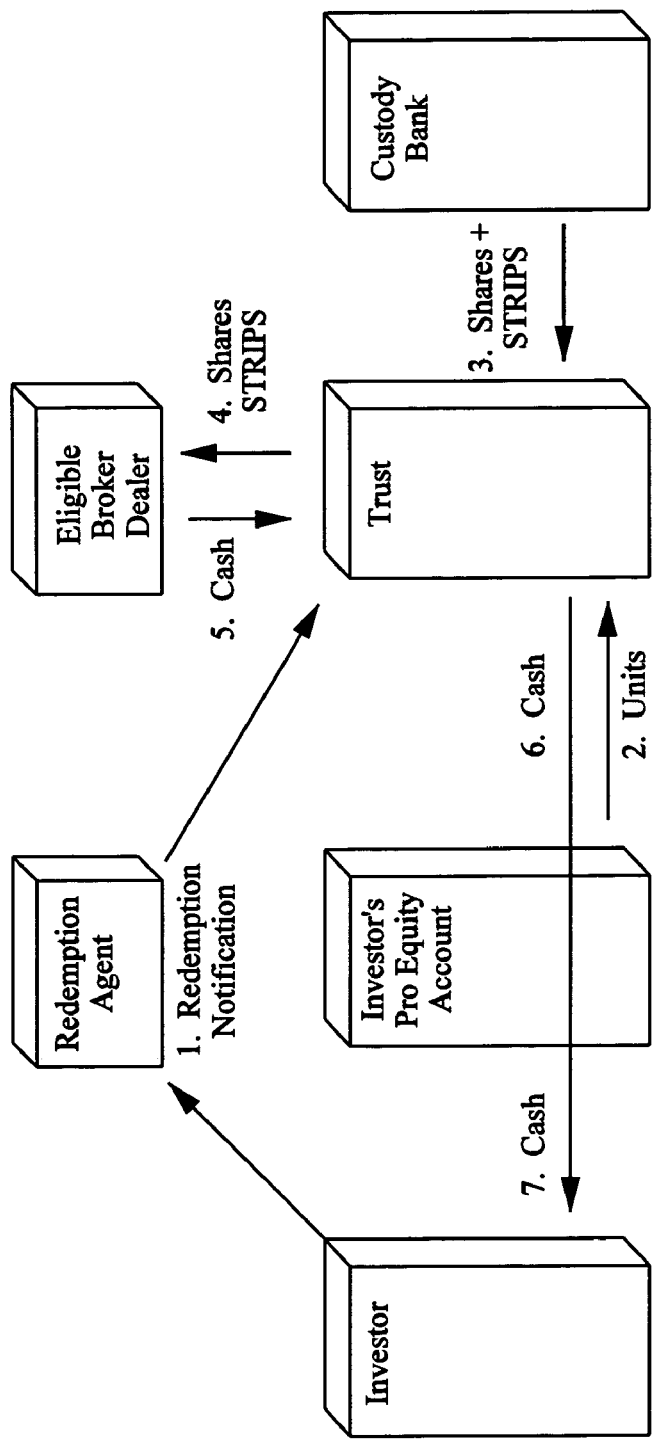
FIG. 4 illustrates redemption of a ProEquity unit with the issuing trust in accordance with a specific embodiment of the invention.

In accordance with another aspect of this invention investors can redeem their ProEquity units with the issuing Trust at any time for cash. In a preferred embodiment, Units are not redeemed in kind by the Trust, although this option may be available in alternative embodiments. Upon redemption of a unit, cash equal to the liquidation value of one STRIP and the then-current Share Ratio of shares (less the Redemption Fee) will be distributed to the investor. FIG. 4 illustrates the process flow for the redemption of units by an investor in a specific embodiment. As shown, to initiate redemption the investor notifies at step 1 a Redemption Agent of the number of units which are to be redeemed. The Redemption Agent will cause the Trustee to liquidate, through an eligible Broker Dealer, the assets corresponding to units and will distribute the cash sale proceeds to the investor. To this end, at step 2 the appropriate number of units are transferred from the investor's ProEquity account to the Trust; shares and STRIPS (from the custodian) are then exchanged for cash with an eligible Broker Dealer in steps 3, 4 and 5, and cash sale proceeds are distributed to the investor in the last step.

Cash and in-kind transactions between the investor and an eligible Broker Dealer, including unit redemption, are illustrated in specific embodiments of the invention in FIGS. 5A and 5B.

c) Unit Reinvestment Program

Figure 6:
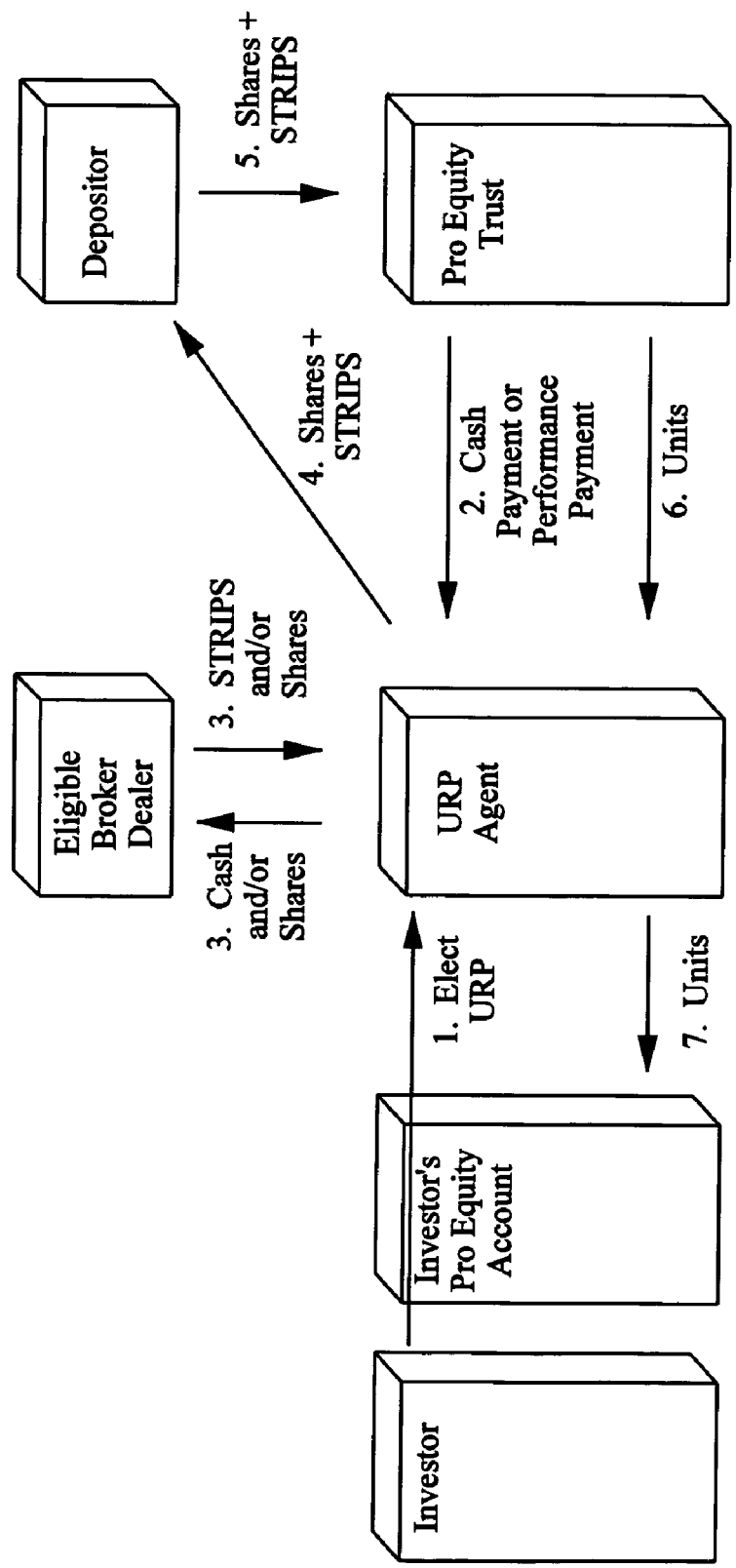
FIG. 6 illustrates in a block diagram form the process flow for administering a unit reinvestment program (URP) in accordance with a preferred embodiment of the present invention, where it is assumed that the reinvestment is in the distributing Trust.

As mentioned above, an important aspect of the present invention is the establishment and administration of an automatic Unit Reinvestment Program (URP) that is believed to more fully exploit the benefits of the financial instrument structure discussed above. Among other features, the URP is believed to help achieve a true sale of deposited assets for accounting purposes by establishing an investor's intent to sell rather than loan the deposited assets. It will be appreciated that this feature may be beneficial in certain regulatory environments. FIG. 6 illustrates in a block diagram form the process flow for administering a URP in accordance with a preferred embodiment of the present invention, where it is assumed that the reinvestment is in the distributing Trust.

As shown, initially the investor (through an appropriate ProEquity account) elects participation in a URP. A special URP agent charged with the maintenance of the program is notified. At the distribution date the Trust makes the appropriate cash and/or performance payment (which is comprised of equity only and not cash) to the URP agent, who then obtains STRIPS and/or shares from an eligible Broker Dealer in exchange for the distribution. Next, in the embodiment illustrated in FIG. 6 the obtained shares and STRIPS are deposited (possibly via Depositor) in the Trust, which then creates a corresponding number of units that are distributed through the URP agent back to the investor's ProEquity account.

In accordance with the preferred embodiment, the URP has, among other things, the following characteristics: The URP Agreement is between the Broker Dealer and the investor; in general Trusts are not parties to the URP. Upon executing an URP agreement the investor irrevocably directs all distributions from units subject to the URP to be paid to the Reinvestment Administrator (i.e., the Broker Dealer) for reinvestment in units of any Trust. In a preferred embodiment the administration of a URP will cease with respect to units upon redemption or sale.

In a specific embodiment, the URP provides for quarterly reinvestment of distributions from any Trust into units of the same or of another ProEquity Trust. Preferably, distributions from a single Trust are not allocated to multiple Trusts, although that option can be retained in alternate embodiments. In an important aspect of the invention, when the investor chooses to reinvest into the same Trust making the distribution, the Reinvestment Administrator (i.e., with reference to FIG. 6 the URP agent) in a preferred embodiment attempts to sell as few of the distributed shares (comprising the performance payment) as possible to create units in order to minimize the tax gain realized by the investor and maximize tax efficiency.

It will be appreciated that for the administration of the URP program, the Reinvestment Administrator unit of the System may impose nominal fees and expenses, such as deposit fee on reinvested amounts, reinvestment administrator fee, redemption fee, administrative fee and others. These fees are taken into account when computing the quarterly value of the Trust units and are taken into account of in the computed administration of the program.

With reference to FIG. 2 and the description of the cash payments and the performance payments (both direct and URP) in Section A above, in accordance with the method of the present invention the following steps are followed in a preferred embodiment. First, at the end of the predetermined time period (i.e., a quarter) the system computes the unit price X based on market data. Next, the UEV price X is compared to a predetermined threshold, selected for example as $995 in a preferred embodiment using $1,000 face value units. Next, the difference Y=X−995 is computed. If the difference Y is greater than the minimum payment for the Trust unit (selected in a specific embodiment as $15), i.e., if Y≧15, the excess is distributed to the unit owners. Otherwise, the performance payment is increased to $15 to make up the difference. Finally, once the performance distribution for the time period is computed, it is translated into number of shares per unit and the corresponding number of shares is distributed. As illustrated in FIG. 2 and in more detail in the following examples, the performance distribution leads to a smaller Share Ratio for the unit. Over the life term of the unit this Ratio diminishes progressively, until at maturity it reaches zero, i.e., there are no shares left and only the principal is distributed.

Turning back to the computation of the performance payment in the case of URP participants, in accordance with the present invention two cases are possible for the reinvestment of the payment: at any given time the Trust may have either (a) excess cash; or (b) excess shares. In a preferred embodiment, for tax reasons it is always desirable to first use the excess cash to purchase additional shares to generate extra units. Alternatively, in the case of excess shares the system will sell some shares and with the proceeds purchase corresponding STRIPS. In a preferred embodiment of the system all transactions are computed on a per-Trust basis as opposed to per-client basis to minimize the effect of fractional share amounts. It will be apparent that after distribution the new unit UEV times the number of units has to equal the old unit UEV times the number of units before the distribution.

Figure 23D:
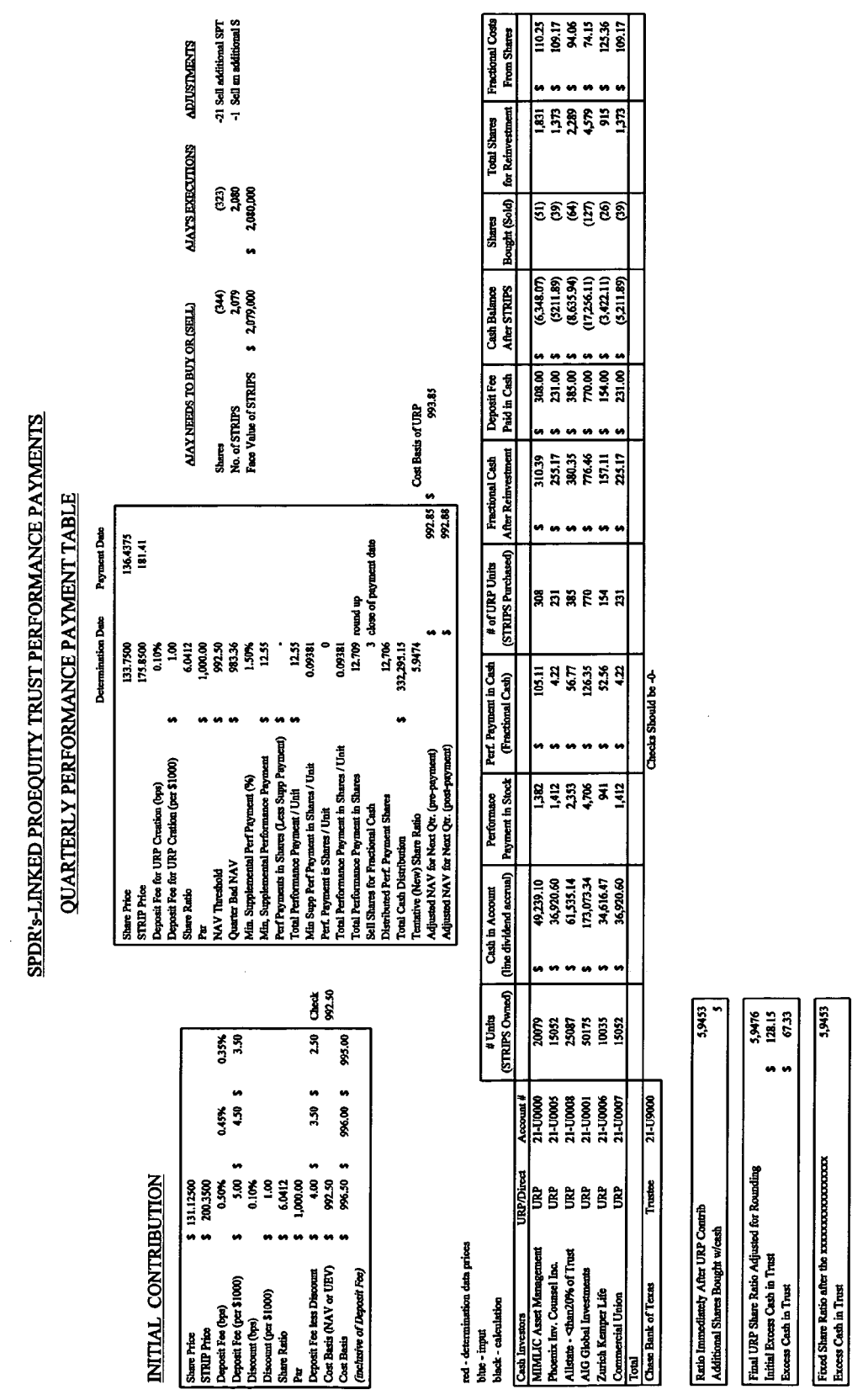

FIGS. 23C and 23D are spreadsheet summaries that further illustrate cash payments and performance payments in accordance with the present invention.

d) Customer Reporting

Another aspect of the method of the present invention is the use of a comprehensive reporting mechanism enabling system administrators and customers to track various parameters associated with a ProEquity Trust and its units. In a preferred embodiment, the system disseminates reports electronically, where the reports capture all essential data for the units, including number of units owned by customer account, number of units re-invested over a particular time interval, characteristics of the underlying securities, and a share ratio. This data is aggregated on daily basis for all accounts (and all Trusts) and archived. In a preferred embodiment customers receive consolidated periodic (i.e., monthly) statements, reflecting all of their account positions. In a preferred embodiment, the reports are generated with a view to support tax treatment and are consistent with standard accounting practices.

C. The System

Figure 7:
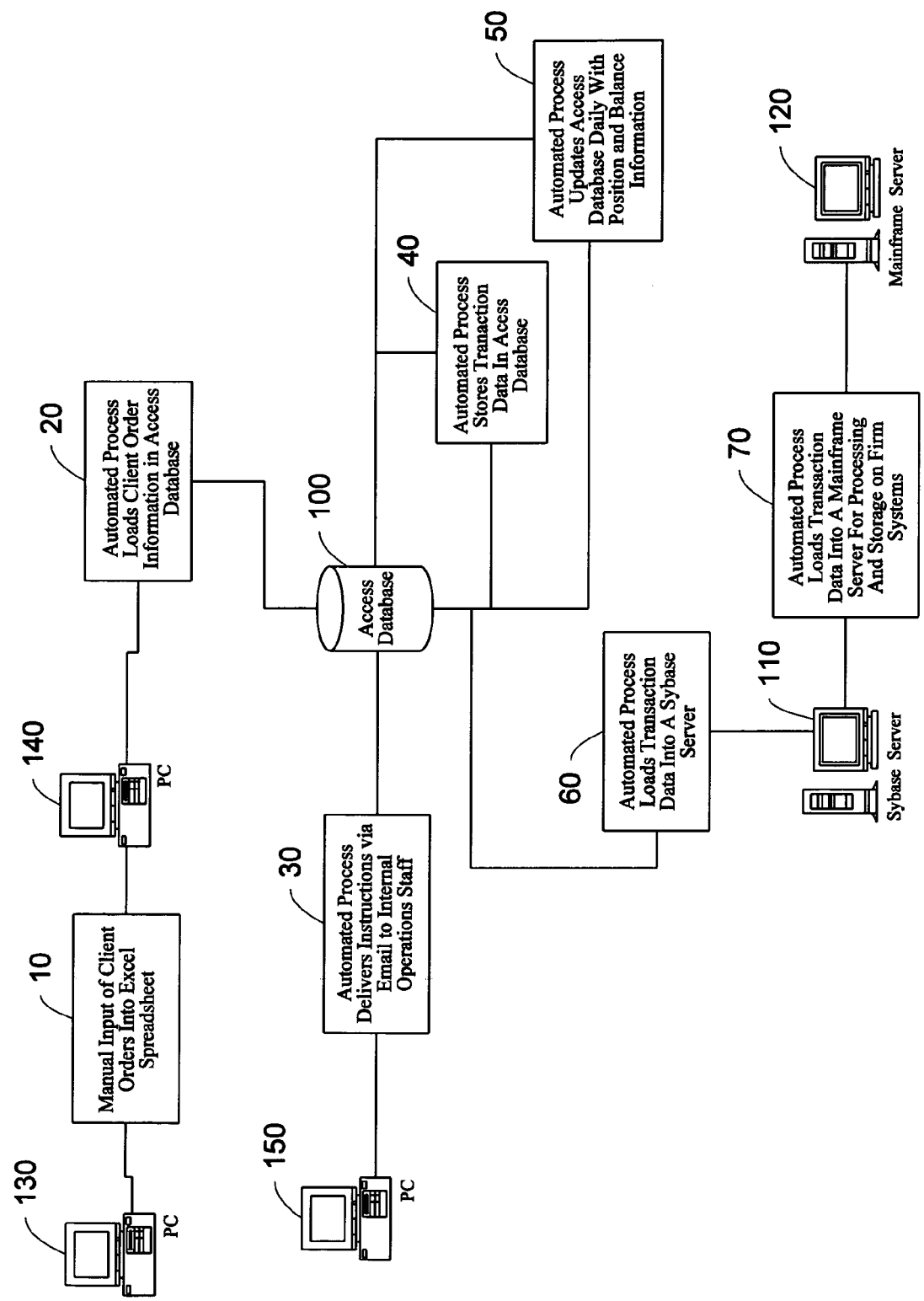
FIG. 7 illustrates in a block diagram form the system used to create and manage ProEquity Trust operations in a preferred embodiment of the present invention.

The system used to create and manage ProEquity Trust operations is illustrated in a preferred embodiment in FIG. 7. As discussed above, broadly speaking for each Trust the managing system should be capable of calculating a number of parameters including the Unit Equivalent Value (UEV) for the Trust units and each of its components. In addition, the system should be capable of electronically tracking the price of the underlying bonds and stock shares, as well as the creation and redemption of units and a variety of transactions by the Trust, taking into account in each case the applicable fees. In a preferred embodiment, this information is kept in a Excel spreadsheet and is drawn to an Access database.

With reference to FIG. 7, in a specific embodiment, orders by customers are entered in the system using, for example, a PC or other data entering device 130. As indicated, in a preferred embodiment the client's input is entered into an Excel spreadsheet program run on a PC 140. It will be appreciated that data entry can be accomplished in a variety of different ways using, for example, dedicated communications lines, or a communications network, such as a local area network (LAN), wide area network (WAN) or the Internet, using appropriate security measures that are standard in the art, thus enabling users in alternate embodiments of the invention, to directly enter their orders in the system.

Next, as shown at 20, an automated process loads the client's order information into a database 100. As illustrated, in a preferred embodiment database 100 is implemented as an Access database. Generally, database 100 formats the data into a format known as a "trade file", which is then cut on a record-by-record basis into trades that form a record set of data on a server 110. As mentioned above, to facilitate the execution of transactions requested by the client database 100 is connected to a server 110, implemented in a preferred embodiment as a Sybase server.

In the specific embodiment illustrated in FIG. 7, which uses a large institutional mainframe server, the records stored in server 110 are then stored as trades on a mainframe server 120, which monitors the movement of STRIPS, stock and Trust units to and from the accounts that reflect beneficial interest held by the investors in the Trust. Importantly, information about these trades is communicated back to database 100, which is further connected, for example via e-mail, to operations staff illustrated in the figure at PC 150 to deliver various instructions. For example, this communications path serves to alert relevant processing areas to the fact that various trades are being cut, and that the necessary actions should be taken to actually sell the trades. Similarly, the communication will alert processing areas that a physical settlement is taking place and that securities are to be expected, so proper accounting can be maintained at any time.

With reference to FIG. 7, server 110 uses automated process 70 to load transaction data into a mainframe server 120 for processing and storage on firm systems. As further illustrated at 50, in a preferred embodiment an automated process updates the Access database periodically, i.e., daily, with position and balance information, sufficient to monitor the value of the Trust units at any time. In accordance with the present invention the system monitors delivery of securities and their daily positions, and prepares various report statements. In a preferred embodiment, the ProEquity accounts activity is archived. In an important aspect, consolidated individual customer statements are prepared for clients keeping more than one Trust account at a time.

In general, it is envisioned that a system of the type illustrated in FIG. 7 can process activities related to a large number of Trusts (corresponding to individual securities) on behalf of a large number of clients, each of which may keep a number of Trust accounts (ranging from zero—at maturity—to the total number of trusts). It will be appreciated that a system of this type can be implemented in a variety of different ways, FIG. 7 being merely an illustration of the preferred embodiment.

Thus, in a specific embodiment the Sybase server 110 is loaded with a processing program that has access to information stored in database 100. This processing program normally resides in a random access memory (RAM) (not shown) and performs, when executed on a computer, functions related to unit creation, redemption, daily maintenance, periodic distributions and handling of various market transactions. It will be appreciated that in alternative embodiments these functions can be distributed for execution over several different servers, which may in turn be managed by different entities. An example illustrating this type of system architecture is provided in the following section. Accordingly, in a specific embodiment the processing program may include client routines that enable the program to communicate with one or more server computers over the Internet or over alternative telecommunication paths. Various system configurations are possible in alternative embodiments and will not be discussed in further detail as they will be apparent to those of skill in the art in each practical implementation. Thus, in alternative embodiments of the invention, the client computer can run a secure Web browser program for communication with the system administrator in the Internet environment. Various Internet communication programs are provided by the Java system, made by Sun Microsystems, Inc.

With respect to specific aspects of the implementation of the system in FIG. 7, or alternative embodiments which are not illustrated herein, the reader is directed to the disclosure of U.S. Pat. Nos. 4,346,442; 4,674,044; 4,677,552; 4,823,265; 4,953,085; 5,038,284; 5,101,353; 5,126,936; 5,132,899; 5,189,608; 5,210,687; 5,227,967; 5,262,942; 5,270,922; 5,644,727; 5,682,466; 5,905,974 and 5,946,667 for helpful background. The disclosure of these patent is hereby expressly incorporated by reference.

D. Sample ProEquity Implementation

In this section are described specific embodiments of the ProEquity system and method of the present invention implemented using Morgan Stanley Dean Witter & Co. Incorporated ("MSDW") management facilities. The embodiments are illustrated with reference to specific operating procedures and entities.

Figure 8:
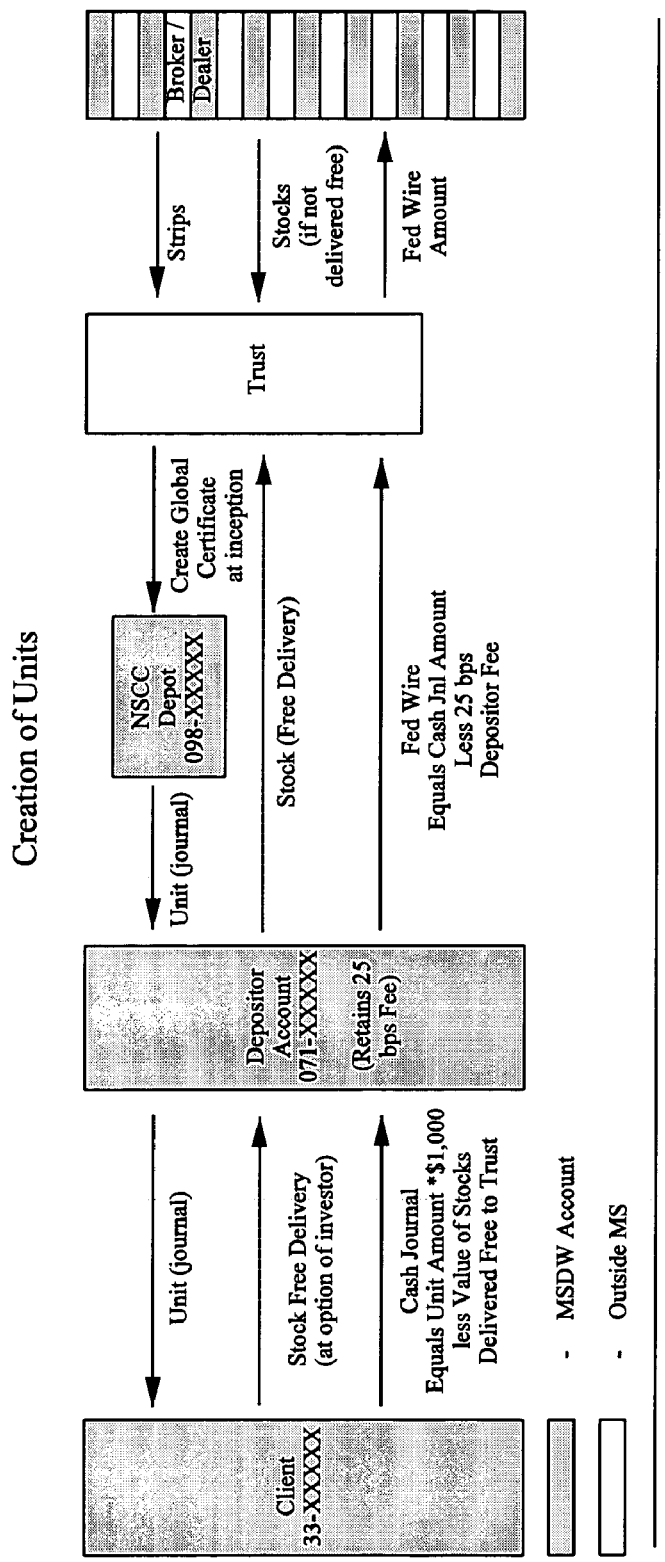
FIG. 8 illustrates in a specific embodiment the process flow between different system components involved in the creation of ProEquity trust units using a specific Depositor account.

Reference is first made to FIG. 8, which illustrates in a specific embodiment the process flow involved in the creation of ProEquity Trust units using a MSDW Depositor account.

In particular, clients place orders through an entity acting as a Depositor. This entity may in a specific embodiment be an operations group within the system architecture. The Depositor will confirm orders and in a preferred embodiment maintains a "shadow" book (such as an Excel spreadsheet with all trust and client details), which includes cash investors and cash/stock investors. When the book is closed, the Depositor is responsible for determining the number of STRIPS and the amount of shares that need to be deposited. Further, Depositor provides a client position list to an Operations processor (not shown), which list includes investor elections. The list in this embodiment includes the clients' distribution election (i.e., URP Recipient/Direct Recipient).

Operations processor reconciles the client position list produced by the Depositor to the actual client accounts on MSDW's book and reports any discrepancies. At this stage client accounts should be long shares and strips for deposit in the Trust. Next, Depositor contacts the Trustee and instructs them to begin the process of creating new Units. Operations facilitates the transfer of stock and STRIPS from the client to the Depositor, such as a MSDW Trading Account to the Trust. As illustrated, the cash transfer from the Depositor to the Trust takes into account a Depositor Fee, such as 25 bps.

Next, the Trustee contacts a broker/dealer of a list of 2 or 3 broker/dealers provided by the Depositor (MSDW can be one of the broker/dealers on this list in a specific embodiment). An order to purchase the STRIPS first followed by the number of shares needed to complete the Trust unit will be placed with the broker/dealer. The broker/dealer then executes the order and reports the executions to the Trustee, who will relay this information back to Depositor.

Next, a Global Certificate with a maximum authorized face amount will be created by the Trust and delivered to MSDW's custody account at NSCC depot. At this time an entry is made on the Trust's book to record the current outstanding certificate. A journal entry will be posted to represent the creation of the Global Certificate between the NSCC depot account and the Depositor account on MSDW's book. Client journal entries are made to reflect client ProEquity ownership on MSDW's book. Unit creation is further illustrated with reference to FIGS. 23A and 23B.

Figure 9:
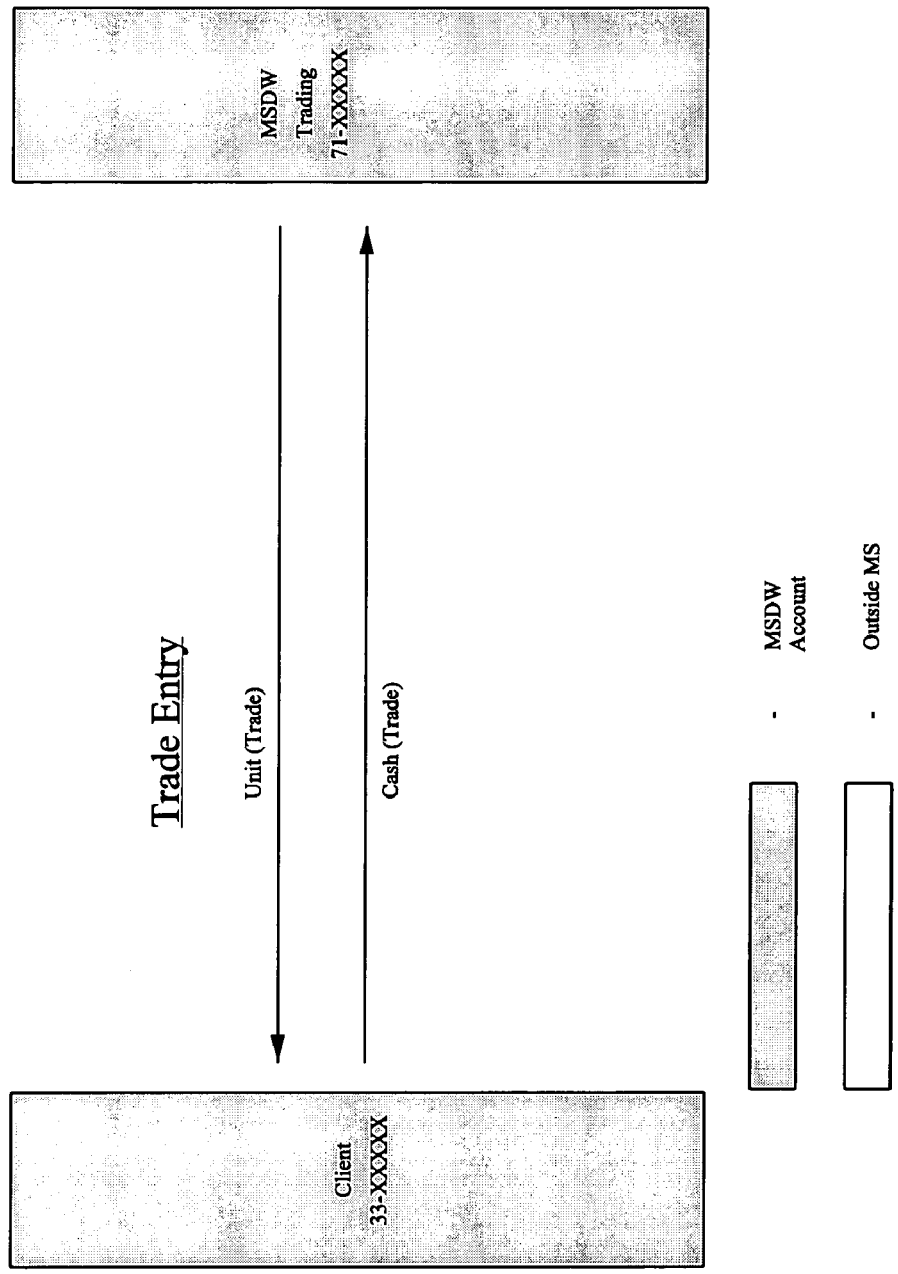
FIGS. 9, 10 and 11 illustrate the process flows between different system components for a client purchasing (FIG. 9), selling (FIG. 10) and redeeming (FIG. 11) of trust units in a specific embodiment of the present invention.
Figure 10:
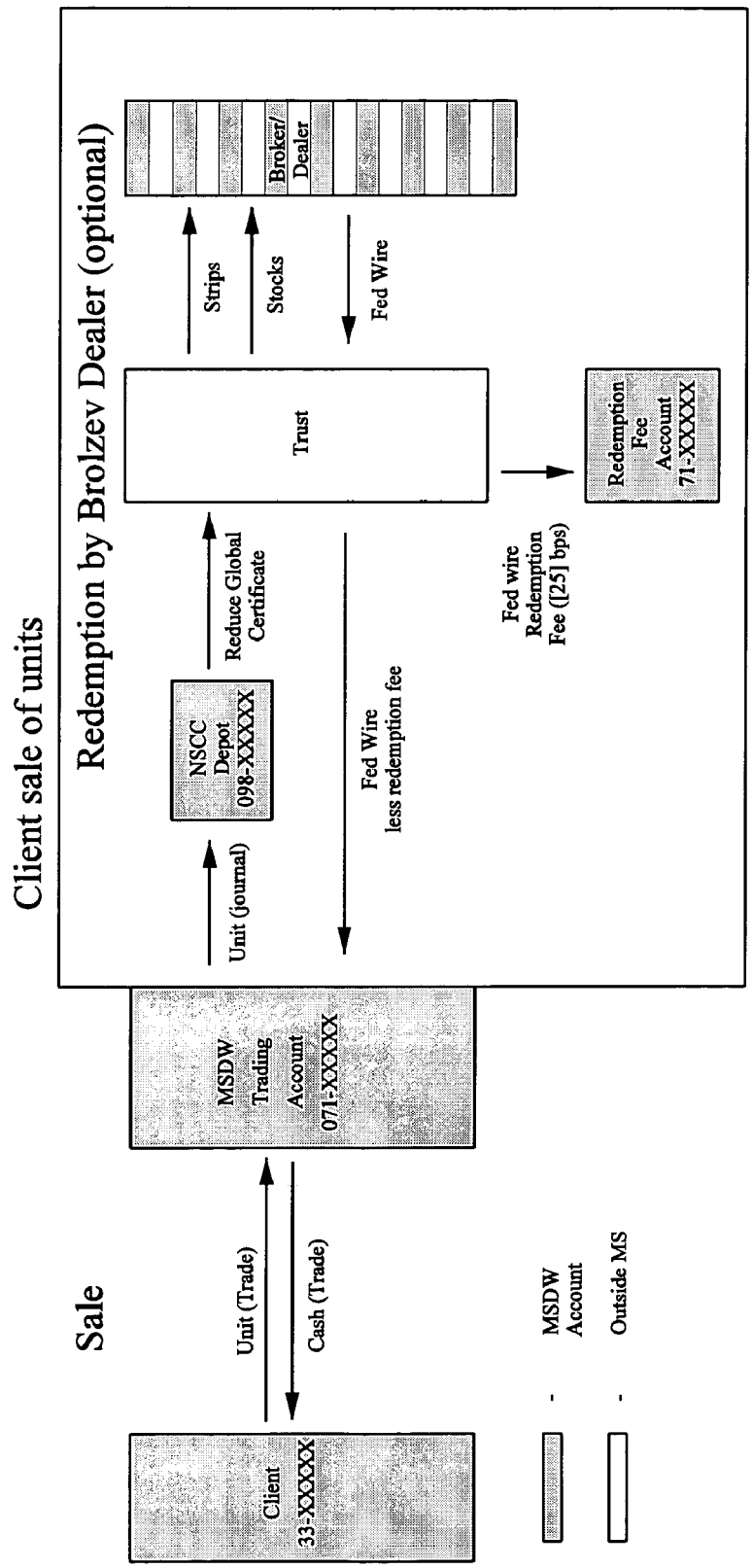
Figure 11:
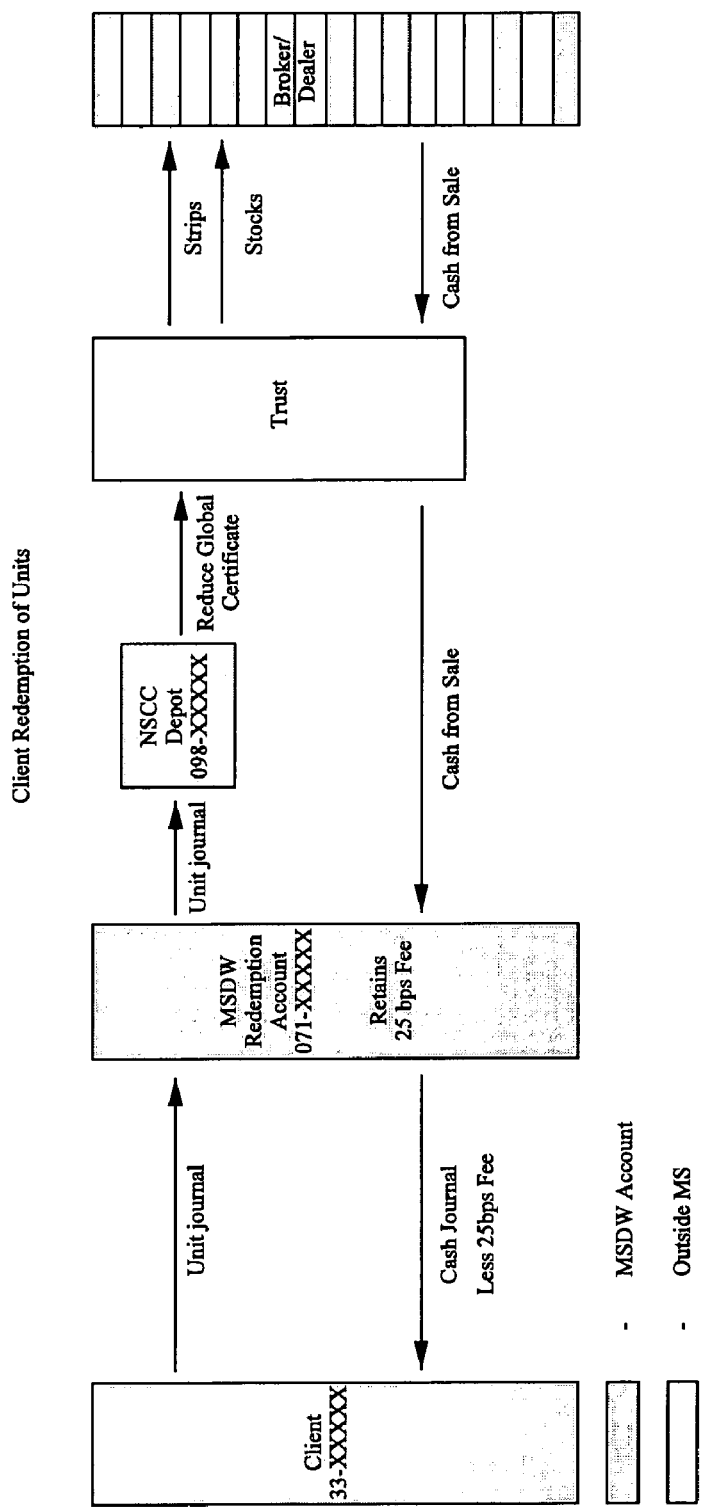

Reference is next made to FIGS. 9, 10 and 11, which illustrate the process flows for a client purchasing (FIG. 9), selling (FIG. 10) and redeeming (FIG. 11) of Trust units. With reference to FIG. 9, an investor first contacts a Broker Dealer (not shown) about purchasing units through a secondary market private placement. If the Broker Dealer does not hold inventory of the unit in question, the client can only invest in a unit by a primary market private placement. Finally, the execution is related, to the client. The Broker Dealer would write a trade ticket and book the purchase and sale of the units With reference to FIG. 10 illustrating the client sale of units, the client contacts a Broker Dealer about selling units. Next, the execution is related to the client; Broker Dealer writes a trade ticket and books the trade. In a specific embodiment, the Broker Dealer has the option of redeeming the Units with the Trust or keeping them in inventory to sell privately to qualified investors. This option is illustrated in the right-hand side block in FIG. 10, labeled Redemption by the Broker Dealer.

If the Broker Dealer redeems the units with the Trust, generally a predetermined (i.e., [25] bps) Redemption Fee is charged on the transaction. The fee is deposited into a redemption account.

Next, with reference to FIG. 11, to execute client redemptions, in a specific embodiment the client contacts the Redemption Agent about redeeming units. The Redemption Agent, contacts the Trustee and informs them of the number of Trust assets that need to be sold. Then, Trustee contacts 2–3 broker/dealers and executes the sale of Trust assets. Again, in a specific embodiment MSDW is included in the list of brokers. Next, Trustee reports execution to the Redemption Agent, which reports the execution back to the client.

At this stage, the Trustee passes the cash from the sale of Trust assets to MSDW, acting as Redemption Agent. The Redemption Agent, then passes the cash from the sale of Trust assets, less the Redemption Fee, to the client via journal entries. Operations completes journal flow and works with client to settle the redemption.

Figure 12:
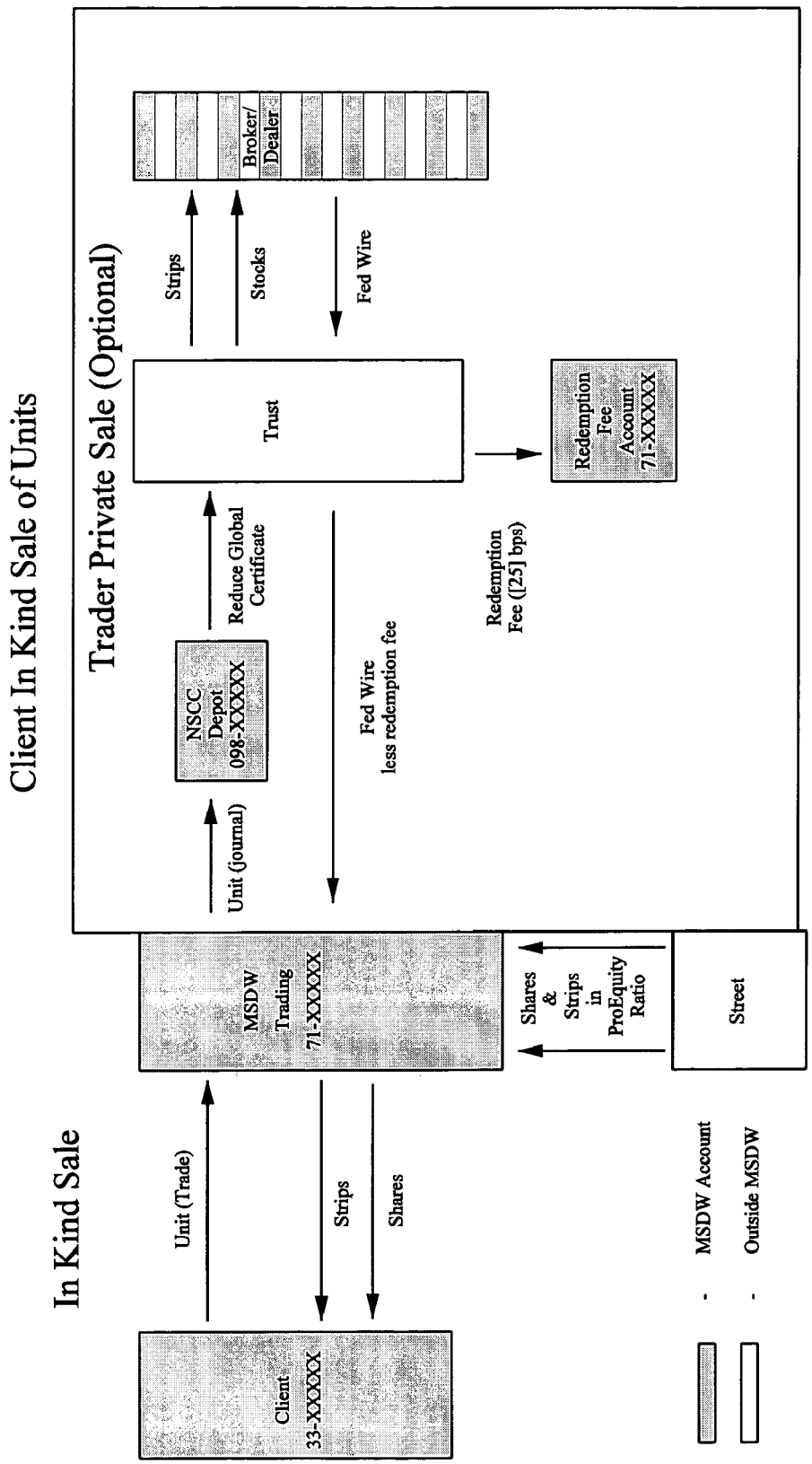
FIG. 12 illustrates the process flow between different system components for an in-kind sale.

In a specific embodiment, the client can make an in-kind sale, the process flow for which is illustrated in FIG. 12. As before, in this case client contacts the Broker Dealer to redeem units for shares and STRIPS; this order is relayed to a Broker Dealer, which purchases a number of shares and STRIPS it will exchange for the unit, and relays execution to the client and to Operations. The Broker Dealer writes trade tickets for the client to exchange their ProEquity unit(s) for shares and STRIPS; Operations books the trades and works with client to settle the trades. After settlement, the Broker Dealer has the option of redeeming the unit itself, which it has purchased from a third party investor, with the Trust or holding the unit in inventory to create and maintain a secondary market for private placement. Similar to the embodiment shown in FIG. 10, the optional Broker Dealer private sale is illustrated in FIG. 12 as the dark-shaded right-hand side block.

Distributions

In accordance with the present invention, the amounts of any performance payments and cash payments on the units are determined by reference to the current market value of the shares, the supplemental performance payment amounts and the dividends and other amounts, if any, paid with respect to the shares, as well as by the current market value of the U.S. Treasury STRIPS. Additionally, as noted above, payment of supplemental performance payments depends on the equity portion of the Trust property being above certain threshold value.

Cash Payments

In accordance with the invention the Trustee can make a cash payment with respect to the units of a Trust upon the receipt by the Trust of cash or other property (other than shares) with respect to the shares held by the Trust. The Trustee will make a cash payment to the Book-Entry Agent upon receipt of a cash distribution. If the distribution received by the Trust includes property other than cash, the Trustee will direct an eligible Broker-Dealer to sell such property as promptly as practicable following receipt of the property and will make a cash payment of the net proceeds of the sale to the Book-Entry Agent upon the completion of the sale of the property.

In a specific embodiment, cash payments are made in connection with the occurrence of one or more of the following events: (i) any distribution or dividend to existing holders of the relevant shares of any cash, securities, rights or warrants or other assets, subject to certain conditions; (ii) any reclassification or change of relevant shares; (iii) any consolidation, amalgamation or merger of the Share Issuer with or into another entity under certain conditions; or (iv) any other takeover offer for the shares that results in a transfer of, or an irrevocable commitment to transfer of shares.

Figure 14:
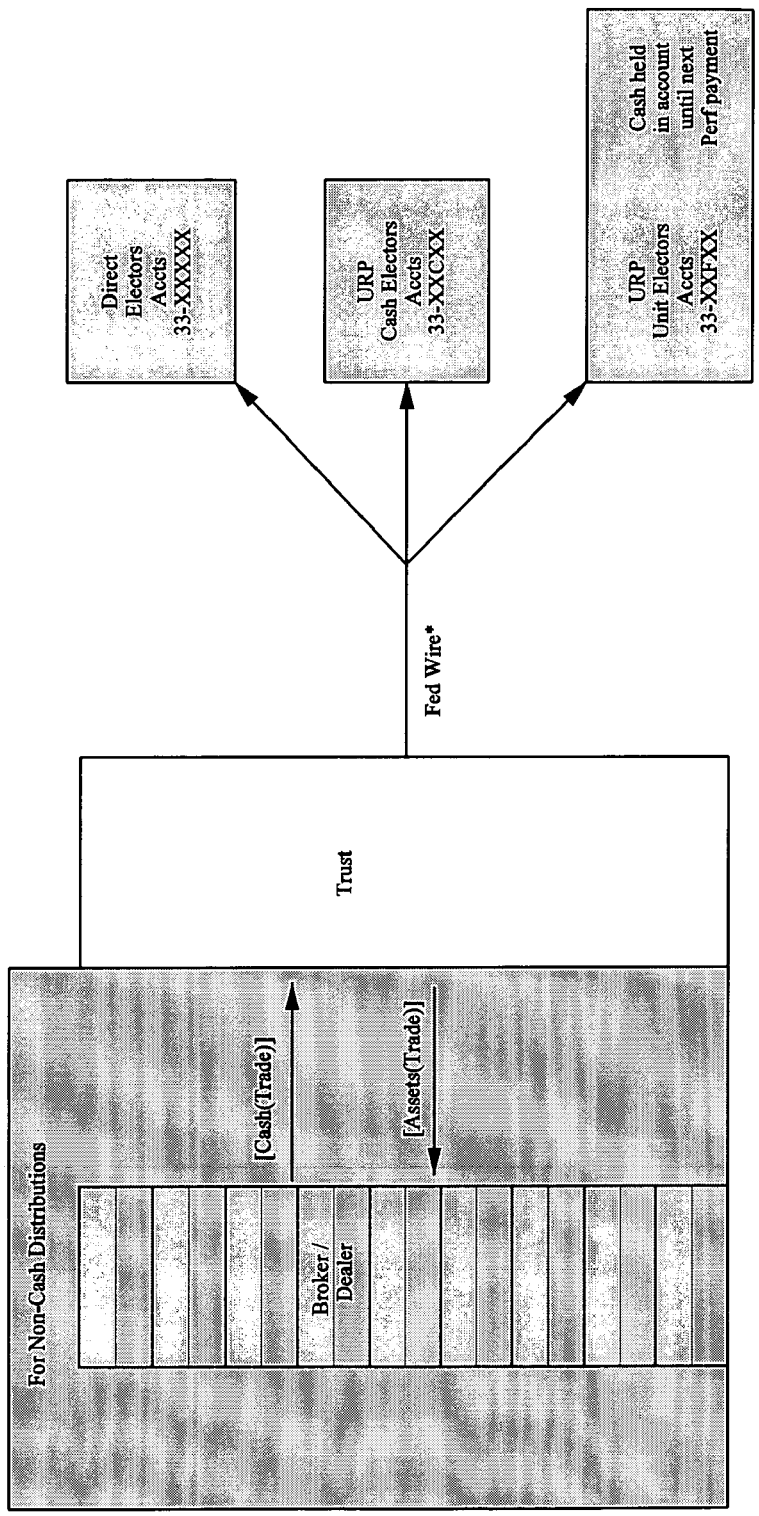
FIG. 14 illustrates the process flow between system components for implementing the receipt of cash distributions.

Normally, the Trustee makes the cash payment to the Book-Entry Agent for payment to beneficial owners shown on the records maintained by the Book-Entry Agent. In some cases cash payments may be deferred if, for example, the product of the market value of any non-cash distribution or consideration, in each case, with respect to one share and the Share Ratio in effect at the time of the such distribution exceeds certain amount, such as 10% of the unit par amount. In such cases, the Trustee will direct the Book-Entry Agent to notify the beneficial owners (which notice can be provided by electronic mail or other electronic communication) and will defer the sale of non-cash property included in the distribution received by the Trust for a given period. Upon the completion of the sale of all non-cash property, the Trustee makes a cash payment to the Book-Entry Agent for payment to each beneficial owner in an amount equal to the aggregate net proceeds received by the Trust less commissions or fees payable to the Broker-Dealer. FIG. 14 illustrates the process flow between system components for implementing the receipt of cash (and non-cash) distributions.

Performance Payments

In accordance with the invention periodically, on known performance payment dates such as the end of a quarter, the Trustee can make a performance payment to the Book-Entry Agent with respect to all of the units of the Trust, consisting of a number of shares with a market value as of the related date equal to a predetermined performance payment amount, rounded up to the next higher whole number of shares. Generally, performance payments are not made from the U.S. Treasury STRIPS held by the Trust. The performance payment amount is paid by the Trustee to the Book-Entry Agent for allocation, by whole share increments (including cash in lieu of fractional shares), to beneficial owners of record at a given time. In a preferred embodiment, the performance payment amounts with respect to the units of a Trust are equal to the excess, if any, of the Aggregate Unit Equivalent Value (i.e., the aggregate of all Trust units) on the date over a fixed percent, i.e., 99.25%, of the Aggregate Unit Par Amount (i.e., the aggregate par amount of the U.S. Treasury STRIPS), and may be subject to payment of an additional supplemental performance payment. As noted above, supplemental performance payments are made subject to certain conditions regarding the total amount of the stock component of the Trust.

Following each performance payment, the Share Ratio is reduced to reflect any reduction in the number of shares represented by each unit. The number of shares represented by each unit may also be reduced as a result of certain other events, such as excess ownership of a single owner.

In a preferred embodiment, all performance payments are allocated on the performance payment date to beneficial holders (as of the performance record date) by the Book-Entry Agent in whole shares on a pro rata basis, except that if the number of allocated shares is not a whole number, the Book-Entry Agent aggregates any fractional share amounts allocated to the owners, and directs the sale of these fractional share amounts by an eligible Broker-Dealer. The net proceeds from the sale are delivered in this embodiment in lieu of the fractional shares.

The operating procedure followed in making performance payments is briefly summarized below in a specific embodiment. In particular, if the Unit Equivalent Value (the "UEV") is less than or equal to $995 per unit at the performance date, i.e., the end of any quarter, no Performance Payments are made. If the UEV is greater than $995 per unit at the end of any quarter, the following procedures must be followed to implement the a performance payment:

First, Operations creates a file stored in an Access database (see reference 100 in FIG. 7) which contains a list of client account numbers, the elections those accounts have made, and the units they hold. Next, on the Performance Payment Calculation Date, Operations, acting on behalf of the Calculation Agent, will calculate the Performance Payment (UEV–$995) for each Trust.

Operations then needs to breakdown that calculation among investors who receive units (i.e., URP electors), or shares (direct electors). Elections are tracked in a preferred embodiment by client account number. All URP Electors are required in a specific embodiment to open a separate MSDW account in a range designated for ProEquity facilitation (e.g. 33-PEFXX). Direct electors will be able to use pre-existing MSDW accounts. Depositor, prior to the Performance Payment Calculation Date, will review the list.

Election Breakdown Summary

URP Recipients—Investors receive their distributions through a Unit Reinvestment Program (URP) described above. In a preferred embodiment, such investors will receive their distributions in this manner throughout the term of the Trust and do not have the option to receive any distributions directly from the Trust. As a result, investors who have chosen the URP will not be able to receive shares in kind or other in-kind distributions on the shares. These investors will receive additional Units only, and ultimately, only cash upon redemption. In alternative embodiments, more flexible election options can be used.

Figure 13A:
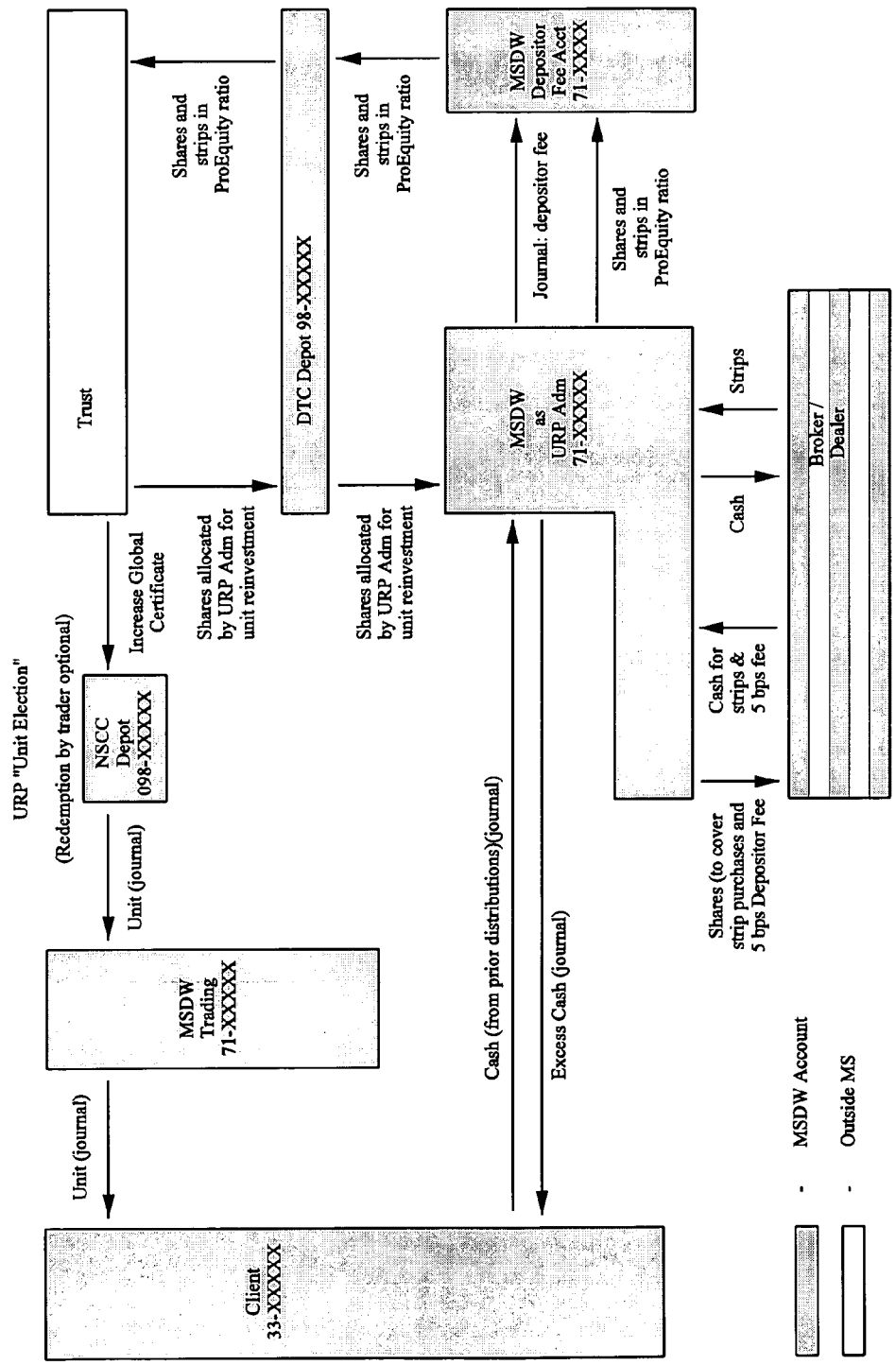
FIGS. 13A and 13B illustrate the process flow between system components for implementing the receipt of distributions by direct recipients directly from the Trust and operational responsibilities of the systems operated in accordance with the present invention.

Direct recipients—with reference to FIG. 13A, direct recipients receive their distributions directly from the Trust. These investors can later decide to participate in the URP and use the URP Administrator, but once they do, in a preferred embodiment, their decision becomes irrevocable throughout the remaining term of the Trust. The investors must notify the URP Administrator in writing ahead of time before any calculation date. The URP Administrator generally acknowledges receipt by signing and dating the request and returning it to the investor. These investors will receive the quarterly Performance Payments in shares of the underlying asset (if shares of the underlying asset are not available for distribution, it is possible, although unlikely, that performance payments may be made in STRIPS). Cash distributions from the trust are paid to direct recipients directly from the trust.

Figure 13B:
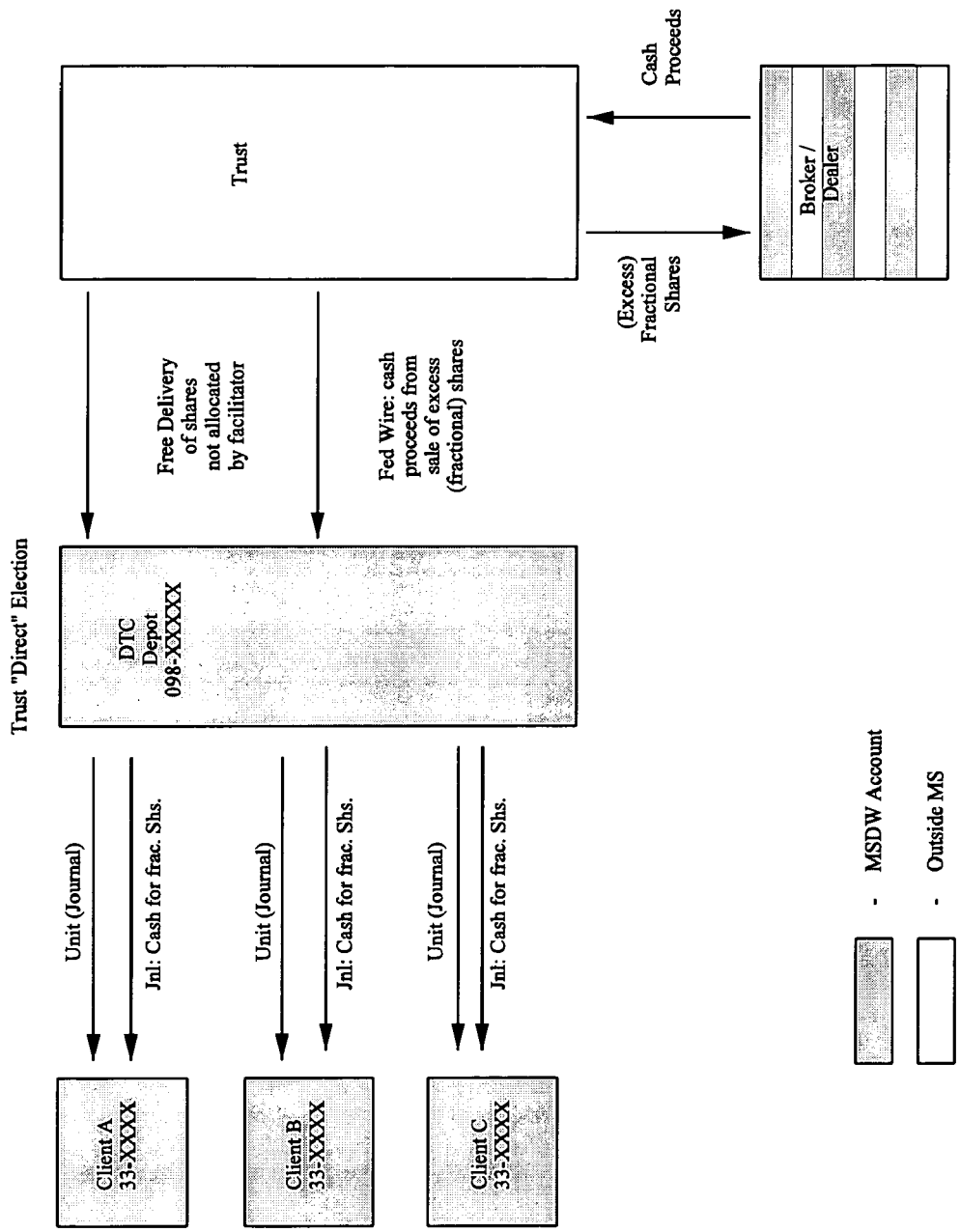

In accordance with a preferred embodiment, and with reference to FIG. 13B for Direct Recipients the sequence of steps involved in a preferred embodiment comprises:

1 Operations calculates the number of shares that will be delivered from the Trust to the unit holders.

2. The calculation includes liquidating any fractional share amounts for cash.

3. The Trust instructs a broker/dealer to sell any fractional share amount and receive cash.

4. The Trust will deliver shares and wire cash received from the sale of fractional shares to MSDW.

5. Journal entries are made in client's account on MSDW's book to reflect the receipt of shares and cash.

As further illustrated in FIG. 14, non-cash, liquid distributions from the trust are liquidated first by the trust and the proceeds of the sale are distributed as cash directly to the unit holders.

Operational Responsibilities pertaining to all election options

1. Provided that the trustee and Depositor have agreed upon the amount and the date of the distribution, operations calculates on the calculation date the per unit distribution amount;

2. Should the per unit distribution amount exceed a fixed amount, i.e., $100 per unit, and if the UEV of the unit on calculation date less the per unit amount of the distribution is less than another threshold, i.e., $900, operations informs Depositor and the trustee of the occurrence of an extraordinary distribution;

3. Operations prepares a schedule of dates pertinent to the distribution. These dates include: payable date of the (underlying) distribution, payable date of the unit distribution, settlement date of the unit reverse split, the trade date/settle date of the strip liquidation, and next performance payment date. Depositor notifies unit holders of the extraordinary distribution, and communicates the schedule of events to them;

4. Operations will have, prior to the unit payable date, calculated the details of the reverse split. Details of the split in aggregate are confirmed with the trustee prior to the split ex-date. On the split payable date, operations is responsible for the delivery of the old global certificate back to the trustee, the receipt of, and confirmation with respect to size, of the new global certificate. Operations passes journals recording the reverse split on the books of direct electors.

With reference to the above steps, in a specific embodiment a reverse split of the unit will occur immediately following a cash distribution exceeding given number, i.e., $100 per unit, where the UEV of the unit after the distribution is greater than, for example, $900/unit. In such case, a reverse split calculation can be made to bring the price of the unit to $995. As a result of the reverse split, new global certificates can be issued in exchange for the old one. Journals will be made to all unit holder accounts to reflect the split.

Operational Responsibilities Pertaining to Direct Election

Figure 15:
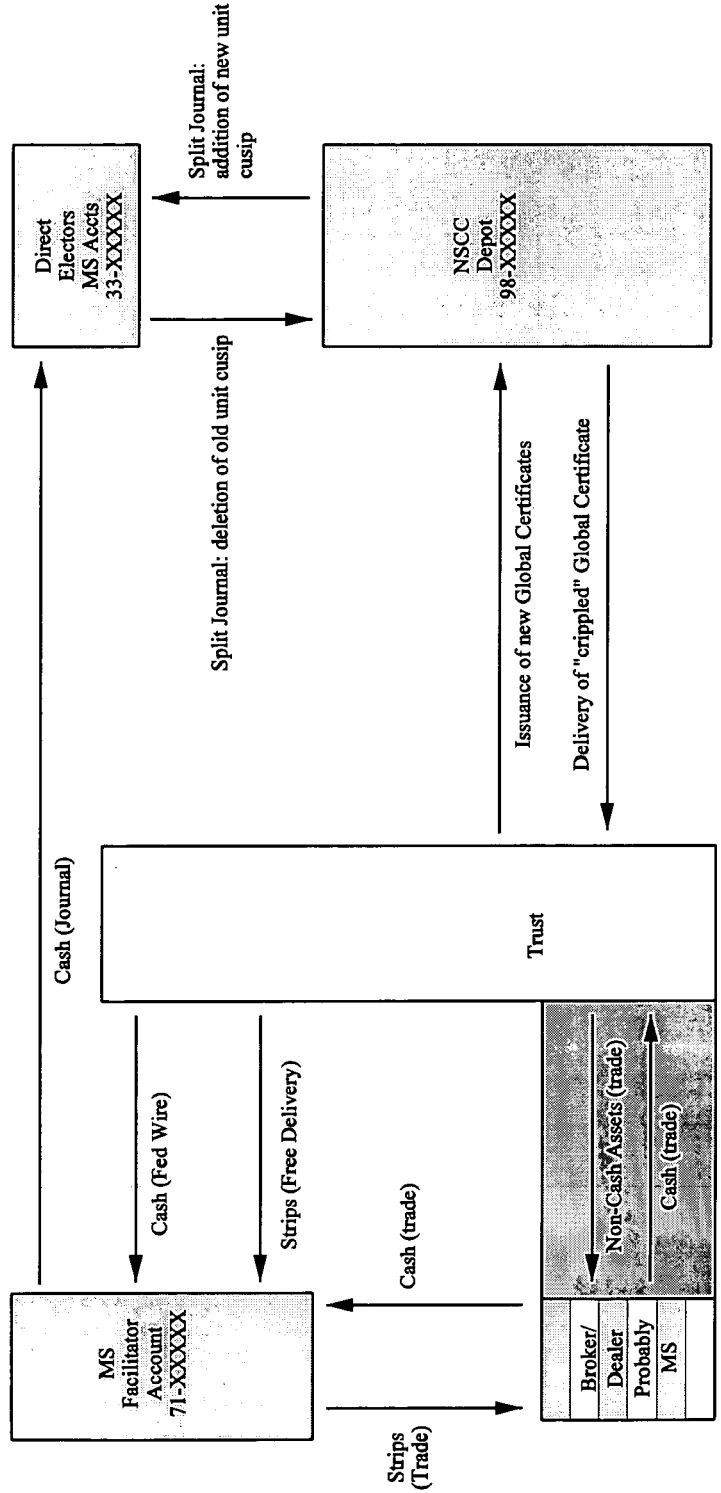
FIGS. 15 and 16 illustrate the process flow between system components used in a direct election (FIG. 15) and URP election (FIG. 16) implemented in accordance with a specific embodiment of the present invention.

In accordance with a preferred embodiment, direct election is implemented using the process flow illustrated in FIG. 15, where shaded areas include flow for the settlement of non-cash, liquid assets. In accordance with the preferred embodiment, the following procedure steps are followed:

1. Operations records the holdings of direct electors on ex-date for use on unit payable date and calculates the amount of STRIPS to be ejected from the trust on the unit distribution date. Depositor signs off on these calculations. All election changes must be confirmed by Depositor five business days prior to a distribution ex-date.

2. On unit distribution date, the trustee will:

a) deliver free to the URP Administrator (MSDW Account 71-XXXXX) an amount of STRIPS calculated using the formula: Mkt Value of STRIPS per unit on Calculation Date−(Mkt Value of STRIPS per unit on Calculation Date*UEV post-distribution)/$995;

b) and either, wire cash in the amount of the distribution (for cash distributions); or, execute the liquidation of non-cash assets by the broker of their choice (the method and time of liquidation are given by MSDW as per the ProEquity Trust agreement). Distribution of the liquidated non-cash assets occurs on the standard settle date dictated by market convention (e.g. trade date plus three for stocks, trade date plus one for bonds);

In a specific embodiment, operations will facilitate the above by receiving STRIPS free into the URP Administrator account, receiving in the wire of funds into the URP Administrator account, and receiving in free the proceeds of any liquidation of non-cash assets into the URP Administrator account. Operations also is responsible for journalling all cash items resulting from the distribution, including the proceeds from the liquidation of STRIPS, into the appropriate MSDW direct elector accounts.

Unit Reinvestment Program (URP) Election

Figure 16:
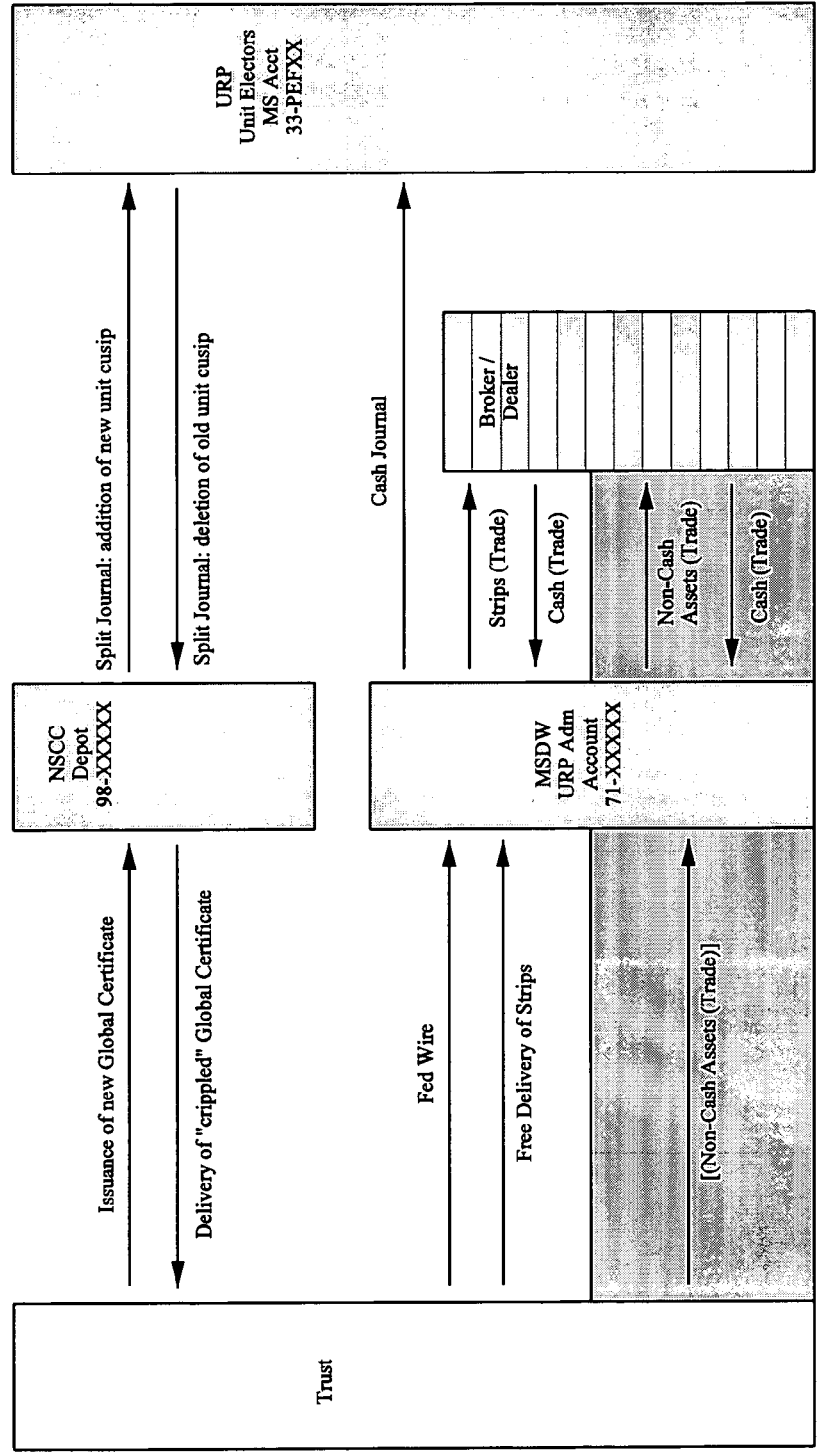

In accordance with a preferred embodiment, URP election is implemented using the process flow illustrated in FIG. 16, where shaded areas include flow for the settlement of non-cash, liquid assets. The operating procedures pertaining to URP elections broadly involve: (a) Confirm distribution amounts with trust prior to distribution; (b) Set up a receive in agent bank system for cash distribution amount; (c) Set up a receive for delivery of STRIPS and non-cash assets (if necessary).

Operational Responsibilities—URP

The URP implemented in a specific embodiment of the present invention follows the following operation sequence (and unit responsibilities):

1. Operations calculates the number of URP Units that need to be created by summing the units held across all URP Administrator accounts. A "URP" range of account numbers is used in a preferred embodiment to simplify the process.

2. The Performance Payout Calculation Date is chosen as the business date immediately preceding the Performance Payout ex-date. Calculations are made as of the close of business on the Calculation Date.

3. On the Calculation Date, the Performance Payout is calculated according to the formula (UEV−$995).

4. The amount of shares to be delivered to the URP Administrator for the creation of new units is also calculated ((UEV−$995)*# of units held in the URP range)/(share price of the underlying on the Calculation Date).

5. The URP Administrator will instruct a broker/dealer (the ProEquity Trader) to buy a number of STRIPS on the open (at, for example, 8:30 am) and sell a number of shares on the open (at, for example, 9:30 am).

6. Cash in URP Administrator accounts is made available for the purchase of shares and STRIPS (for the creation of new units) at this time.

7. The total face value of STRIPS to be purchased must equal ($995*the number of URP units to be created).

8. Shares will be sold as needed and STRIPS purchased, until all cash is exhausted, and the ratio of STRIPS to shares correspond to the ProEquity ratio as calculated by the ProEquity trader (this ratio will move during the course of the day, making this a subjective target)

9. Units created by the URP will be priced at $995, in line with the price of existing units after the performance payment.

10. The sale of stock should cover the purchase of STRIPS and the [5] bps URP Depositor Fee.

11. The URP Administrator will transfer STRIPS, shares and the [5] bps URP Depositor Fee to the Depositor.

12. The URP Administrator will transfer cash from fractional share amounts directly to the clients' 'F' range accounts.

13. The Depositor will transfer the STRIPS and shares to the Trust and additional Units will be created.

14. The Trust will increase the size of the of the Global Certificate on its book.

15. A journal entry will be made to reflect the change in the Global Certificate between the NSCC depot account and the Depositor account on MSDW's book.

16. Journal entries will be made in the client's "F" accounts on MSDW's book to reflect their URP investment.

It will be appreciated that the above procedures are illustrative of the preferred embodiment, and can be modified according to specific alternate implementations.

Computation Models

FIGS. 23A, B, C, and D illustrate models (spreadsheet summaries) used in various computations in a specific embodiment using XYZ-linked ProEquity Trust. FIG. 23A is an initial contribution spreadsheet summary. In a preferred embodiment, this spreadsheet is used on pricing date to calculate the number of ProEquity units to be created. The cost basis of the unit is initially set, in this specific embodiment, at $992.50 (the "UEV"). The share ratio is determined based on a calculation that incorporates the UEV, the closing value of the underlying equity and the closing value of the STRIP. Fees for creating the units are also set. Clients may contribute cash, the underlying equity and STRIPS or any combination of the above. Based on their contributions, calculations are performed on an aggregate basis and on a per account basis as to the number of stocks and STRIPS that need to purchased to create ProEquity units. Any cash, stock or STRIPS which are not used at this time are returned to the clients.

FIG. 23B is an ongoing contribution spreadsheet summary. This spreadsheet is used in a preferred embodiment after the pricing date for clients who want to purchase ProEquity unites after the initial creation. The additional units are created using the existing share ratio. In a specific embodiment, the cost basis of the units can be above or below the initial cost basis of $992.50, depending on the interim performance of the underlying equity and the STRIPS. In the case of ongoing contribution, clients again can contribute cash, the underlying equity and STRIPS or any combination thereof. Based on their contributions, calculations are performed on an aggregate basis and on a per account basis as to the number of stocks and STRIPS that need to purchased to create ProEquity units. Any cash, stock or STRIPS which are not used at this time are returned to the clients.

FIG. 23C is a cash payments spreadsheet summary. In a specific embodiment, this spreadsheet is used to post any cash payments paid to the accounts on an aggregate basis on a per account basis. The spreadsheet also calculates what the payment is on a per unit basis. The UEV is adjusted correspondingly downward, similar to a stock that pays a cash dividend, based on the cash payment per unit calculation.

FIG. 23D is a performance payment spreadsheet summary. In accordance with the preferred embodiment, this spreadsheet first determines the periodic (i.e., quarter end) UEV value based on the closing values of the stock and the STRIPS. Based on this calculation, the performance payment amounts on a dollar per unit basis and a share per unit basis are calculated. This is done both for the minimum supplemental payment amount and any excess about over the minimum supplemental payment amount. These calculations take into account the cash payment per unit calculation from the cash payments spreadsheet shown in FIG. 23C. Next, the total number of shares, on an aggregate basis, that need to be ejected from the Trust for the performance payment is calculated. The new share ratio can now be calculated based on the number of shares that were ejected from the Trust. A cost basis for the new URP units is calculated. These calculations are then broken down on a per account basis. It should be noted that the spreadsheets shown in FIGS. 23A, B, C, and D depend on each other, so that information and calculations are carried through from each spreadsheet.

E. Miscellaneous Aspects of the Invention

While the present invention is disclosed primarily with reference to a system and method for administering financial instruments, it will be apparent that in practice certain non-technical aspects of the invention may become important. In this section, attention is drawn to possible accounting, regulatory and tax aspects of the financial instrument of this invention.

Classification of the Trust The Trust is expected to be classified as a grantor trust for U.S. federal income tax purposes. Accordingly, owners of units should be treated for U.S. federal income tax purposes as owners of pro rata undivided interests in the Trust property.

Statutory Accounting: Although no guarantee can be made, ProEquity units are intended to be treated as bonds for statutory purposes. As such, units held, for example, by an insurance company would be reportable on Schedule D and should be subject to an RBC charge of 0.3%. Income will be recognized as payments are received. In a preferred embodiment, the system of this invention can establish Trusts in such manner that they would not be treated as affiliates of any investor for statutory purposes because no investor will control 10% or more of the Trusts through voting or managerial authority. Sale of assets in exchange for the units should cause gains to be recognized if the transfer is deemed to be permanent. As indicated above, participation in the Unit Reinvestment Program is expected in appropriate regulatory regimes to result in a legal true sale and thus to enable investors to lock in statutory surplus.

GAAP Accounting: Under FAS 125, transfer of assets to the ProEquity Trust is expected to be treated as a sale causing the derecognition of the assets if the transferor surrenders control and meets certain other requirements. A transfer that results in a legal true sale would strongly supports the required surrender of control. Participation in the Unit Reinvestment Program is expected to support the conclusion of a legal true sale to the extent required by FAS 125. Although non-participating investors may be able to reach a similar legal conclusion, the Unit Reinvestment Program used in a preferred embodiment is believed to support a more compelling case. If the transfer is a sale under FAS 125, ProEquity Trusts should not be consolidated with any investor so long as no investor owns 50% or more of any Trust. If an investor does not meet the requirements of FAS 125, the transfer is not a sale and the assets would remain on the books of the investor.

The ProEquity Trust units are expected not to be subject to FAS 133 and thus to preserve the desired objective of generating income with embedded short-term gains and losses.

Under Retrospective Accounting Method the use of ProEquity units gives a desired smoothing-out effect, i.e., the stream of income has reduced volatility.

Tax and Accounting Summary

Contribution of assets to the ProEquity Trust are expected to be tax-free. Since the exact same assets that constitute the unit are contributed, they are fungible with the received units. ProEquity Trusts as described in the embodiments above are structured to be grantor trusts and will issue 1099 forms. The unit distributions will reflect capital gains, but for accounting purposes are treated as ordinary income. Tax is payable only to the extent that shares are sold. Therefore, sale for cash or redemption is a taxable sale of the shares. For investors participating in the Unit Reinvestment Program, Performance Payments are taxable only to the extent shares are sold for reinvestment. Gain/loss should be determined on average tax basis in shares contributed. Performance Payments are expected to be not taxable for non-participating investors. Exchanging units for the underlying is expected to be tax-free with respect to the shares. Cash Distributions made by the Trust (Cash Payments) are expected to be taxable.

It should be appreciated that the above discussion of tax, accounting and other aspects of the invention is based on certain assumptions as to the regulatory regimes in place, and in no way constitute representations on the part of the inventors or any entity with which they are associated as to whether the expected benefits may materialize. Potential investors must evaluate the proper accounting and/or tax treatment for themselves using qualified advisors in light of their own situations and the particular accounting and regulatory rules applicable to them.

E. EXAMPLES

I. A Sample Term Sheet.

Following is a sample Term Sheet that illustrates the structure and operation of a ProEquity unit created and managed in accordance with the present invention.

$100,000,000 XYZ Principal-Protected Equity-Linked ("ProEquity") Trust Linked to Shares of XYZ Common Stock:

Offering of One Hundred Thousand XYZ ProEquity Units of Beneficial Interest Maturing Aug. 15, 2026

Hypothetical Transaction Terms as of September, 1999

Issuer: XYZ ProEquity Trust (the "Trust")

Offering Size: [100,000] Units

Issue Price (per unit): USD 1000 per unit. A unit represents a beneficial interest in U.S. Government STRIPS face amount USD1000 maturing Aug 15, 2026 (USD[210]) plus [1000–210]/[XYZ share price at issuance] shares of XYZ.

Pricing Date: January [ ], 2000

Issue Date: Pricing Date plus 3 days

Maturity Date: Aug. 15, 2028

Distributions: Distributions will consist of (a) Quarterly Performance Payments and (b) Cash Payments. Investors can receive the distributions directly from the Trust or participate in the Unit Reinvestment Program administered by a Broker Dealer ("Program").

Quarterly Performance

Payments: Each quarter: MAX(0, Unit Equivalent Value– $995). Unit Equivalent Value is the value of the Trust Property underlying each unit. To the extent that the Performance Payment plus the Cash Payment is less than $15/Unit, the Performance Payment will be increased to make up the difference. Distributions directly from the Trust will be in XYZ shares. Distributions received under the Program will be reinvested in XYZ ProEquity units or units in other ProEquity Trusts.

Cash Payments: Upon receipt by the Trust, all cash XYZ distributions will be distributed upon receipt. All non-cash XYZ distributions will be liquidated by the Trust upon receipt and cash sale proceeds distributed. Non-cash XYZ distributions>$100 per unit will be held by the Trust for 30 days prior to liquidation. Distributions directly from the Trust will be in cash.

Redemption: Cash only, equal to Unit Equivalent Value—Redemption Fee, any time prior to 10 days before Maturity Redemption Fee: $2.50/Unit fixed for term of Units Effective Economics: Principal Guarantee at Maturity Date Equity-linked, variable-rate, current cash distributions Documentation: 4(2) Private Placement, Purchase Agreements and other supporting documentation required on transfer to parties other than Broker.

Credit Exposure: Principal at Maturity collateralized by U.S. Government STRIPS

Depositor Fee: $7.50/Unit on $1^{st}$ $100MM; $6.00/Unit on $2^{nd}$ $100MM; $4.50/Unit thereafter. Reduced by $1.50/Unit for Units created in initial offering.

Administrative Fee: $0.90/Unit per year fixed.

Settlement: Book Entry at/by/through Broker

II. Performance Examples

Figure 17:
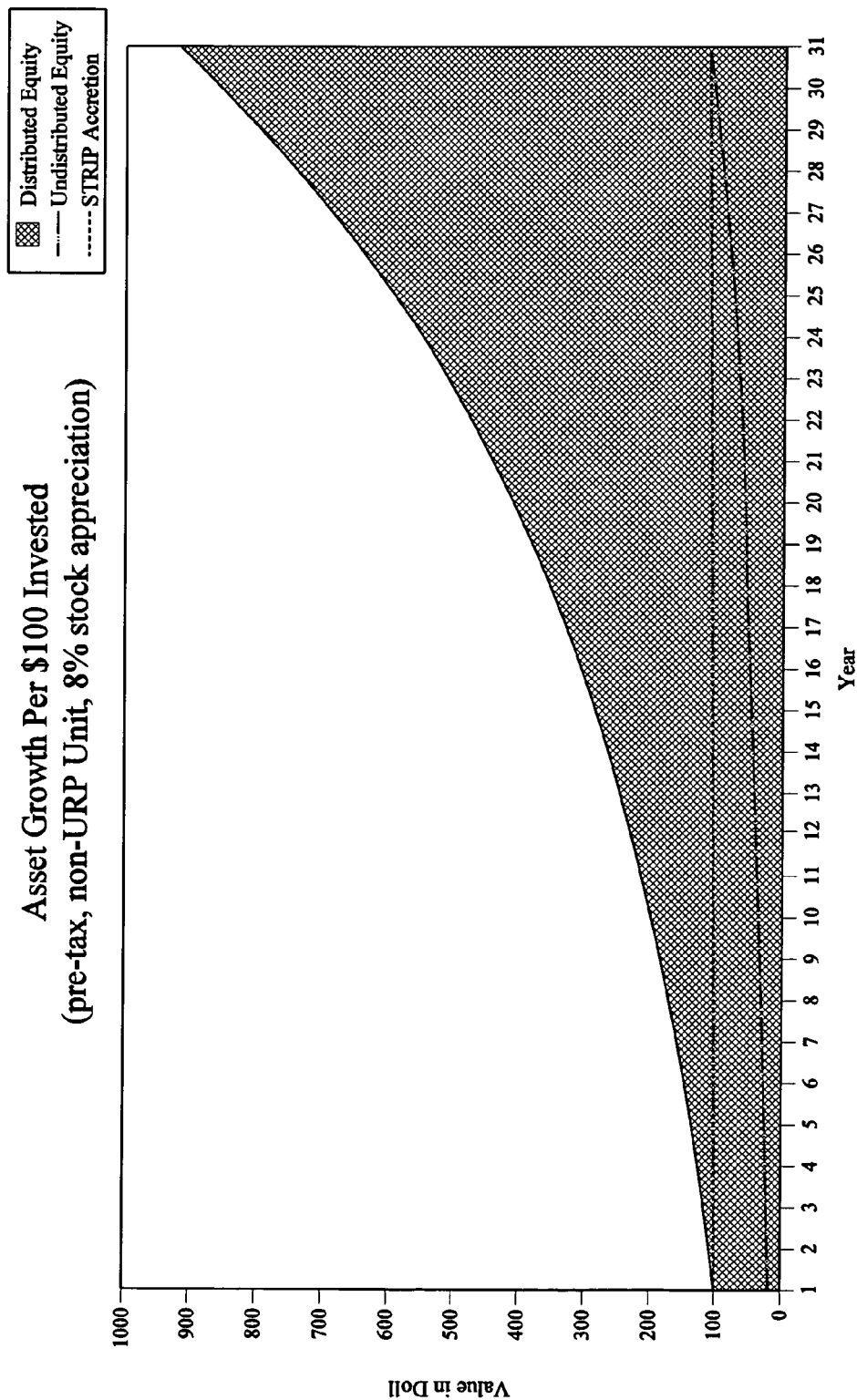
FIG. 17 illustrates how the product may benefit ProEquity investors, using specified assumptions.

As indicated above, the ProEquity financial instrument created and operated in accordance with the present invention offers a number of features that can be very attractive in practice. In this section are presented sample graphs that illustrate the performance of ProEquity Trust Units vis-a-vis established benchmarks. Specifically, FIG. 17 illustrates the significant opportunity for asset accumulation provided to ProEquity investors. The assumptions in the graph are that a pre-tax, non-URP unit is used with 8% stock appreciation over a period of 31 years. The asset growth for the unit is from $100 at initiation to nearly $900 at the end of the period.

Figure 18:
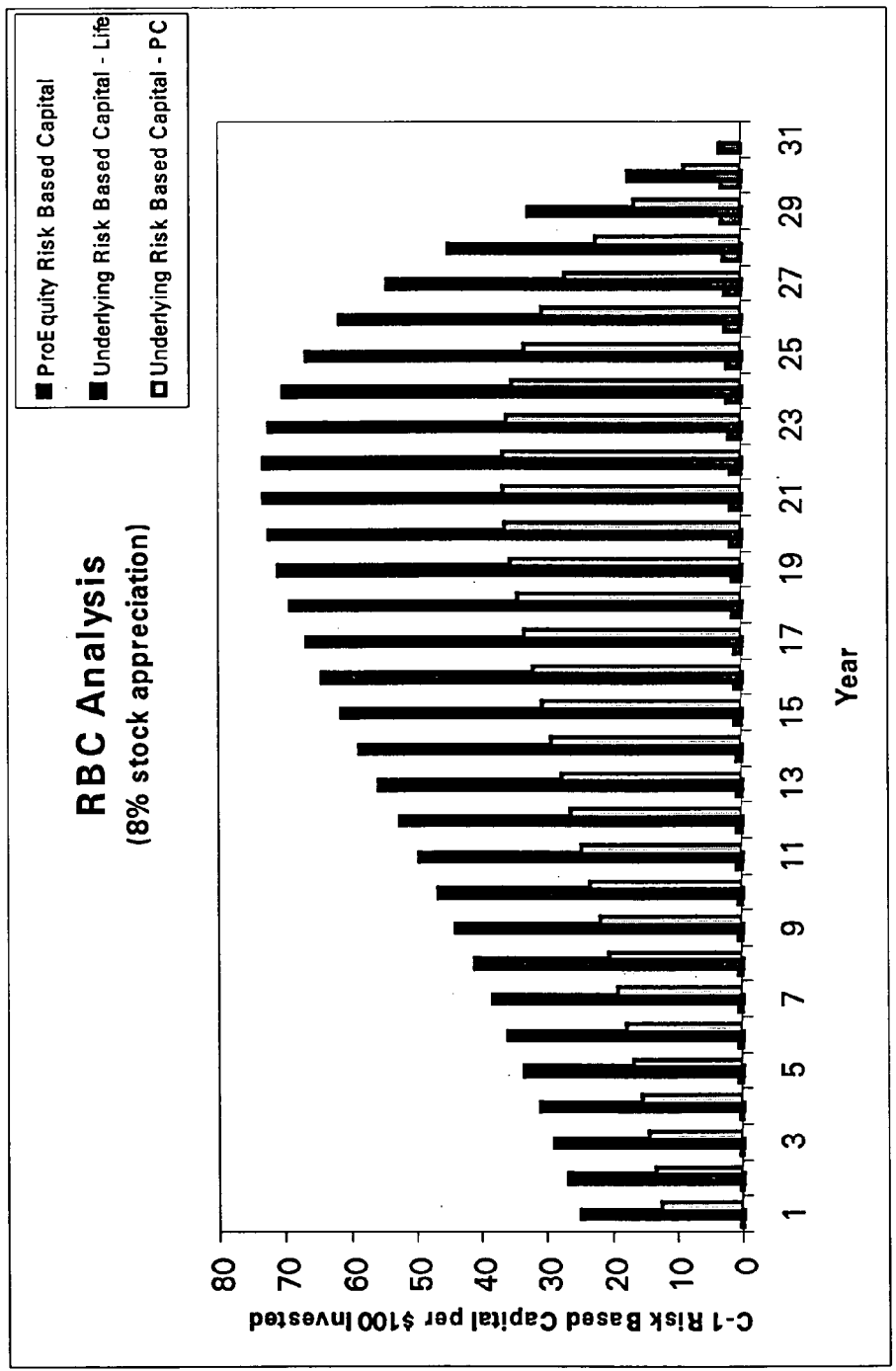
FIG. 18 illustrates risk based capital (RBC) benefits for insurance company investors offered by a ProEquity Trust using the same assumptions employed in FIG. 17.
Figure 19:
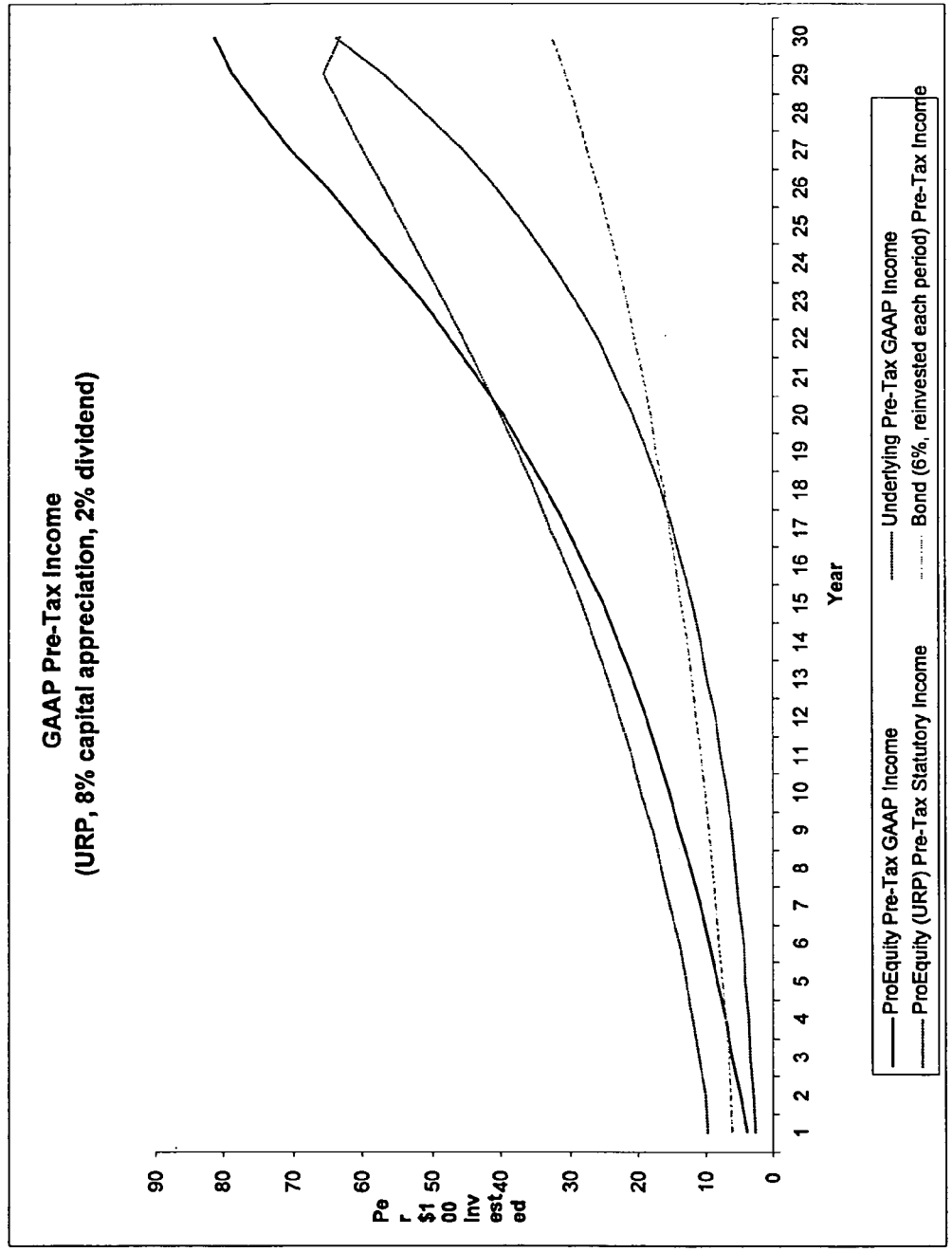
FIG. 19 shows how ProEquity trusts may generate tax efficiencies. The assumptions used in this example are URP-participating Trust, at 8% capital appreciation and 2% dividend.
Figure 20:
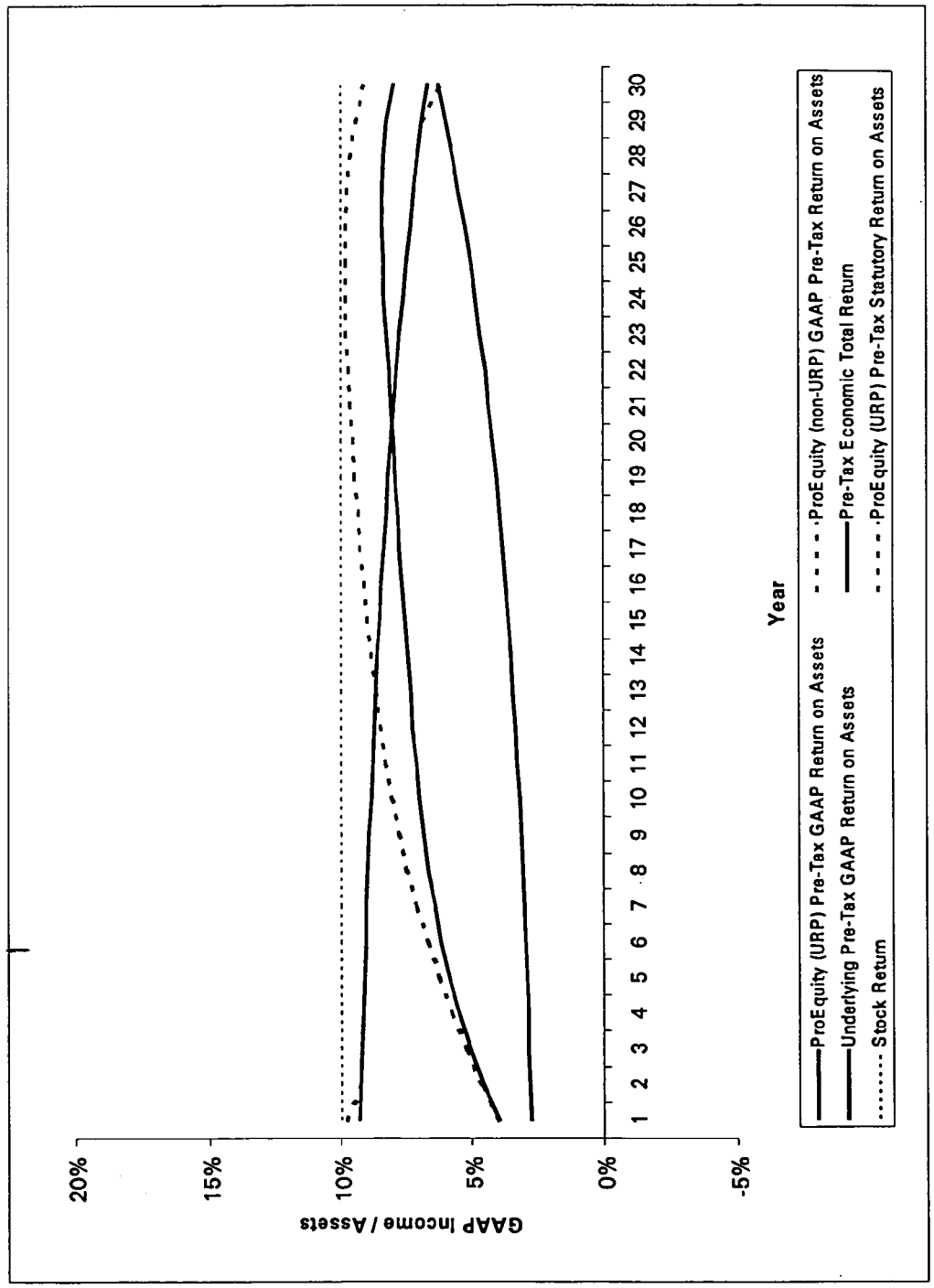
FIG. 20 illustrates one of the most important aspects of the invention, which is the very steady return on investment over a long period of time, computed under the same assumptions as FIG. 19.
Figure 21:
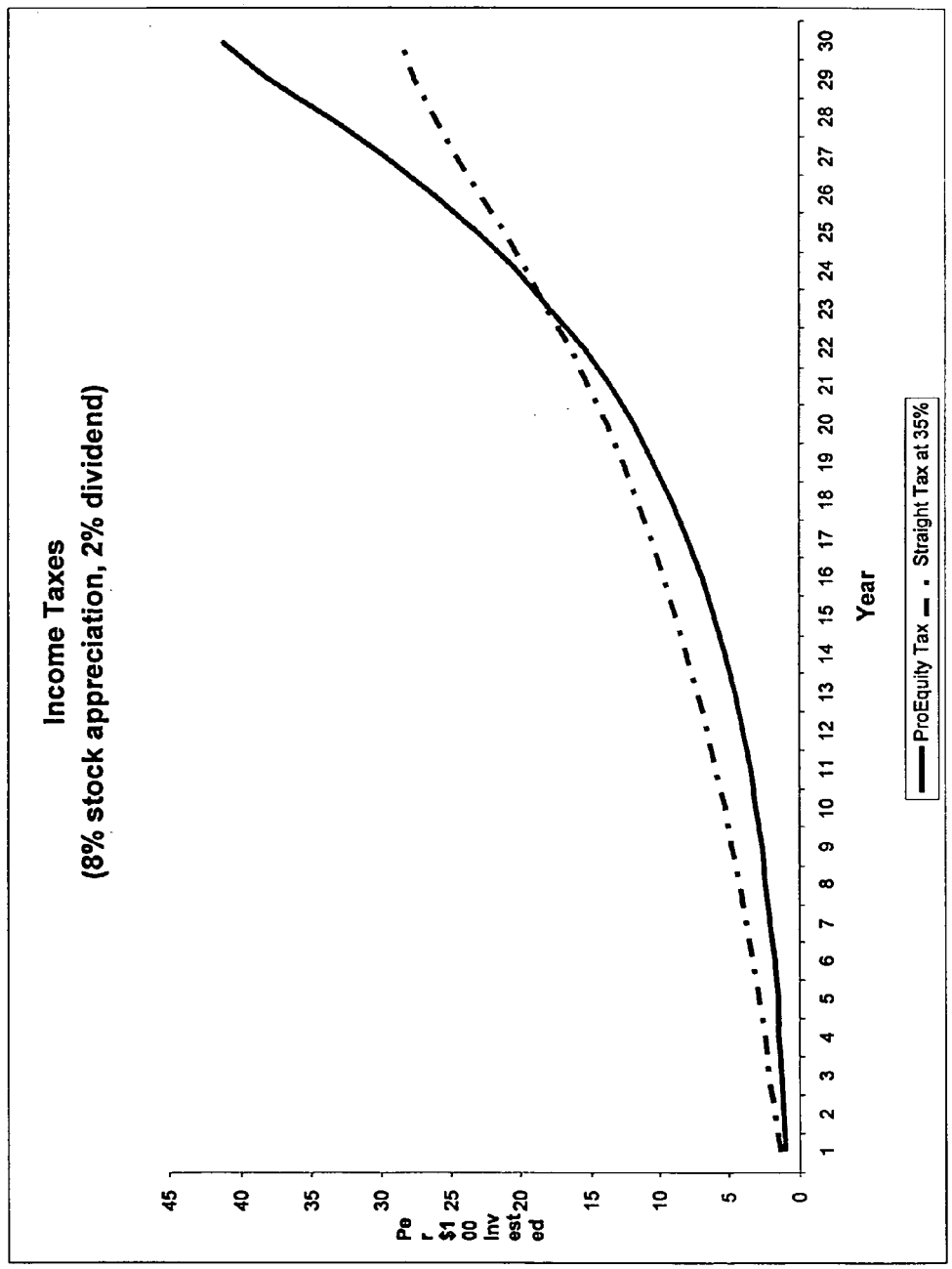
FIG. 21 illustrates how ProEquity Trusts may defer taxes versus comparable investments, and using the assumptions stated in the previous two examples.
Figure 22A:
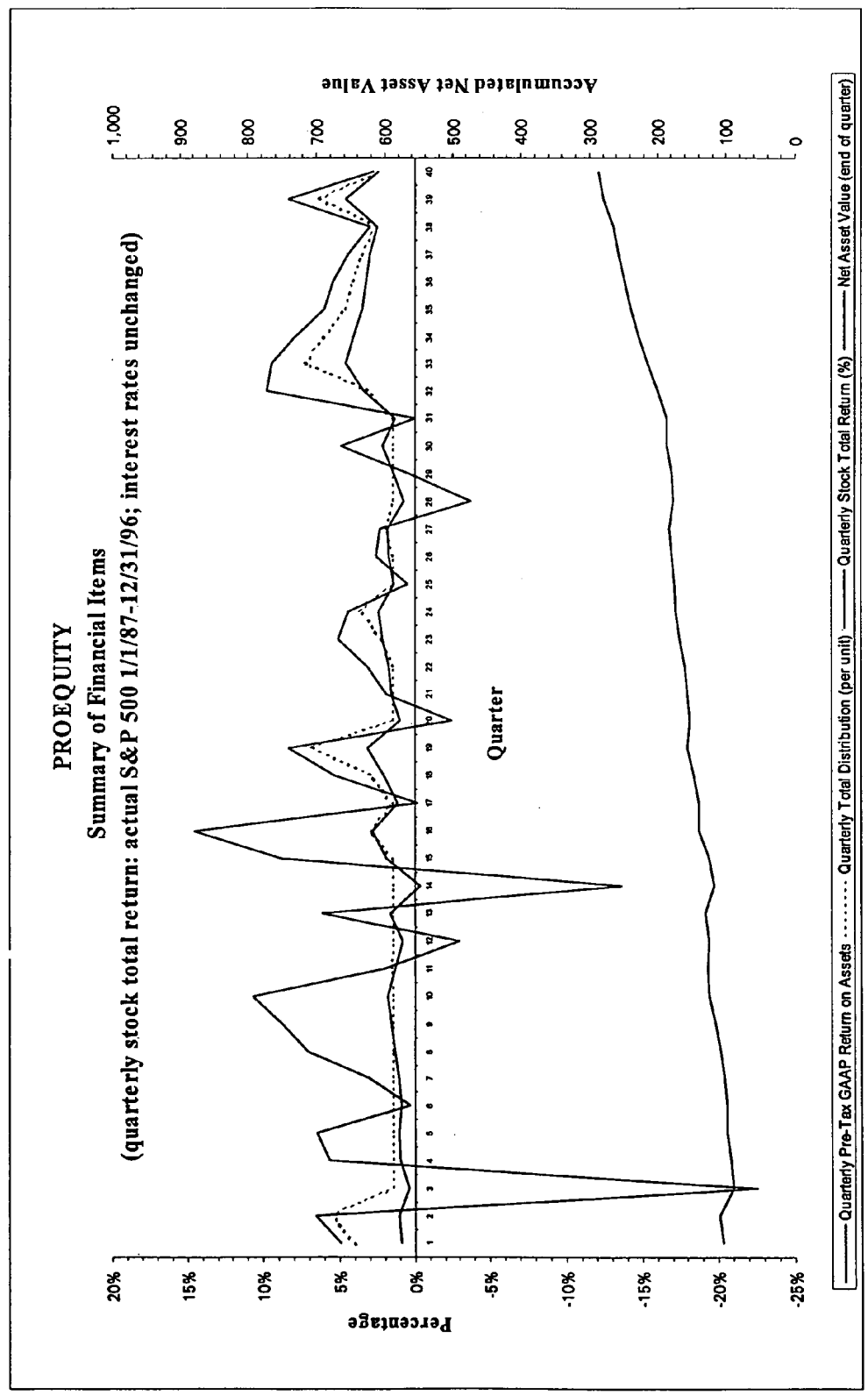
FIGS. 22A, B, C and D illustrate how the ProEquity units can smoothen returns on equity over time.
Figure 22B:
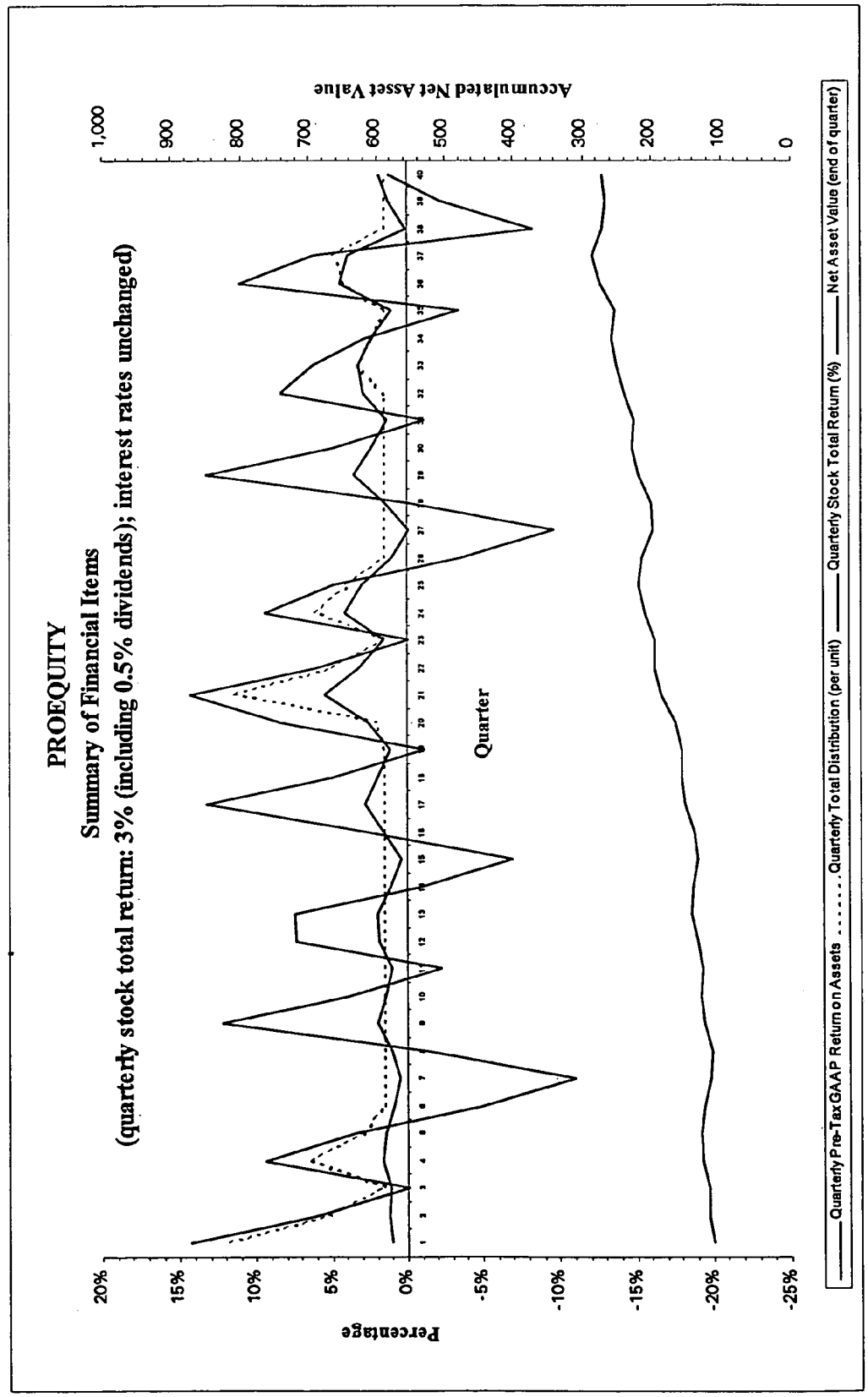
Figure 22C:
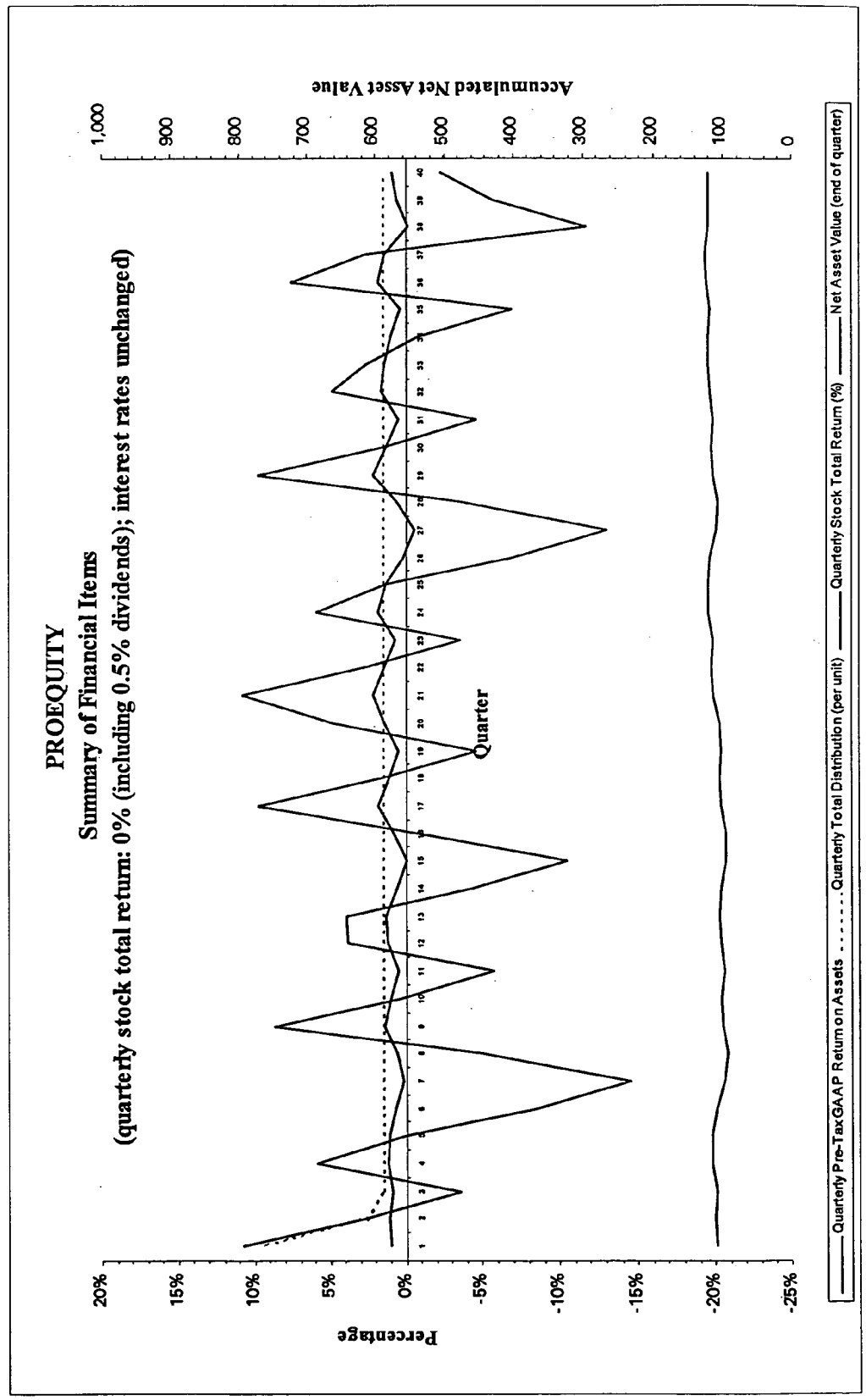
Figure 22D:
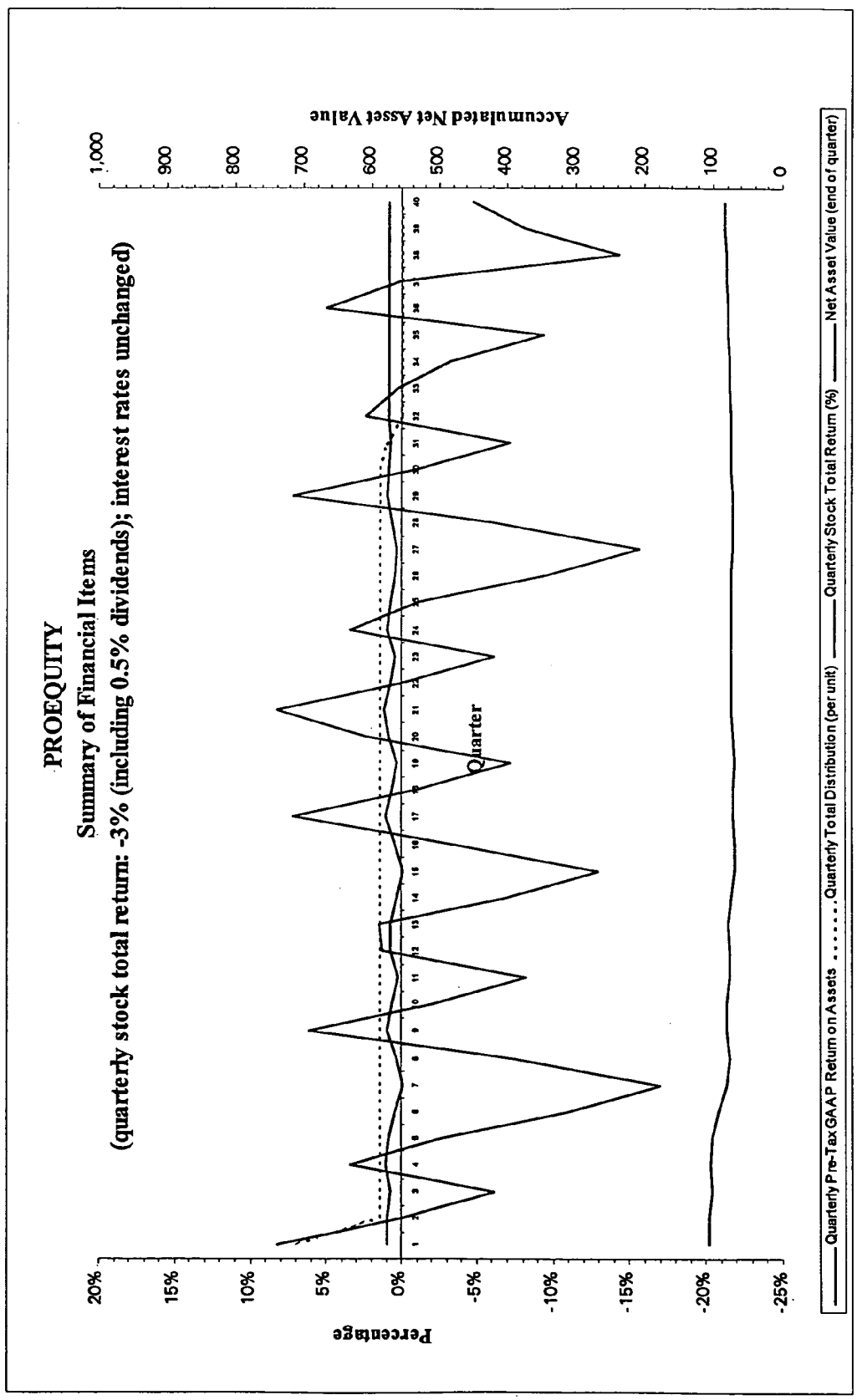

FIG. 18 illustrates the RBC benefits for insurance company investors offered by a a ProEquity Trust using the same assumptions employed in FIG. 17. FIG. 19 shows how ProEquity trusts may generate tax efficiencies. The assumptions used in this example are URP-participating Trust, at 8% capital appreciation and 2% dividend. Computed using the same assumptions FIG. 20 illustrates one of the most important aspects of the invention, which is the very steady return on investment over a long period of time, which return is only slightly less than the return of the underlying stock, but at a considerably reduced risk. The following FIG. 21 illustrates the advantage of using ProEquity Trusts in terms of deferring taxes versus comparable investments, and using the assumptions stated in the previous two examples. FIG. 22A, B, C and D illustrate how the ProEquity units can smoothen returns on equity over time.

Finally, FIGS. 24A,B,C,D,E and F illustrate an economic model, including Distribution and Accounting analysis assuming 3% quarter average total return on the stock; basis in stock=$81.26; basis in STRIPS=$17.99, where the results are shown net of expenses.

The present invention is not to be limited in scope by the specific embodiments described herein. Indeed, modifications of the invention in addition to those described herein will become apparent to those skilled in the art from the foregoing description and accompanying figures. Doubtless, numerous other embodiments can be conceived that would not depart from the teaching of the present invention, whose scope is defined by the following claims.

The invention claimed is:

1. A computer-based method for administering financial instruments, comprising:
   executing a processing program loaded on a computer, the processing program configured to establish a trust with trust units, each trust unit representing an interest in a bond having a maturity date and one or more equity security shares, the one or more equity security shares defining a share ratio; and
   periodically performing the following steps by accessing, via one of the computer and a second computer, information stored in a database, the information in the database comprising at least trust information and equity security information, to enable the one of the computer and a second computer to:
   (a) computing price of the trust units based on the share ratio for a period and current values of the bond and the one or more equity security shares;
   (b) determining a predetermined threshold price based on a par value of the trust units at maturity;
   (c) comparing the price of the trust units to the predetermined threshold price;
   (d) determining a distribution to holders of the trust units based on the comparison, the distribution including cash payments that are paid in cash and based on share dividends of the equity security shares of the trust units and performance payments that are paid in a number of equity security shares and based on underlying asset appreciation; and (e) adjusting the share ratio of the trust units to reflect the distribution.

2. The method of claim 1 wherein the number of equity security shares in the distribution is based on current share price and a difference between the computed price of the trust units and the predetermined threshold price.

3. The method of claim 2 further comprising accessing, via one of the computer and a second computer, information stored in the database to enable the one of the computer and a second computer to reinvest distributions made to holders into new trust units by combining distribution shares with a single bond into a trust unit having an adjusted share ratio.

4. The method of claim 1 further comprising accessing, via one of the computer and a second computer, information stored in the database to enable the one of the computer and a second computer to reinvest distributions made to holders into new trust units.

5. The method of claim 1 further comprising accessing, via one of the computer and a second computer, information stored in the database to enable the one of the computer and a second computer to make a final payment on or about the maturity date of the bond, the final payment comprising face value of the bond less administrative expenses.

6. The method of claim 1 wherein executing a processing program loaded on a computer includes executing a spreadsheet program loaded on the computer.

7. The method of claim 1, wherein comparing the price of the trust units to the predetermined threshold price comprises determining a price difference between the computed price of the trust units and the predetermined threshold price and wherein:
    (i) if the price difference is more than a minimum value, the distribution is equal in value to the price difference; and
    (ii) if the price difference is less than the minimum value, the distribution is equal in value to the minimum value.

8. A computer-readable medium including a processing program for causing a computer to administer financial instruments, the processing program comprising:
    means for periodically computing price of trust units in a trust, each trust unit representing an interest in a bond having a maturity date and one or more equity security shares, the one or more equity shares defining a share ratio, the price of the trust units being based on the share ratio for a period and current values of the bond and the equity security shares;
    means for comparing the computed price of the trust units to a predetermined threshold price;
    means for determining a distribution to holders of the trust units based on the comparison, the distribution including cash payments that are paid in cash and based on share dividends of the equity security shares of the trust units and performance payments that are paid in a number of equity security shares and based on underlying asset appreciation; and
    means for adjusting the share ratio of the trust units to reflect the distribution.

9. The medium of claim 8 wherein the means for comparing determines a difference between the computed price of the trust units and the predetermined threshold price, and the means for determining a distribution distributes equity security shares, where the number of equity security shares in the distribution is based on current share price and the difference.

10. The medium of claim 9 wherein the processing program comprises means for reinvesting distributions made to holders into new trust units by combining distribution shares with a single bond into a trust unit having an adjusted share ratio.

11. The medium of claim 8 wherein the processing program comprises means for reinvesting distributions made to unit holders into new trust units.

12. The medium of claim 8, wherein the means for comparing determines a price difference between the computed price of the trust units and the predetermined threshold price and wherein:
    (i) if the price difference is more than a minimum value, the distribution is equal in value to the price difference; and
    (ii) if the price difference is less than the minimum value, the distribution is equal in value to the minimum value.

13. A computer-based method for administering financial instruments, comprising:
    executing a processing program loaded on a computer, the processing program configured to establish a trust with trust units, each trust unit representing an interest in a fixed-income security that has a maturity date and one or more equity security shares, the one or more equity security shares defining a share ratio; and
    periodically performing the following steps by accessing, via one of the computer and a second computer, information stored in a database, the information in the database comprising at least trust information and equity security information, to enable the one of the computer and a second computer to:
    computing price of the trust units based on the share ratio for a period, current values of the fixed-income security and the one or more equity security shares;
    comparing the computed price of the trust units to a predetermined number, wherein the predetermined number is based on a par value of the trust at maturity;
    determining a distribution to holders of the trust units based on the comparison, the distribution including cash payments that are paid in cash and based on share dividends of the equity security shares of the trust units and performance payments that are paid in equity security shares and based on underlying asset appreciation; and
    (e) adjusting the share ratio of the trust units to reflect the distribution.

14. The method of claim 13, wherein comparing the computed price of the unit to a predetermined number determines a price difference between the computed price of the trust units and the predetermined number and where:
    (i) if the price difference is more than a minimum value, the distribution is equal in value to the price difference; and
    (ii) if the price difference is less than the minimum value, the distribution is equal in value to the minimum value.

15. A computer-based method, comprising the steps of:
    executing a processing program loaded on a computer, the processing program receiving a selection of an equity security based on expectations for long-term capital appreciation and a selection of a long-term bond issue having a fixed maturity date and a predetermined face value and creating a trust having units, each unit representing an interest in a selected long-term bond issue and a predetermined number of shares of a selected equity security, the number of shares of the selected equity security defining a share ratio, the trust being associated with an account administrator having access to information about the trust and about customer accounts indicating ownership interest in the units; and accessing, via one of the computer and a second computer, information stored in a database, the information in the database comprising at least trust information and equity security information to enable the one of the computer and a second computer to periodically perform the following steps:

determining a current value of the units using current market information about the selected long-term bond and the selected equity security;

determining payments to customer accounts based on a difference between the current value and a predetermined number, wherein the predetermined number is based on a par value of the trust at maturity and the payments include cash payments that are paid in cash and based on share dividends of the shares of the selected equity security of the unit and performance payments that are paid in a number of equity security shares and based on underlying asset appreciation; and adjusting the share ratio of the units to reflect the payments.

16. The method of claim 15 wherein the equity security is selected from among large-cap stocks.

17. The method of claim 15 wherein the long-term bond issue is a U.S. Treasury STRIP.

18. The method of claim 17 wherein a term for the long-term bond issue is between 20 and 30 years.

19. The method of claim 15 wherein determining the value of units is based on a quarterly period.

20. The method of claim 15 wherein the performance payments include a number of equity security shares based on current share price and a difference between the computed price of the unit and the predetermined threshold number.

21. The method of claim 20 further comprising accessing, via one of the computer and a second computer, information stored in the database to enable the one of the computer and a second computer to adjust the share ratio of the units to reflect an excess number of distributed shares.

22. The method of claim 15 further comprising accessing, via one of the computer and a second computer, information stored in a database to enable the one of the computer and a second computer to reinvest distributions made to unit holders into new units.

23. The method of claim 22 further comprising accessing, via one of the computer and a second computer, information stored in the database to enable the one of the computer and a second computer to reinvest distributions made to unit holders into new trust units by combining equity security distribution shares with a single bond into a trust unit having an adjusted share ratio.

24. The method of claim 15 further comprising accessing, via one of the computer and a second computer, information stored in the database to enable the one of the computer and a second computer to make a final payment on or about the maturity date of the bond, the final payment comprising a face value of the bond less administrative expenses.

25. The method of claim 15 wherein creating a trust includes developing a spreadsheet with entries corresponding to units and customer accounts.

26. The method of claim 25 further including accessing a database accessible by the account administrator for storing information about the units and the customer accounts.

27. The method of claim 15, wherein:
(i) if the difference between the current value of the units and the predetermined number is less than zero, each payment is equal to a minimum amount;
(ii) if the difference between the current value of the units and the predetermined number is more than zero, each payment includes an excess value payment equal in value to the difference in value; and
(iii) if the difference between the current value of the units and the predetermined number is more than zero and less than a minimum amount, each payment includes a supplemental value payment equal to the difference between the minimum amount and the excess value payment.

* * * * *

UNITED STATES PATENT AND TRADEMARK OFFICE
CERTIFICATE OF CORRECTION

| | |
|---|---|
| PATENT NO. | : 7,249,075 B2 |
| APPLICATION NO. | : 09/397704 |
| DATED | : July 24, 2007 |
| INVENTOR(S) | : Altomare |

It is certified that error appears in the above-identified patent and that said Letters Patent is hereby corrected as shown below:

Column 24, line 54, delete "computing" and replace therewith --compute--.

Column 24, line 57, delete "determining" and replace therewith --determine--.

Column 24, line 59, delete "comparing" and replace therewith --compare--.

Column 24, line 61, delete "determine." and replace therewith --determine--.

Column 25, line 1, delete "(e) adjusting" and replace therewith --adjust--.

Column 26, line 31, delete "computing" and replace therewith --compute--.

Column 26, line 34, delete "comparing" and replace therewith --compare--.

Column 26, line 37, delete "determining" and replace therewith --determine--.

Column 26, line 44, delete "(e) adjusting" and replace therewith --adjust--.

Column 27, line 7, delete "security information to enable" and replace therewith --security information, to enable--.

Signed and Sealed this

Twenty-ninth Day of July, 2008

JON W. DUDAS
*Director of the United States Patent and Trademark Office*